(12) United States Patent
Masuda et al.

(10) Patent No.: US 8,442,756 B2
(45) Date of Patent: May 14, 2013

(54) NAVIGATION APPARATUS

(75) Inventors: Hiroaki Masuda, Yokohama (JP); Jun Tokue, Yokohama (JP); Kazuhiro Yamamoto, Yokohama (JP); Shuichi Watanuki, Yokohama (JP); Yoshinori Takahashi, Yokohama (JP); Tsutomu Kogure, Yokohama (JP); Yasuo Oishi, Niiza (JP); Yukihiko Suzaki, Niiza (JP); Toshiaki Hosogai, Niiza (JP)

(73) Assignee: Honda Access Corp., Niiza-shi, Saitama (JP)

( * ) Notice: Subject to any disclaimer, the term of this patent is extended or adjusted under 35 U.S.C. 154(b) by 634 days.

(21) Appl. No.: 12/598,658

(22) PCT Filed: May 2, 2008

(86) PCT No.: PCT/JP2008/058410
§ 371 (c)(1),
(2), (4) Date: Nov. 3, 2009

(87) PCT Pub. No.: WO2008/139970
PCT Pub. Date: Nov. 20, 2008

(65) Prior Publication Data
US 2010/0161220 A1   Jun. 24, 2010

(30) Foreign Application Priority Data

May 3, 2007  (JP) ................................ 2007-121989
Oct. 22, 2007  (JP) ................................ 2007-274451

(51) Int. Cl.
*G01C 21/00* (2006.01)
(52) U.S. Cl.
USPC ........................................................ 701/409

(58) Field of Classification Search ............... 701/409
See application file for complete search history.

(56) References Cited

U.S. PATENT DOCUMENTS 6,370,037 B1    4/2002  Schoenfish
2006/0039671 A1  2/2006  Chigasaki

FOREIGN PATENT DOCUMENTS

| EP | 1 440 848 A1 | 7/2004 |
| EP | 1862355 A2 | 12/2007 |
| ES | 1063100 U | 10/2006 |
| JP | 01-303977 A | 12/1989 |

(Continued)

OTHER PUBLICATIONS

"Fujitsu Ten: ECLIPSE 'AVN2227P' to be Launched", Online, Apr. 19, 2007, Fujitsu-Ten Limited, located by search on Apr. 26, 2007, <http://www.fujitsu-ten.co.jp/release/2007/04/20070419.html>.

(Continued)

*Primary Examiner* — Eric Culbreth
(74) *Attorney, Agent, or Firm* — Westerman, Hattori, Daniels & Adrian, LLP

(57) ABSTRACT

A navigation apparatus includes a base unit fastenable to a dashboard at a driver's seat of a vehicle, a front panel unit attachable to and detachable from the base unit and with a display displaying map data, and a microcomputer adapted to perform a navigation function to indicate a determined location of the vehicle on the map data. The navigation apparatus is configured such that a part of the front panel unit projects from a surface of the dashboard toward a user seated in the driver's seat, as viewed from side, when the front panel unit is attached to the base unit. With this, the degree of freedom of front panel unit attachment/detachment with respect to the base unit is improved without sacrificing the appearance of the navigation apparatus.

7 Claims, 39 Drawing Sheets

FOREIGN PATENT DOCUMENTS

| | | |
|---|---|---|
| JP | 06-087387 A | 3/1994 |
| JP | 07-288869 A | 10/1995 |
| JP | 09-002166 A | 1/1997 |
| JP | 09-261749 A | 10/1997 |
| JP | 09-321640 A | 12/1997 |
| JP | 10-275044 A | 10/1998 |
| JP | 11-268555 A | 10/1999 |
| JP | 2000-190755 A | 7/2000 |
| JP | 2001-141471 A | 5/2001 |
| JP | 2001-277902 A | 10/2001 |
| JP | 2002-357425 A | 12/2002 |
| JP | 2002-370587 A | 12/2002 |
| JP | 3376813 B2 | 2/2003 |
| JP | 2003-205766 A | 7/2003 |
| JP | 2003-522471 A | 7/2003 |
| JP | 2004-268653 A | 9/2004 |
| JP | 2006-347216 A | 12/2006 |
| JP | 2007-033660 A | 2/2007 |
| JP | 2007-066297 A | 3/2007 |

OTHER PUBLICATIONS

International Search Report of PCT/JP2008/058410, Mailing Date of Aug. 19, 2008.
Japanese Office Action dated Apr. 20, 2010, issued in corresponding Japanese Patent Application No. 2007-274451.
European Search Report dated Mar. 24, 2011, issued in corresponding European Patent Application No. 11154373.2.
European Search Report dated Mar. 25, 2011, issued in corresponding European Patent Application No. 11154375.7.
"Fujitsu Ten: Eclipse 'AVN2227P' to be Launched", Fujitsu-Ten Limited Internet Article, Apr. 19, 2007, XP002628034, Retrieved from the Internet : URL:http://www.fujitsu-ten.co.jp/release/2007/04/20070419.html.
Japanese Office Action dated Jun. 14, 2011, issued in corresponding Japanese Patent Application No. 2009-043846.
Japanese Office Action dated Jun. 14, 2011, issued in corresponding Japanese Patent Application No. 2009-043847.
Japanese Office Action dated Jun. 21, 2011, issued in corresponding Japanese Patent Application No. 2009-043845.
Japanese Office Action dated Jun. 21, 2011, issued in corresponding Japanese Patent Application No. 2009-043844.
Supplementary European Search Report dated Jul. 29, 2010, issued in corresponding European Patent Application No. 08752315.5.
Notification of Grounds for Rejection dated Sep. 21, 2010, issued in corresponding Japanese Patent Application No. JP2009-043848.
European Office Action dated Nov. 9, 2011, issued in corresponding European Patent Application No. 11154392.2.
European Office Action date Nov. 9, 2011, issued in corresponding European Patent Application No. 11154382.3.

FIG.5
(a)
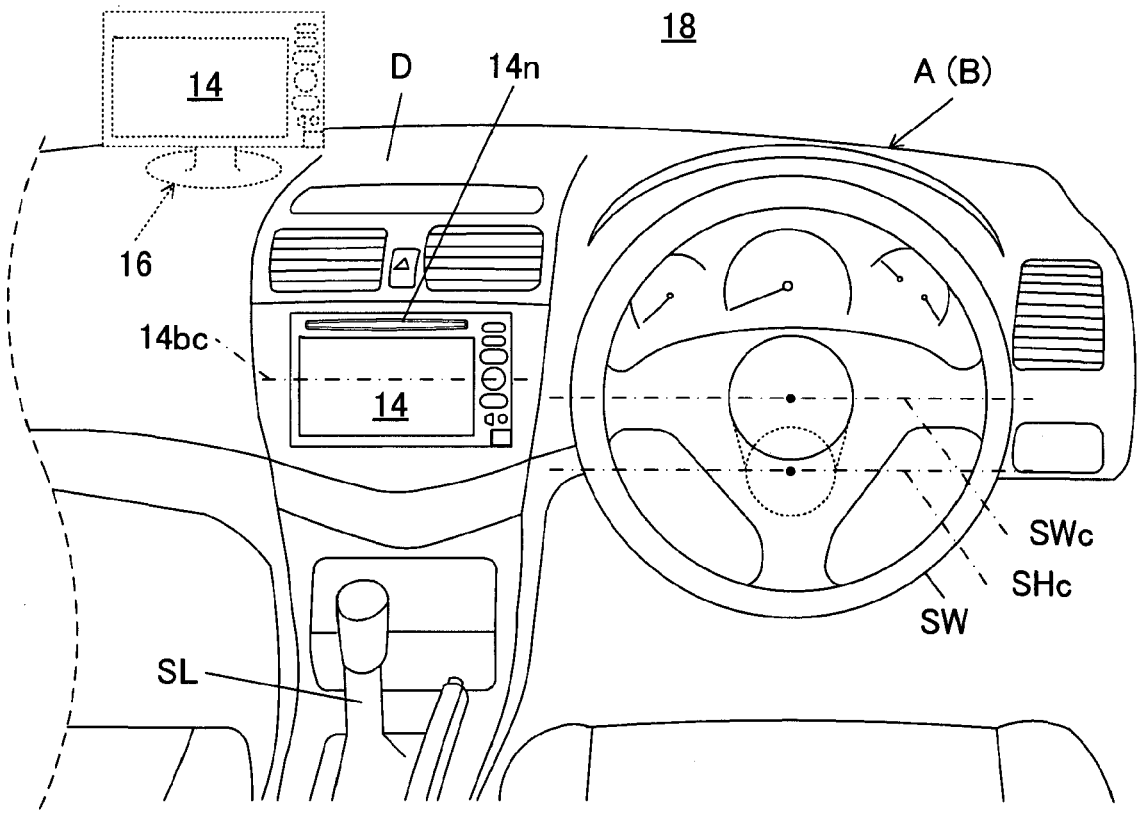
(b)
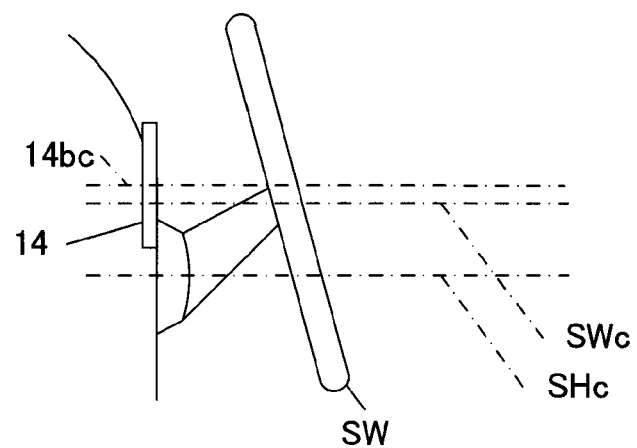

FIG.20
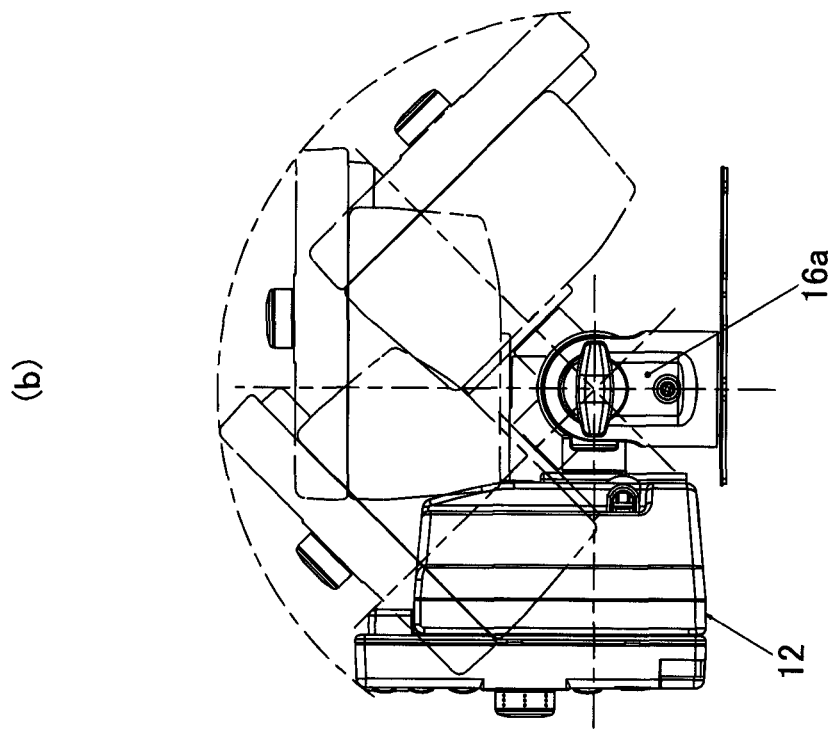
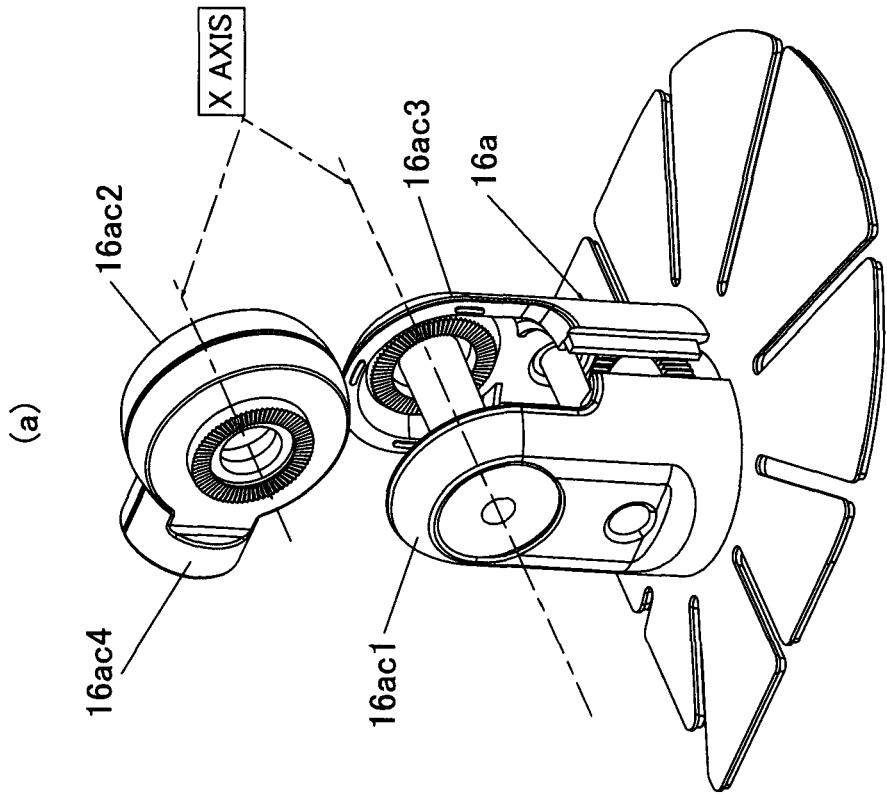

NAVIGATION APPARATUS

TECHNICAL FIELD

This invention relates to a navigation apparatus, more specifically to an apparatus mounted in a vehicle for communicating to a driver information (directional, map, road, etc.) for reaching a destination.

BACKGROUND ART

Although navigation apparatuses of the foregoing type were initially limited to types integrally fixed to the vehicle, there have recently also been proposed easily-carried portable types, as well as detachable navigation apparatuses that further improve ease-of-use by enabling only the section with navigation functions to be mounted and dismounted (see, for example, Patent Reference 1 and Non-patent Reference 1).

According to the technology taught by Patent Reference 1, a navigation apparatus comprising a GPS receiver connected to a GPS antenna, a gyrosensor, a vehicle signal processor circuit including a vehicle speed signal, a display for displaying a map, and an ECU for overall control is equipped with a vehicle side unit provided on the vehicle side and a detachable unit detachably provided on the vehicle, and at least the gyrosensor and the vehicle signal processor circuit are mounted on the vehicle side, while the display and ECU are installed in the detachable unit to enable removal from the vehicle for use in the outside of the vehicle.

According to the technology taught by Non-Patent Reference 1, a unit (detachable side unit) configured to be attachable/detachable to/from an audio-combined main unit (vehicle side unit) is provided and the subject vehicle location can be corrected using a GPS signal and a wheel speed sensor output. Further, the detachably configured subunit has navigation capability even when removed from the main unit, thereby enabling use in the outside of the vehicle mounted with the main unit and destination searches and the like in the home.

Patent Reference 1: Japanese Patent No. 3376813

Non-Patent Reference: "Fujitsu Ten: ECLIPSE 'AVN2227P' to be Launched", [on line], Apr. 19, 2007, Fujitsu-Ten Limited, located by search on Apr. 26, 2007, Internet URL, http ://www.fujitsu-ten.co.jp/release/2007/04/20070419.html

DISCLOSURE OF THE INVENTION

Problems to be Solved by the Invention

In the case of the apparatus of Patent Reference 1, the display provided in the detachable unit is configured to be foldable so that it has to be folded every time it is attached to or detached from the vehicle side unit, which is troublesome.

In the case of the apparatus of Non-Patent Reference 1, the display is fixed to the detachable unit side, which avoids the foregoing problem, but the detachable unit is relatively narrow compared with the attach/detach face of the vehicle side unit, so that the resulting small area of the display makes viewability less than satisfactory.

The object of this invention is therefore to solve the aforesaid drawbacks by providing a navigation apparatus whose unit including a microcomputer that performs navigation functions is enhanced in ease-of-use by configuring it to be detachable from a base unit constituting the vehicle side unit and increasing the size of the display to the utmost possible.

Means for Solving the Problems

In order to achieve the object, according to a first aspect of the invention this invention is configured to have a navigation apparatus having: a base unit that is fastenable to a dashboard at a driver's seat of a vehicle; a front panel unit that is attachable to and detachable from the base unit and is equipped with a display displaying map data; and a microcomputer that performs a navigation function to indicate a determined location of the vehicle on the map data, characterized in that: a front surface of the front panel unit is made same size as a mating face of the base unit; a part of the front panel unit projects from a surface of the dashboard toward a user seated in the driver's seat, as viewed from side, when the front panel unit is attached to the base unit; the base unit is accommodated in a recess formed in the dashboard to be fastenable to the dashboard; and a part of the front panel unit is located inside the recess, as viewed from the side, when the front panel unit is moved from the attached position to a detached position in response to operation of a detach button of an attached/detach mechanism by the user.

According to a second aspect of the invention, this invention is configure to have a navigation apparatus having: a base unit that is fastenable to a dashboard to at a driver's seat of a vehicle; a front panel unit that is attachable to and detachable from the base unit and equipped with a display displaying map data; and a microcomputer that performs a navigation function to indicate a determined location of the vehicle on the map data, characterized in that: a part of the front panel unit projects from a surface of the dashboard toward a user seated in the driver's seat, as viewed from side, when the front panel unit is attached to the base unit; the base unit is accommodated in a recess formed in the dashboard to be fastenable to the dashboard, a top of the front panel unit projects from the surface of the dashboard toward the user, as viewed from the side, when the front panel unit is in the attached position, and a detach button of an attach/detach mechanism provided to be operable by the user for moving the front panel unit from the attached position to a detached position is disposed at the bottom of the front panel unit located inside the recess.

According to a third aspect of the invention, the apparatus is configured to have a navigation apparatus having: a base unit that is accommodatable in a housing formed in a dashboard D at a driver's seat of a vehicle and is equipped with at least a microcomputer; and a front panel unit that is attachable to and detachable from the base unit and is equipped with at least a display displaying map data and a microcomputer performing a navigation function to indicate a determined location of the vehicle on the map data, characterized in that: a front surface of the front panel unit is made same size as a mating face of the base unit; an upper cover is provided at a top of the housing formed in the dashboard to extend beyond a front end of a front panel unit toward a driver's seat as viewed from above; and the front panel unit is kicked out to be detached from the base unit at a position between a base end of leading end of the upper cover and a point of inflection where the dashboard D starts to be inclined downward.

According to a fourth aspect of the invention, the apparatus is configured such that a base end of leading end of the upper cover is located at a frontward position compared to a position corresponding to the front end of the front panel unit in a detached position.

According to a fifth aspect of the invention, the apparatus is configured to have a navigation apparatus having: a base unit that is fastenable in a recess formed in a dashboard D of a vehicle and is equipped with at least a microcomputer; and a front panel unit that is attachable to and detachable from the base unit and is equipped with at least a display displaying map data and a microcomputer performing a navigation function to indicate a determined location of the vehicle on the map data, characterized in that: a front surface of the front panel unit is made same size as a mating face of the base unit; and the recess formed in the dashboard is made so that a part of the front panel unit projects from a wall Dw of the dashboard D, as viewed from side, when the front panel unit is attached to the base unit.

According to a sixth aspect of the invention, this invention is configured to have a navigation apparatus having: a base unit that is accommodatable in a housing formed in a dashboard D at a driver's seat of a vehicle and is equipped with at least a microcomputer; and a front panel unit that is attachable to and detachable from the base unit and is equipped with at least a display displaying map data and a microcomputer performing a navigation function to indicate a determined location of the vehicle on the map data, characterized in that: a front surface of the front panel unit is made same size as a mating face of the base unit; a recess is formed in the dashboard D ; and a top of the front panel unit projects beyond the recess, as viewed from side, when the front panel unit is attached to the base unit.

According to a seventh aspect of the invention, the apparatus is configured such that a bottom surface of the recess is made horizontal.

According to a eighth aspect of the invention, this invention is configured to have a navigation apparatus having: a base unit that is accommodatable in a housing formed in a dashboard D at a driver's seat of a vehicle and is equipped with at least a microcomputer; and a front panel unit that is attachable to and detachable from the base unit and is equipped with at least a display displaying map data and a microcomputer performing a navigation function to indicate a determined location of the vehicle on the map data, characterized in that: a front surface of the front panel unit is made same size as a mating face of the base unit; partitions are provided on opposite sides of the front panel unit; and one of the partitions on steering wheel side is formed to project more with respect to the front panel unit than other of the partitions not on the steering wheel side.

According to a ninth aspect of the invention, the apparatus is configured such that the display occupies 70% or greater of length of the front panel unit in a lateral direction.

According to a tenth aspect of the invention, this invention is configured to have a navigation apparatus having: a base unit that is accommodatable in a dashboard D at a driver's seat of a vehicle and is equipped with at least a microcomputer; and a front panel unit that is attachable to and detachable from the base unit and is equipped with at least a display displaying map data and a microcomputer performing a navigation function to indicate a determined location of the vehicle on the map data, characterized in that: a front surface of the front panel unit is made same size as a mating face of the base unit; a surface of the dashboard D is formed with a recess of U-shape, as viewed from front, to accommodate the base unit of laterally elongated rectangular shape; the front panel unit is made attachable to the base unit; and a sloped surface is formed at an edge of the recess of U-shape.

Effects of the Invention

According to the first aspect of the invention, in a navigation apparatus having: a base unit that is fastenable to a dashboard at a driver's seat of a vehicle; a front panel unit that is attachable to and detachable from the base unit and is equipped with a display displaying map data; and a microcomputer that performs a navigation function to indicate a determined location of the vehicle on the map data, it is configured such that a front surface of the front panel unit is made same size as a mating face of the base unit; a part of the front panel unit projects from a surface of the dashboard toward a user seated in the driver's seat, as viewed from side, when the front panel unit is attached to the base unit; the base unit is accommodated in a recess formed in the dashboard to be fastenable to the dashboard; and a part of the front panel unit is located inside the recess, as viewed from the side, when the front panel unit is moved from the attached position to a detached position in response to operation of a detach button of an attach/detach mechanism by the user. With this, the degree of freedom of front panel unit attachment/detachment with respect to the base unit is improved without sacrificing the appearance of the navigation apparatus.

Further, in addition to the foregoing effects, it is possible by retaining the part of the front panel unit inside the recess to prevent the front panel unit from accidental fall-off and by projecting the remainder from the recess to make it easy for the user to grasp and detach it, thereby further improving the freedom of front panel unit attachment and detachment.

According to the second aspect of the invention, in a navigation apparatus having: a base unit that is fastenable to a dashboard at a driver's seat of a vehicle; a front panel unit that is attachable to and detachable from the base unit and is equipped with a display displaying map data; and a microcomputer that performs a navigation function to indicate a determined location of the vehicle on the map data, it is configured such that a part of the front panel unit projects from a surface of the dashboard toward a user seated in the driver's seat, as viewed from side, when the front panel unit is attached to the base unit. With this, the degree of freedom of front panel unit attachment/detachment with respect to the base unit is improved without sacrificing the appearance of the navigation apparatus. Also, since a front surface of the front panel unit is made same size as a mating face of the base unit, the side of the display can be increased to the utmost possible. Further, the base unit is accommodated in a recess formed in the dashboard to be fastenable to the dashboard, a top of the front panel unit projects from the surface of the dashboard toward the user, as viewed from the side, when the front panel unit is in the attached position, and a detach button of an attach/detach mechanism provided to be operable by the user for moving the front panel unit from the attached position to a detached position is disposed at bottom of the front panel unit located inside the recess. With this, in addition to the foregoing effects, it is possible by the positioning of the detach button inside the recess to prevent misoperation and accidental fall-off of the front panel unit. Moreover, since the top of the front panel unit is projected from the surface of the dashboard, frequently used and important switches can be disposed at this location to enhance ease of use.

According to the third aspect of the invention, in a navigation apparatus having: a base unit that is accommodatable in a housing formed in a dashboard D at a driver's seat of a vehicle and is equipped with at least a microcomputer; and a front panel unit that is attachable to and detachable from the base unit and is equipped with at least a display displaying map data and a microcomputer performing a navigation function to indicate a determined location of the vehicle on the map data, it is configured such that a front surface of the front panel unit is made same size as a mating face of the base unit; an upper cover is provided at a top of the housing formed in the dashboard to extend beyond a front end of a front panel unit toward a driver's seat as viewed from above; and the front panel unit is kicked out to be detached from the base unit at a position between a base end of leading end of the upper cover and a point of inflection where the dashboard D starts to be inclined downward. With this, it becomes possible to prevent external light and the like from reflecting off the liquid crystal panel of the front panel unit and, at time of detaching the front panel unit, also act as a finger guide to facilitate the detachment. In addition, since the upper cover is provided at the top, the opposite sides and undersurface are open so that even a user of relatively large size can easily attach the front panel unit to the base unit and detach it therefrom.

According to the fourth aspect of the invention, in the apparatus, since a base end of leading end of the upper cover is located at a frontward position compared to a position corresponding to the front end of the front panel unit in a detached position, in addition to the effects described below, it becomes possible to further easily detach the front panel unit.

According to the fifth aspect of the invention, in the navigation apparatus having: a base unit that is fastenable in a recess formed in a dashboard D at a driver's seat of a vehicle and is equipped with at least a microcomputer; and a front panel unit that is attachable to and detachable from the base unit and is equipped with at least a display displaying map data and a microcomputer performing a navigation function to indicate a determined location of the vehicle on the map data, it is configured such that a front surface of the front panel unit is made same size as a mating face of the base unit; and the recess formed in the dashboard is made so that a part of the front panel unit, more specifically the top thereof, projects from a wall Dw of the dashboard D, as viewed from side, when the front panel unit is attached to the base unit. With this, it becomes easy for the user to attach the front panel unit to the base unit and detach it therefrom.

According to the sixth aspect of the invention, in the navigation apparatus having: a base unit that is accommodatable in a housing formed in a dashboard D at a driver's seat of a vehicle and is equipped with at least a microcomputer; and a front panel unit that is attachable to and detachable from the base unit and is equipped with at least a display displaying map data and a microcomputer performing a navigation function to indicate a determined location of the vehicle on the map data, it is configured such that a front surface of the front panel unit is made same size as a mating face of the base unit; a recess is formed in the dashboard D; and a top of the front panel unit projects beyond the recess, as viewed from side, when the front panel unit is attached to the base unit. With this, the degree of freedom of front panel unit attachment/detachment with respect to the base unit is improved without sacrificing the appearance of the navigation apparatus and also the size of the display can be increased. Further, since a top of the front panel unit projects beyond the recess, as viewed from the side, when the front panel unit is attached to the base unit, the bottom part of the front panel unit can be remained in the recess, thereby enabling to prevent accidental fall-off of the front panel unit. Furthermore, it becomes easy for the user to grasp the front panel unit with the hands and attach it to the base unit or detach it therefrom.

According to the seventh aspect of the invention, in the apparatus, since a bottom surface of the recess is made horizontal, in addition to the foregoing effects, it becomes possible to prevent accidental fall-off of the front panel unit further reliably.

According to the eighth aspect of the invention, in a navigation apparatus having: a base unit that is accommodatable in a housing formed in a dashboard D at a driver's seat of a vehicle and is equipped with at least a microcomputer; and a front panel unit that is attachable to and detachable from the base unit and is equipped with at least a display displaying map data and a microcomputer performing a navigation function to indicate a determined location of the vehicle on the map data, it is configured such that a front surface of the front panel unit is made same size as a mating face of the base unit; partitions are provided on opposite sides of the front panel unit; and one of the partitions on steering wheel side is formed to project more with respect to the front panel unit than other of the partitions not on the steering wheel side. With this, the degree of freedom of front panel unit attachment/detachment with respect to the base unit is improved without sacrificing the appearance of the navigation apparatus and also the size of the display can be increased. Further, it is possible to prevent light from the liquid crystal panel of the front panel unit from reflecting off adjacent indicators.

According to the ninth aspect of the invention, in the apparatus, since the display occupies 70% or greater of length of the from panel unit in a lateral direction, the size (area) of the display formed in the front panel unit can be increased to further improve viewability.

According to the tenth aspect of the invention, in a navigation apparatus having: a base unit that is accommodatable in a dashboard D at a driver's seat of a vehicle and is equipped with at least a microcomputer; and a front panel unit that is attachable to and detachable from the base unit and is equipped with at least a display displaying map data and a microcomputer performing a navigation function to indicate a determined location of the vehicle on the map data, it is configured such that a front surface of the front panel unit is made same size as a mating face of the base unit; a surface of the dashboard D is formed with a recess of U-shape, as viewed from front, to accommodate the base unit of laterally elongated rectangular shape; the front panel unit is made attachable to the base unit; and a sloped surface is formed at an edge of the recess of U-shape. With this, catching of the user's sleeves and the like can be prevented without sacrificing ease of detachment.

BRIEF DESCRIPTION OF THE DRAWINGS

FIG. 5($a$) is an explanatory view of a vehicle driver's seat and FIG. 5($b$) is a side view thereof showing the vicinity of the steering wheel.

FIG. 20(*a*) is an exploded view of the arm unit shown in FIG. 15 etc. and FIG. 20(*b*) is an explanatory view showing the rotation about the X axis.

FIG. 21(*b*) is an explanatory view showing the rotation about the Y axis.

FIG. 22(*b*) is an explanatory view showing the rotation about the Z axis.

BEST MODES FOR CARRYING OUT THE INVENTION

Best modes for carrying out the navigation apparatus according to this invention are explained with reference to the attached drawings in the following.

First Embodiment

Figure 1:
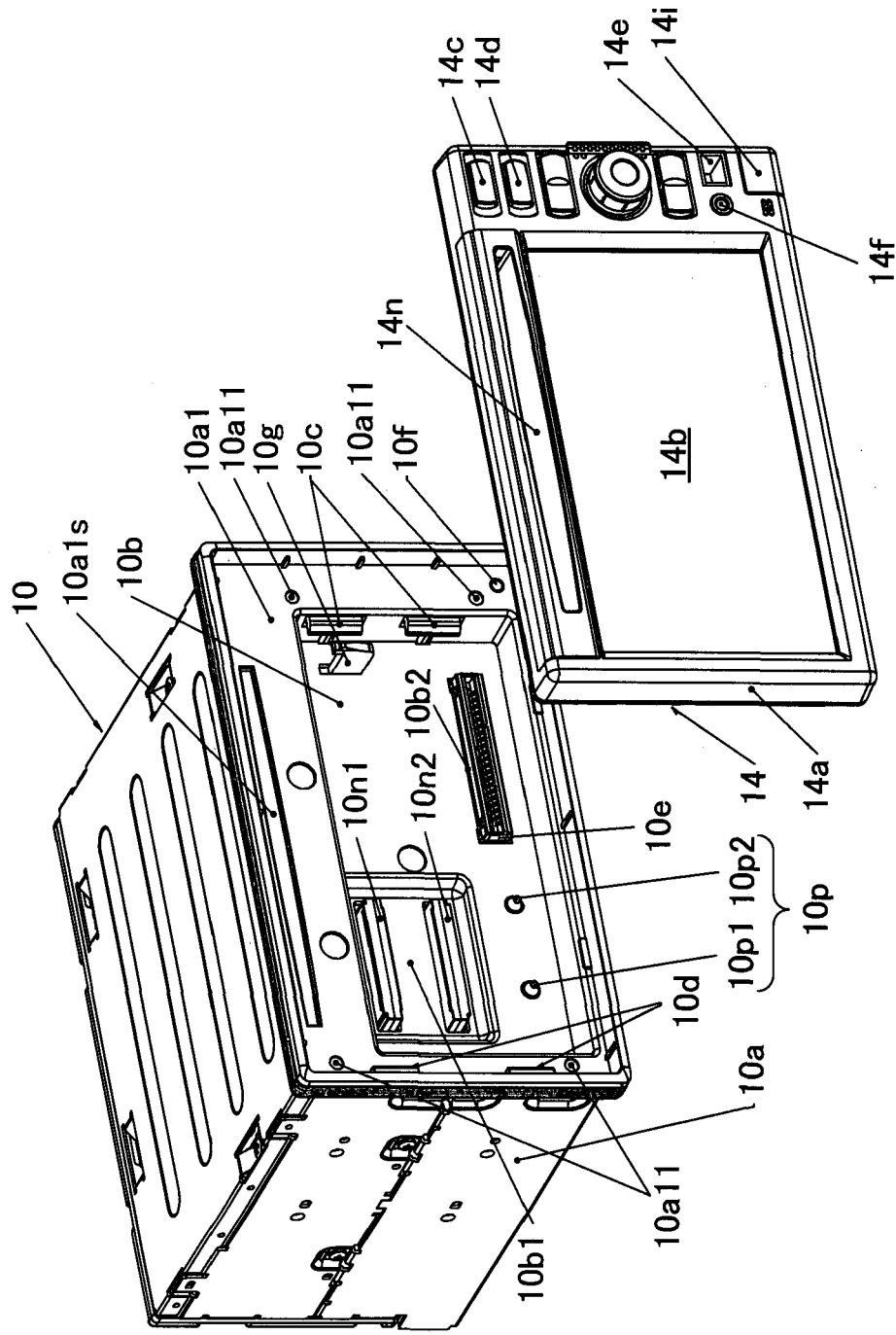
FIG. 1 is a perspective view from the front of a base unit and front panel unit of a navigation apparatus according to a first embodiment of this invention.
Figure 2:
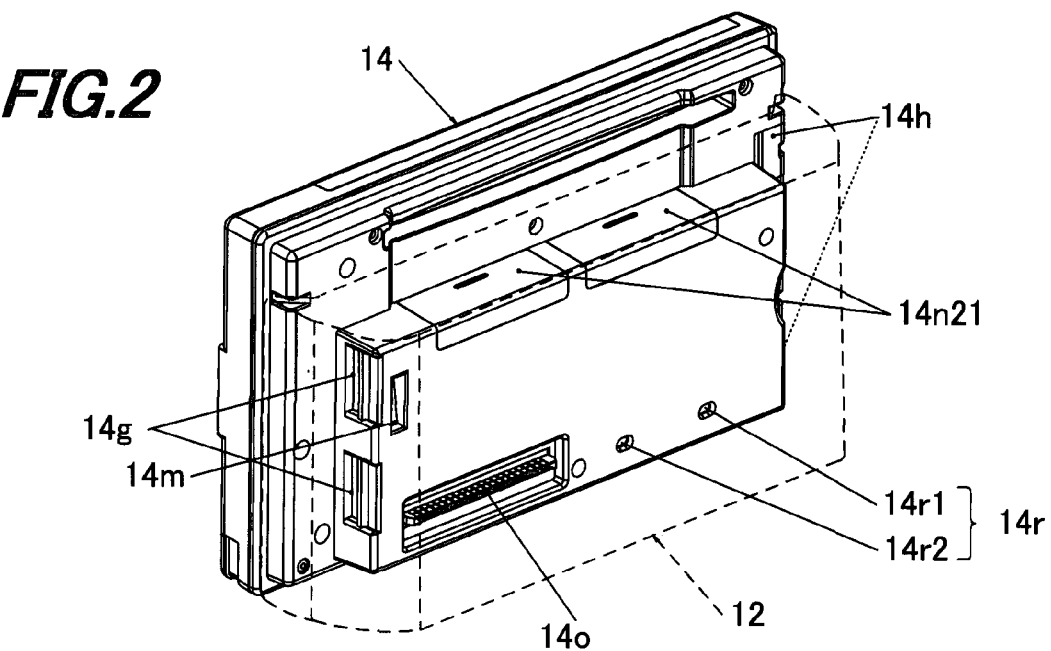
FIG. 2 is a perspective view from the rear of the front panel unit shown in FIG. 1.
Figure 3:
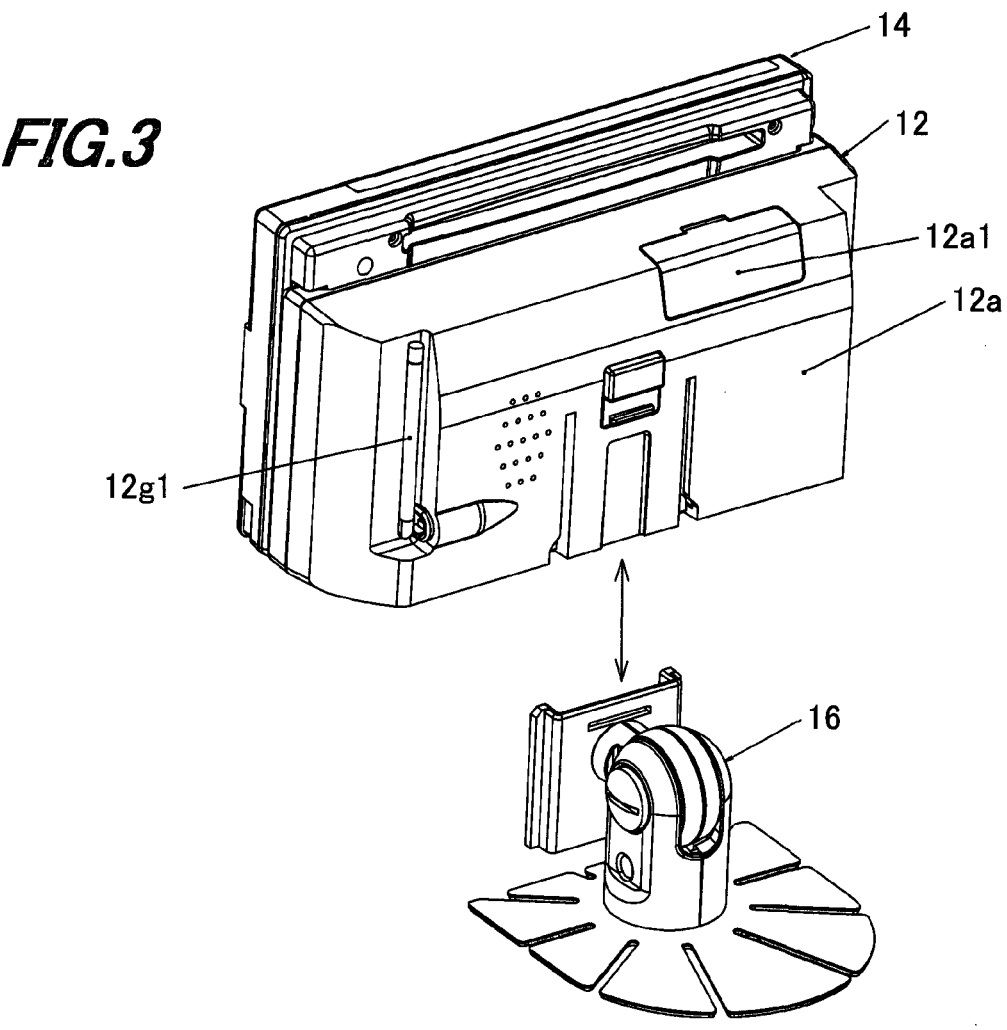
FIG. 3 is a perspective view of the front panel unit (rear side) shown in FIG. 1, a cradle unit and a cradle unit attachment arm.
Figure 4:
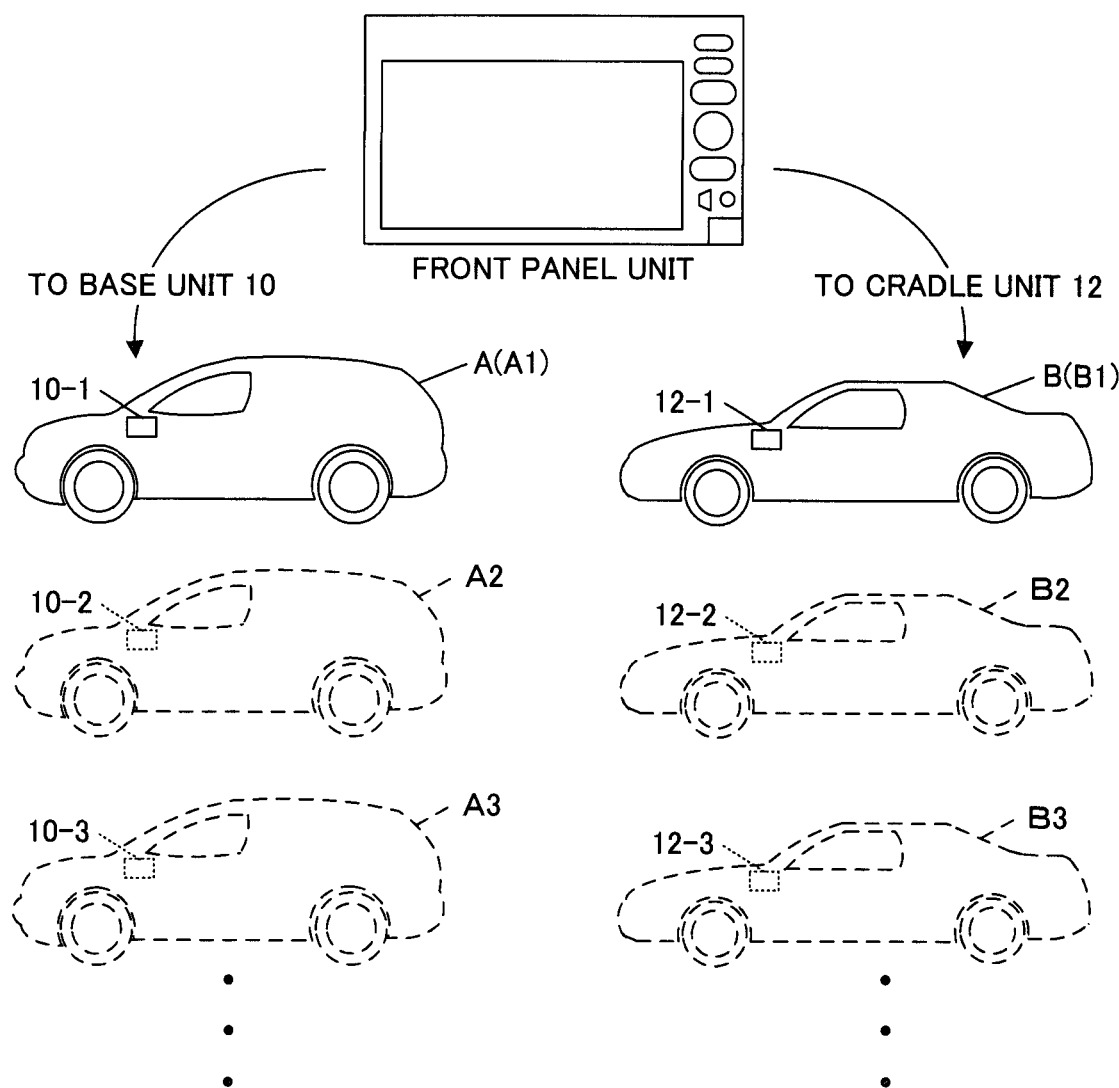
FIG. 4 is an explanatory view showing installation of the base unit shown in FIG. 1 and the cradle unit in vehicles.
Figure 6:
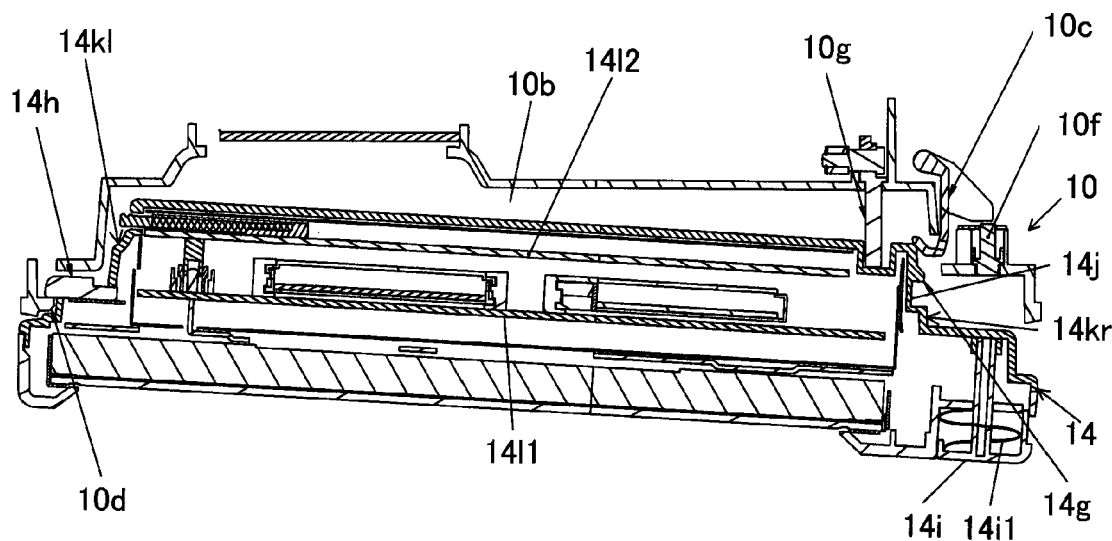
FIG. 6 is a sectional view of the base unit and front panel unit shown in FIG. 1 as seen from above, showing the condition where the front panel unit is being attached to the base unit.
Figure 7:
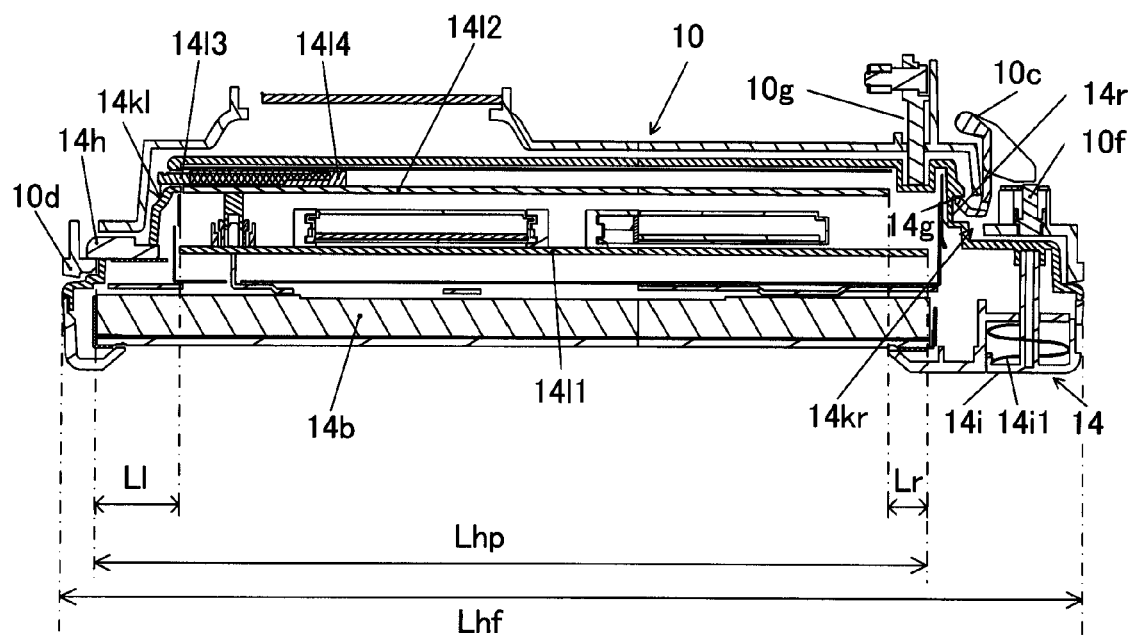
FIG. 7 is a sectional view of the base unit and front panel unit shown in FIG. 1 as seen from above, showing the condition where the front panel unit is attached to the base unit.
Figure 8:
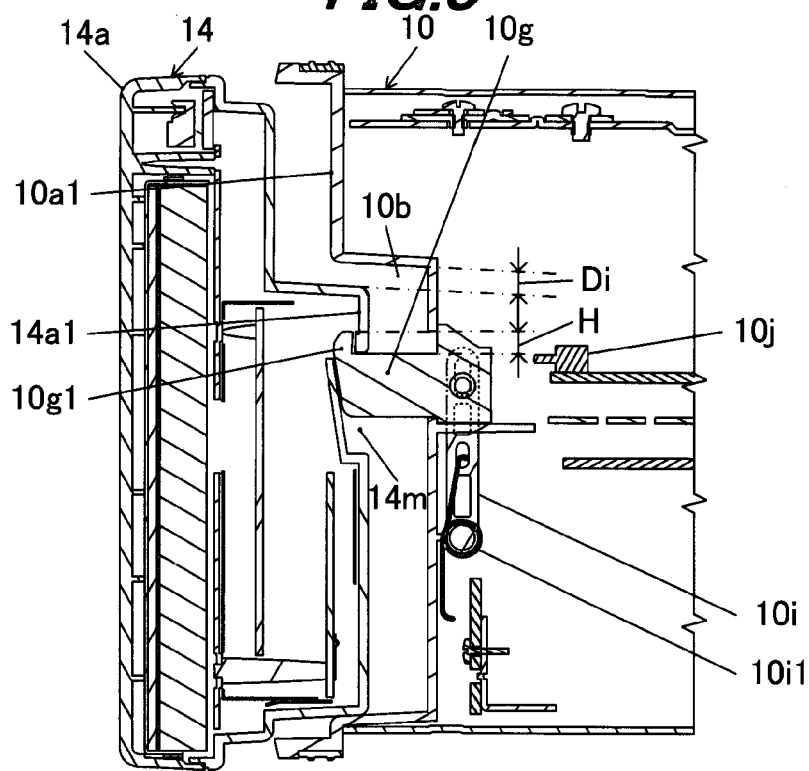
FIG. 8 is a local sectional view of the base unit and front panel unit as seen from the right side, showing the condition where the front panel unit is being attached to the base unit.
Figure 9:
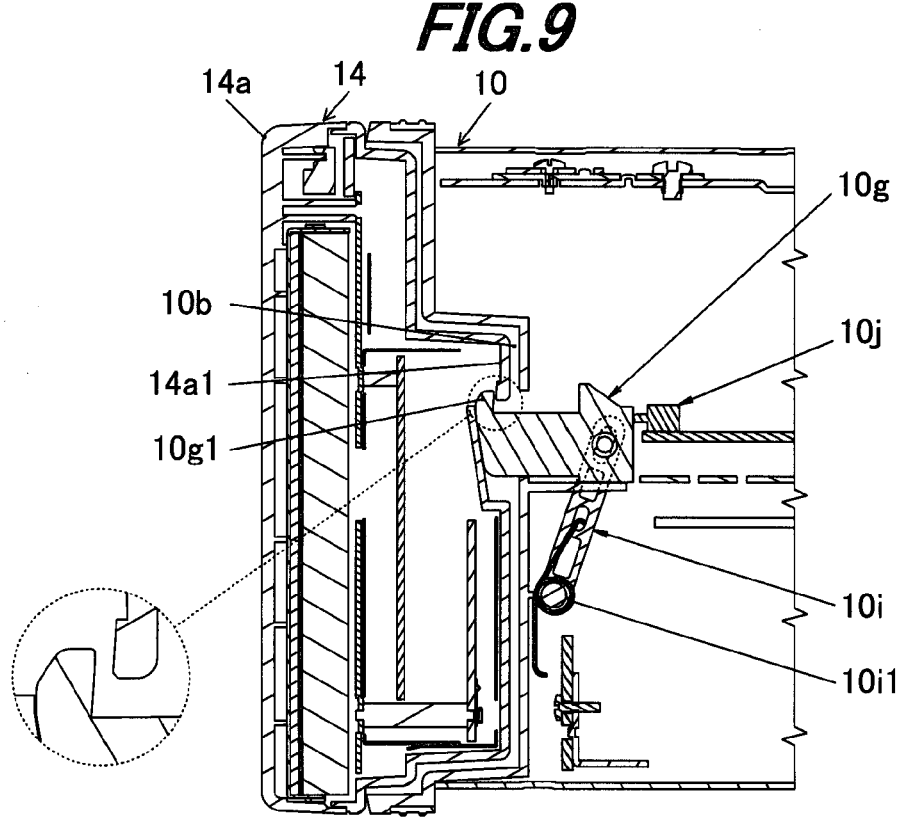
FIG. 9 is a local sectional view of the base unit and front panel unit as seen from the right side, showing the condition where the front panel unit is attached to the base unit.

FIG. 1 is a perspective view from the front of a base unit and front panel unit of a navigation apparatus according to a first embodiment of this invention, FIG. 2 is a perspective view from the rear of the front panel unit, and FIG. 3 is a perspective view of the front panel unit (rear side), a cradle unit and a cradle unit attachment arm. FIG. 4 is an explanatory view showing installation in different vehicles, FIG. 5(*a*) is an explanatory view of a vehicle driver's seat, FIG. 5(*b*) is a side view thereof showing the vicinity of the steering wheel, FIGS. 6 and 7 are sectional views of a base unit 10 and a front panel unit 14 as seen from above, FIGS. 8 and 9 are local sectional views of the base unit 10 and front panel unit 14 as seen from the right side, and FIGS. 10(*a*), 10(*b*) and 10(*c*) are explanatory views of the front panel unit 14.

As illustrated, the navigation apparatus according to this embodiment of the invention is equipped with the base unit 10 fastened to or built into (fastenable to/in) the dashboard D (instrument panel) of a vehicle A and supplied with operating power from a power supply (battery) of the vehicle A, the cradle unit 12 fastened (fastenable) on the dashboard D of a vehicle B and supplied with operating power from a power supply (battery) of the vehicle B, and the front panel unit 14 attachable/detachable to/from the base unit 10 or cradle unit 12. The vehicle A and vehicle B are automobiles.

The navigation apparatus according to this embodiment is basically the combination of the base unit 10 and front panel unit 14. However, an application in which the front panel unit 14 is attached to the cradle unit 12 is also acceptable. As shown in FIG. 4, the advantages of this apparatus can be enhanced if units 10-1, 10-2, 10-3 . . . or cradle units 12-1, 12-2, 12-3 . . . are removably installed in associated vehicles A1, A2, A3 . . . or B1, B2, B3 . . . , and the user uses the apparatus after presetting the front panel unit 14 to his or her personal screen settings and switching it to correspond to the ID number of the associated base unit 10 or cradle unit 12.

The base unit 10 has the overall shape of a box and is equipped with a base unit case 10*a* that looks like a laterally long rectangle when fastened to the dashboard of the vehicle A. It internally accommodates a board or the like on which is mounted, inter alia, a microcomputer enabling operation of audio equipment of the vehicle A. The front of the base unit case 10*a* is formed to 2DIN (DIN: Deutsches Institut für Normung) size and most of it is sunken to form a recess 10*b*, while part thereof is further sunken to form a bottommost recess 10*b*1. The remaining recessed part 10*a*1 of the front of the base unit case 10*a* is formed shallower than the recess 10*b*.

The front panel unit 14 has a size about the same as or somewhat larger than the front (mating face) of the base unit 10 and is equipped with a plate-shaped front panel unit case 14*a* that looks like a laterally long rectangle when fastened to the dashboard of the vehicle A or B. A liquid crystal panel (display) 14*b*, also of laterally long rectangular shape, is installed in the front of the front panel unit case 14*a*, offset leftward, for displaying map data over substantially its entire area. Thus, the size of the front panel unit 14, more exactly the front panel unit case 14*a*, is made approximately the same size as the mating face of the base unit 10 and, as explained later, the liquid crystal panel 14*b* is made to occupy 70% or greater of its lateral length, thereby increasing the area of the liquid crystal panel 14*b* and enhancing visual perceptibility.

The front panel unit 14 is provided at the side of the liquid crystal panel 14*b* with a narrow-width operating panel section equipped with switches operable by the user (operator) including, for example, a destination input switch 14*c* and a current location input switch 14*d*. Symbols 14*e* and 14*f* designate jacks for connecting an iPod (registered trademark) and analog audio equipment, respectively. The operating panel section is provided on the right side as illustrated in the case of installation in a right-hand drive vehicle.

The front panel unit 14 is configured to be detachably mounted in the recessed part 10*a*1 and recess 10*b* of the front of the base unit case 10*a* (to be freely attached and detached). Of the operations of the attach/detach mechanism, the mounting will be explained first. As shown in FIG. 2, the back of the front panel unit 14 is formed on the left side with two vertically spaced fixed claws 14*g* and on the right side with two vertically spaced movable catch slides 14*h* (the lower one not being visible).

Note that in this specification the "vertical" direction is that on the vertical axis (gravitational axis) of the base unit 10, front panel unit 14 and the like in their condition as fastened to the vehicle A or B and the "lateral" direction is a direction perpendicular thereto.

Two vertically spaced movable lock levers 10*c* are provided on the right side of the recess 10*b* of the base unit 10, and two vertically spaced fixed claws 10*d* are formed on the left side of the peripheral edge forming the recessed part 10*a*1 of the base unit 10. As shown in FIGS. 6 and 7, when the front panel unit 14 is attached, the fixed claws 14*g* of the front panel unit 14 engage the lock levers 10*c*, and the fixed claws 10*d* engage the catch slides 14*h*.

As shown in FIG. 1, a groove 10*b*2 is formed in the recess 10*b* of the base unit 10 at a location offset downward from the center and has a connector 10*e* installed therein. When the front panel unit 14 is attached to the base unit 10, operating power from the power supply (battery) of the vehicle A is supplied through the connector 10*e* and data and control signals of various sensors, including a GPS signal receiver (explained later), AV equipment and the like are sent/received therethrough.

The detachment will be explained next. A detach button (mechanical button) 14*i* operable by the user is provided under the jacks 14*e* and 14*f* in the operating panel section on the front surface of the front panel unit 14, i.e., toward the direction opposite from the direction (leftward) in which the liquid crystal panel 14*b* is offset. The lock levers 10*c* are provided on the base unit 10 at locations associated with the detach button 14*i*.

When the user presses the detach button 14*i* in the condition where the front panel unit 14 is attached to the base unit 10, the resulting movement is transmitted to the lock levers 10*c* through a detach knob 10*f* provided in the base unit 10, whereby, as shown in FIG. 6, the lock levers 10*c* are moved outward to disengage them from the fixed claws 14*g*.

As shown in FIGS. 6 and 7, the catch slides 14*h* of the front panel unit 14 are only urged outward (leftward in FIG. 6 etc.) by spring force to be engaged with the fixed claws 10*d* of the base unit 10. Therefore, if the engagement between the lock levers 10*c* and the fixed claws 14*g* on the other side (right side in FIG. 6 etc.) is released and the user moves the front panel unit 14 (rightward in FIG. 6 etc.) by greater than the overlap span of the catch slides 14*h* and the fixed claws 10*d*, the engagement with the base unit 10 is released to enable detachment of the front panel unit 14 from the base unit 10.

Irrespective of whether or not the lock levers 10*c* are engaged with (inserted in) the front panel unit 14, they do not catch on anything else because they are constantly within the recess 10*b* of the base unit 10, i.e., do not project.

As shown in FIG. 1, a release lever 10*g* is provided in the recess 10*b* in the front of the base unit 10. As illustrated in FIGS. 8 and 9, when the front panel unit 14 is attached, the release lever 10*g* is thrust through a hole 14*m* by a kick lever 10*i* loaded with a spring 10*i*1 to engage the front panel unit 14 and bias it in the direction of ejection. A panel unit detection switch 10*j* is attached to the release lever 10*g* and produces outputs or signals in response to the location of the release lever 10*g*, i.e., the mounting and detachment of the front panel unit 14; for example, produces an ON signal when the front panel unit 14 is attached and an OFF signal when it is detached.

Further, as shown in FIG. 1, four vibration-proofing elastic members, e.g., rubber dampers 10*a*11 made of rubber, are installed in the recessed part 10*a*1 of the base unit 10. More specifically, the right side of the recessed part 10*a*1 is provided with two vertically spaced rubber dampers 10*a*11 outward of the location of the lock levers 10*c* and the left side is provided with two that are vertically spaced outward of the location of the fixed claws 10*d*, thereby preventing vibration from propagating between the base unit 10 and the front panel unit 14.

As shown in FIGS. 2 and 3, the cradle unit 12 is attached on the back of the front panel unit 14 to be detachable from the front panel unit 14. The attach/detach mechanism between the front panel unit 14 and cradle unit 12 is not illustrated, but it is similar to the attach/detach mechanism between the front panel unit 14 and base unit 10 explained with reference to FIG. 1, and the front panel unit 14 is detachably attached to the cradle unit 12 via lock levers, catch slides and so on. The cradle unit 12 is also equipped with a panel unit detection switch.

The cradle unit 12 is fastened to the dashboard of the vehicle B through a cradle unit attachment arm (hereinafter called "attachment arm") 16. The cradle unit 12 is equipped with a cradle unit case 12a that is shorter in height and greater (deeper) in depth than the front panel unit case 14a and internally accommodates, inter alia, a board on which a microcomputer and the like are mounted. Symbol 12a1 designates an openable cover.

As shown in FIG. 5, the front panel unit 14 of the navigation apparatus according to this embodiment is either mounted near the driver's seat of the vehicle A or B, more exactly is installed in the base unit 10 (not visible in FIG. 5) built into the dashboard D, or installed on the dashboard D via the cradle unit 12. In either location, the front panel unit 14 is installed at a height near that of a windshield 18.

More concretely, when the front panel unit 14 is attached to the base unit 10, the longitudinal center line 14bc of the liquid crystal panel of the front panel unit 14 is, as viewed by the user (of average sitting height), slightly higher than the rotation center SWc of the steering wheel SW and considerably higher than the rotation center SHc of the steering shaft at the dashboard plane (substantially the front plane of the front panel unit 14), i.e., the rotation center SHc is located toward the undersurface of the front panel unit 14. Symbol SL designates a transmission shift lever.

As set out in the forgoing, the front panel unit 14 of the navigation apparatus according to this embodiment is configured to be attachable/detachable to/from the base unit 10 or cradle unit 12. The attach/detach mechanism between the front panel unit 14 and base unit 10 will be explained in detail with reference to FIG. 6 and ensuing figures.

As set out in the foregoing, FIGS. 6 and 7 are sectional views of a base unit 10 and a front panel unit 14 as seen from above, with FIG. 6 showing the front panel unit 14 being attached to or detached from the base unit 10 and FIG. 7 showing the front panel unit 14 attached to the base unit 10.

FIGS. 8 and 9 are local sectional views of the base unit 10 and front panel unit 14 as seen from the right side, with FIG. 8 being a local sectional view showing the front panel unit which is being attached to the base unit and FIG. 9 being a local sectional view showing the condition where the front panel unit is attached.

As shown in FIG. 6, during mounting of the front panel unit 14 in the base unit 10, the fixed claws 14g on the right side advance while pushing the lock levers 10c outward (rightward in the drawing), thereby being fixed on the right side (in FIG. 6) by engagement of the lock levers 10c with indentations (and shoulders) 14j formed on the base side of the fixed claws 14g. The lock levers 10c are urged in the engagement direction by springs not shown in the drawing.

The catch slides 14h provided on the left side (in FIG. 6) of the front panel unit 14 can project and retract laterally as viewed in the drawing and are urged leftward by springs. The catch slides 14h once retract to the right when contacted and pushed by the fixed claws 10d formed on the base unit 10 and thereafter, upon passing the fixed claws 10d with further advance of the front panel unit 14 toward the side of the base unit 10, project (return) to the left under spring force to engage the fixed claws 10d, as shown in FIGS. 6 and 7, thereby also fixing the left side (in the drawing).

As shown in FIG. 6, when viewed from above, the front panel unit 14 protrudes at the back, while its left wall section 14k1 and right wall section 14kr are configured to make an overall trapezoidal shape to correspond to the side walls of the recess 10b of the base unit 10, so that when the front panel unit 14 is attached to the base unit 10, movement in the direction of the base unit 10 is guided to facilitate the mounting.

Further, as shown in FIG. 7 (and FIG. 6), the front panel unit 14 has installed inside thereof a monitor board 14/1 for controlling the operation of the liquid crystal panel 14b and a printed circuit board 14/2 on which is mounted, inter alia, a microcomputer for controlling navigation functions. The lateral lengths of the boards 14/1 and 14/2 are Ll and Lr smaller than that of the liquid crystal panel 14b, thus providing a configuration for accommodating the catch slides 14h of the front panel unit 14 in the so-reserved space as overlapped in their fore-aft (thickness, depth) positional relationship. Symbol 14/3 in the drawing designates an external RAM and 14/4 a connector thereof In other words, the boards 14/1 and 14/2 are Ll and Lr shorter than the liquid crystal panel 14b on the left side and right side, respectively, to provide a configuration for left side installation of the catch slides 14h and torsion springs (not illustrated) for pressing them in the meshing direction from behind, of the meshing mechanism comprising the catch slide 14h, leaf spring components and the fixed claws 10d, and right side accommodation of the release lever 10g. Thus, the catch slides 14h and boards 14/1 and 14/2 are accommodated to overlap the liquid crystal panel 14b in their fore-aft (thickness, depth) positional relationship.

The release lever 10g will be explained further with reference to FIGS. 8 and 9. As explained earlier, the release lever 10g is installed in the recess 10b of the base unit 10 via the kick lever 10i loaded with the spring 101i1. The release lever 10g is L-shaped as viewed from the side. Its leading side inclines downward to the rear as seen in the drawing and its upper side (base unit 10 side) is formed with a hook 10g1 that curves upward to the rear.

As shown in FIGS. 8 and 9, when the front panel unit 14 is attached to the base unit 10, the aforesaid configuration of the leading side of the release lever 10g results in the front panel unit case 14a being shifted upward (in the drawing) by the height H of the hook 10g1, whereby the wall 14a1 passes over the hook 10g1 to readily assume the engaged state shown in FIG. 9.

Regarding detachment, as explained earlier, when the detach button 14i is pressed in the state where the front panel unit 14 is attached to the base unit 10, the force input with this as the point of effort operates via the detach knob 10f located in the base unit 10 to move the lock levers 10c, thereby releasing the engagement with the fixed claws 14g. The detach button 14i is constantly urged outward by a spring 14i1.

Further, since the catch slides 14h on the left side (in FIG. 6) are urged leftward by spring force to engage the fixed claws 10d of the base unit 10, they act as fulcrums, but when the right side is opened and the front panel unit 14 is moved slightly rightward, the engagement with the base unit 10 is released and the front panel unit 14 is detached from the base unit 10.

At this time, the release lever 10g serves as the point of application that acts to kick the front panel unit 14 out of the base unit 10.

In other words, this embodiment is configured so that when the user presses the detach button 14i against the spring 141 to push it to a suitable point of its total stroke (defined as 5 mm, for example), say to 3 mm, namely to around 60%, the engagement between the lock levers 10c and the fixed claws 14g is released, whereafter the release lever 10g is pushed by a distance corresponding to the remaining 2 mm to fully compress the spring 14*i*1 and the front panel unit 14 is concomitantly moved forward (in the direction of detaching the front panel unit 14 from the base unit 10).

Specifically, the spring force (urging force) of the spring 10*i*1 that urges the release lever 10*g* forward (in the detaching direction) via the kick lever 10*i* is set to a strength enabling further compression of the spring 14*i*1 of the detach button 14*i* on the front panel unit 14 side when the attachment of the base unit 10 with the front panel unit 14 is released by operation of the detach button 14*i*. Still more specifically, the urging force of the spring 10*i*1 is set larger, e.g., 3 times or more larger, than that of the spring 14*i*1 of the detach button 14*i*.

Further, as is clear from FIG. 7 (and FIG. 6), the indentations (and shoulders) 14*j* of the fixed claws 14*g* for engaging the lock levers 10*c* on the right side of the front panel unit 14 are formed at deeper locations (toward the base unit 10 when attached) than the locations where the catch slides 14*h* for engaging the fixed claws 10*d* of the base unit 10 on the left side are installed, i.e. the formation sites are differentiated between the left and right in FIG. 7. As a result, the provision of the detach button 14*i* etc. on the right side is facilitated and the attachment/detachment of front panel unit 14 and base unit 10, particularly the detachment from the base unit 10, is made easy.

Moreover, since the height H of the hook 10*g*1 of the release lever 10*g* is formed smaller that the clearance Di between the base unit case 10*a* and the front panel unit case 14*a*, the clearance Di has a gap exceeding the height of the hook 10*g*1, thus making it easy to detach the front panel unit 14 from the base unit 10.

In addition, the direction of movement of release lever 10*g* is made different from that of the lock levers 10*c*, so that they do not interfere with each other and no shift occurs in their contact points at the time the release lever 10*g* ejects the front panel unit 14.

As indicated by a broken line in FIG. 8, the tip of the release lever 10*g* is inside the recess 10*b* and does not extend beyond the recessed part 10*a*1, i.e., since the configuration is such that the release lever 10*g* does not project from the recessed part 10*a*1, it does not catch on other objects or become a hindrance irrespective of whether or not the front panel unit 14 is engaged with the base unit 10.

The center of gravity of the front panel unit 14 will now be explained. The front panel unit 14 is shown in a side view in FIG. 10(*a*), in a cross-sectional view in FIG. 10(*b*), and in a front view in FIG. 10(*c*).

Figure 10:
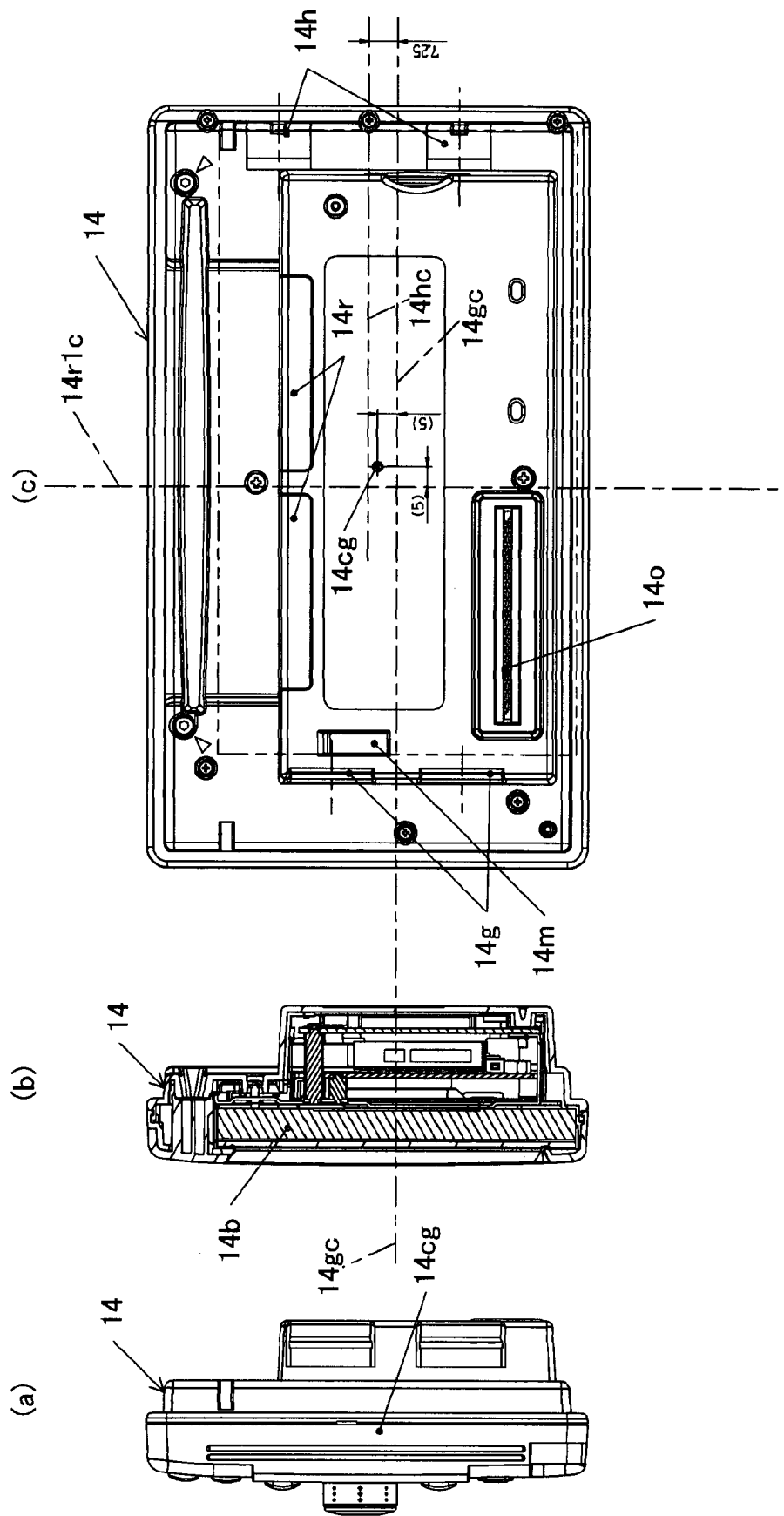
FIG. 10(*a*) is a side view of the front panel unit, FIG. 10(*b*) is a sectional view thereof and FIG. 10(*c*) is a front view of the rear side thereof.

In FIG. 10(*c*), symbol 14*hc* designates a centerline passing horizontally midway between the two vertically spaced catch slides 14*h*, symbol 14*gc* designates a centerline passing horizontally midway between the two vertically spaced fixed claws 14*g*, symbol 14*cg* designates the center of gravity of the front panel unit 14, and 14*rlc* designates a centerline vertically bisecting the front panel unit 14. As shown in FIG. 10(*b*), the centerline passing midway between the fixed claws 14*g* is also a centerline horizontally bisecting the liquid crystal panel 14*b*.

As is clear from FIG. 10, the center of gravity 14*cg* of the front panel unit 14 is located between the two types of vertically-spaced, laterally-extending centerlines 14*hc* and 14*gc*, i.e., the configuration is such that the center of gravity 14*cg* is located near the centerlines 14*hc* and 14*gc*, so that when the front panel unit 14 is attached to the base unit 10, it can be stably retained even when subjected to shaking (vibration) in any direction of the vehicle A because the two different types of centerlines 14*hc* and 14*gc*, together with two-level positioning of the catch slides 14*h* and fixed claws 14*g*, inhibit movement in a rotational direction.

As is clear from a comparison of FIGS. 10(*c*) and 8, the respective overlap spans (depthwise lengths) of the two vertically spaced catch slides 14*h* and fixed claws 14*g* are established to be longer than the clearance Di shown in FIG. 8. Further, the respective overlap spans (vertical lengths) of the two vertically spaced fixed claws 10*d* and lock levers 10*c* on the base unit 10 side that engage the two vertically spaced catch slides 14*h* and fixed claws 14*g* are also established to be longer than the clearance Di shown in FIG. 8. As a result, the front panel unit 14 can be reliably attached to the base unit 10 and, in addition, the front panel unit 14 does not easily fall off during its detachment.

As shown in FIG. 1 (and FIG. 11 as well as FIG. 22 discussed later), a slot 14*n* is formed above the liquid crystal panel 14*b* of the front panel unit 14 to lie level with the upper longitudinal edge thereof and extend to a location short of the operating panel section, and a configuration is provided such that when the front panel unit 14 is attached to the base unit 10, the user can insert a CD or DVD (hereinafter collectively called "CD") 20 through the slot 14*n* and a similarly shaped base-side slot 10*a*1*s* formed in the recessed part 10*a*1 of the base unit 10.

Figure 11:
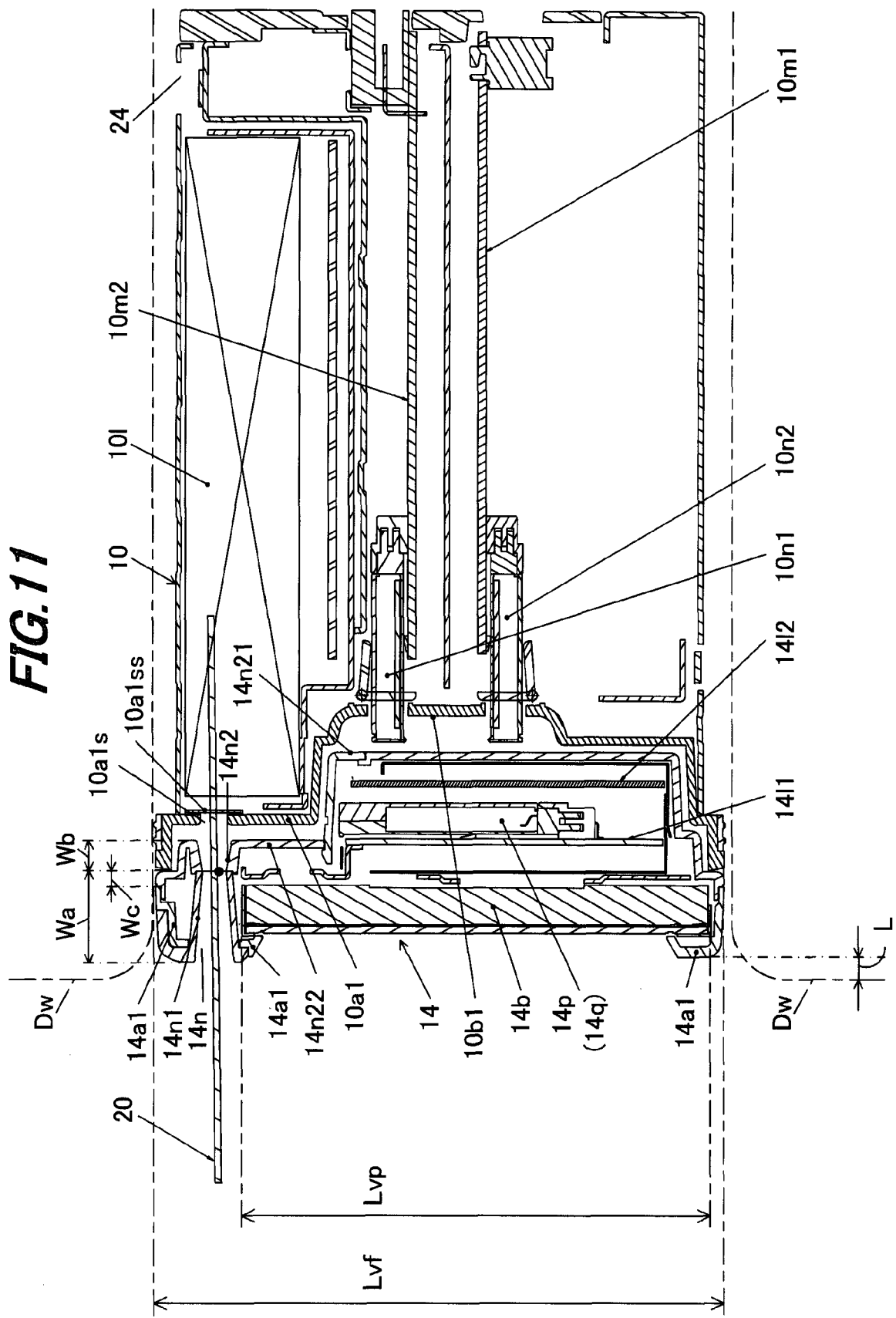
FIG. 11 is a right side sectional view of the base unit with the front panel unit shown in FIG. 1 mounted.

FIG. 11 is a side sectional view of the base unit 10 with the front panel unit 14 attached.

As illustrated, the front panel unit case 14*a* protrudes greatly at the rear side in the region corresponding to the recess 10*b* of the base unit case 10*a* so as to be accommodatable in the recess 10*b* and protrudes slightly at the periphery, including the upper side, to be complementary to the remaining recessed part 10*a*1 of the base unit case 10*a*, thus being shaped for mounting in the base unit case 10*a*.

Figure 22:
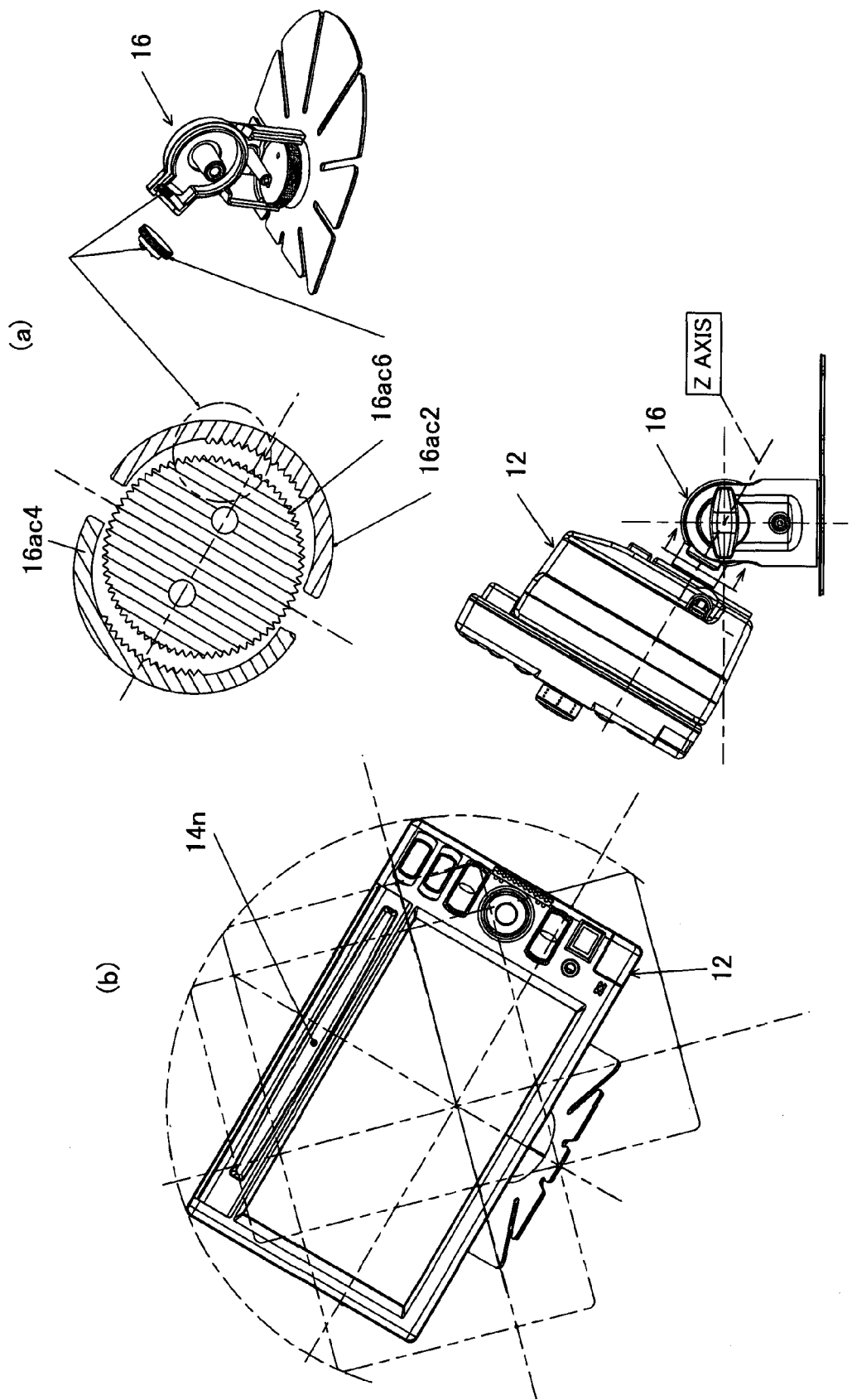
FIG. 22(*a*) is an exploded view of the arm unit shown in FIG. 15 etc.

As viewed from the front, the slot 14*n* formed in the front panel unit 14 is, as well shown in FIG. 22 discussed later, shaped to bulge slightly more at the middle than at the opposite ends and, as seen from the side, is formed of a tapered section 14*n*1 that narrows gradually from the inlet inward and is followed by flared section 14*n*2 that thereafter expands gradually toward the base unit 10 side. The tapered section 14*n*1 is incorporated in the front wall 14*a*1 of the front panel unit case 14*a*.

The flared section 14*n*2 following the tapered section 14*n*1 is configured to be accommodated in the recessed part 10*a*1 and be positioned adjacent to the base-side slot 10*a*1*s* formed in the recessed part 10*a*1 when the front panel unit 14 is attached to the base unit 10.

After a CD 20 inserted through the slot 14*n* has passed through the slot 14*n* and base-side slot 10*a*1*s*, it is sent from the remaining recessed part 10*a*1 of the recess 10*b* of the base unit case 10*a* to a CD (or DVD) apparatus 10*l* installed facing the rear end thereof.

As illustrated, the aforesaid boards 14*l*1 and 14*l*2 installed in the front panel unit 14 are formed relatively small in height and thus configured so as not to interfere with the CD (or DVD) apparatus 10*l*. Note that symbol 10*m*1 designates a board for mounting the aforesaid microcomputer installed in the base unit 10 and symbol 10*m*2 a sub-board.

Further, symbol 10*n*1 designates an add-on module for receiving ground digital television and 10*n*2 designates an add-on module for receiving traffic information. The add-on modules 10*n*1 and 10*n*2 are installed to be pluggable and unpluggable through the bottommost recess 10*b*1.

In the example shown with regard to FIG. 5(*a*), a recess 24 of the dashboard D for accommodating the base unit 10 and front panel unit 14 is formed so that when the front panel unit 14 is attached to the base unit 10 embedded in the dashboard, the front of the wall 14*a*1 of the front panel unit case 14*a* is set back from the wall Dw by a distance L.

The width Wa of the tapered section 14*n*1 is formed larger than the width Wb of the flared section 14*n*2, and the part of the front face of the back side cover of the front panel unit case 14*a* that contacts the wall 14*a*1 is formed forward of the part thereof that contacts the tapered section 14*n*1 by width Wc. When the CD 20 is ejected from the CD apparatus 10*l*, it inclines somewhat downward but the aforesaid configuration enables the amount of inclination to be restricted to 10 degrees or less.

Specifically, since to restrict the amount of inclination of the CD 20 the width Wa of the tapered section 14*n*1 must be made as great as possible, the tapered section 14*n*1 in this embodiment is provided separately of the outer wall 14*a*1 and assembled with the wall 14*a*1 to extend its length by Wc.

A screen (brush) 10*a*1*ss* made of a fibrous material is provided at the base-side slot 10*a*1*s* to prevent invasion of dust and the like from the outside. Further, two laterally spaced opening/closing covers 14*n*21 are provided at regions continuous with the flared section 14*n*2 (FIG. 2), and the opening/closing covers 14*n*21 are configured to be openable to enable the user to remove a BT module (Bluetooth, module for sending and receiving 2.45 GHz radio waves) 14*p*, wireless module 14*q* using the same frequency band, and/or another system module, which modules are detachably installable in the rear interior of the front panel unit 14.

Note that, as shown in FIG. 10(*c*), space can be efficiently utilized because the two vertically spaced catch slides 14*h* and fixed claws 14*g* are installed below the slot 14*n*.

Moreover, while the BT module 14*p* or wireless module 14*q* is inserted from above by the user after removing an opening/closing cover 14*n*21 formed on the protruding section of the rear cover of the front panel unit case 14*a*, space can again be utilized effectively because, as shown in FIG. 11, the insertion by the user is facilitated by making the part of the rear cover located below the flared section 14*n*2 and facing the recessed part 10*a*1 a flat surface 14*n*22 and installing the board 14/1 to which the connectors for receiving the BT module 14*p* and wireless module 14*q* are attached in parallel with an extension of the flat surface 14*n*22.

Figure 12:
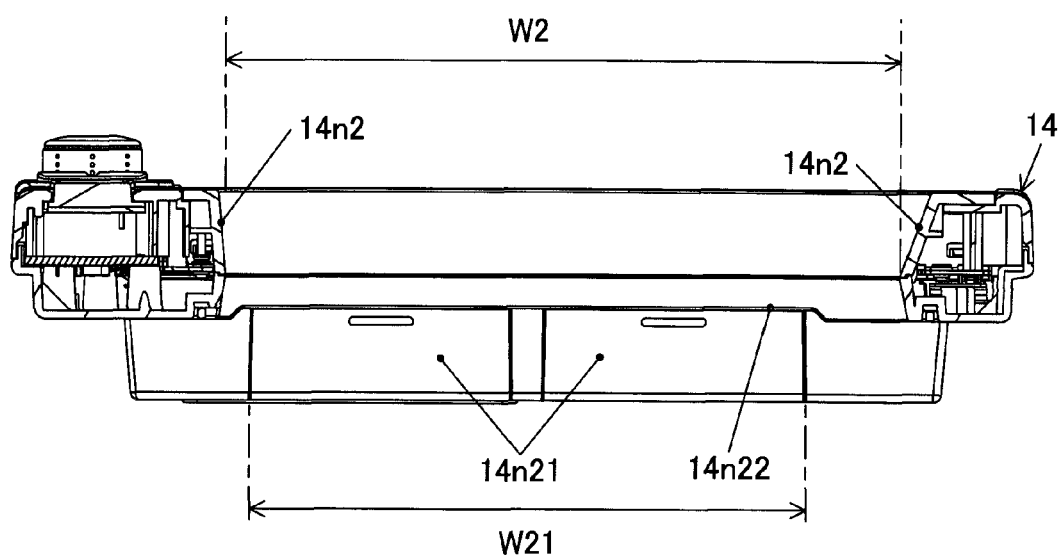
FIG. 12 is a top sectional view of the front panel unit.

FIG. 12 is a top sectional view of the front panel unit 14. As is clear from the figure, the flat surface 14*n*22 corresponding to the surface above the portion provided with the opening/closing covers 14*n*21 is set back (in the direction of the liquid crystal panel 14*b*) rearward of the location where the opening/closing covers 14*n*21 are formed, thereby reducing the projection of the protruding section of the rear cover (portion that mates with the recess 10*b* of the base unit 10).

In addition, the lateral width W21 of the part provided with the opening/closing covers 14*n*21 is formed narrower than the width W2 between the lateral ends of the flared section 14*n*2, and the opening/closing covers 14*n*21 are situated within the width W2. This also enables effective space utilization.

Further, as was indicated earlier regarding FIGS. 1 and 2, the protruding section of the rear cover (portion that mates with the recess 10*b* of the base unit 10) is formed with a flat surface, and the recessed part 10*a*1 that covers the front of the CD apparatus 10*l* is also formed with a flat surface, meaning that even when the front panel unit 14 is mounted from a position offset from the center of the base unit 10, incidences of a strong force being applied to components in the recess 10*b* at the front of the base unit 10 from a different angle are minimized and durability can be enhanced because the attachment is completed after these flat surfaces once meet.

Figure 13:
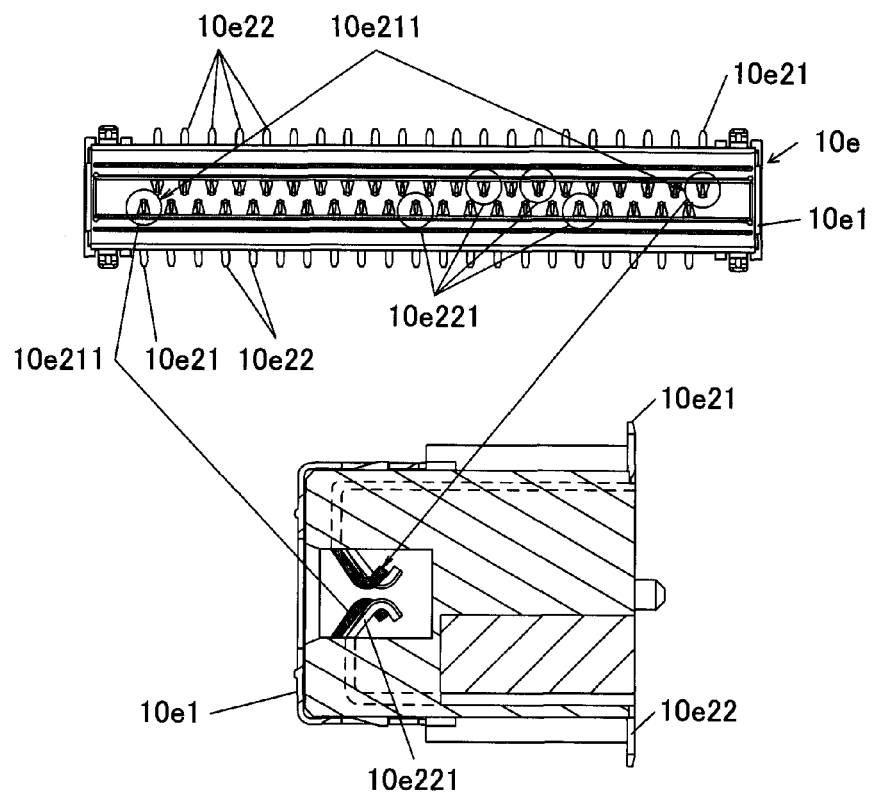
FIG. 13 is an enlarged front view of a connector installed in the base unit shown in FIG. 1.
Figure 14:
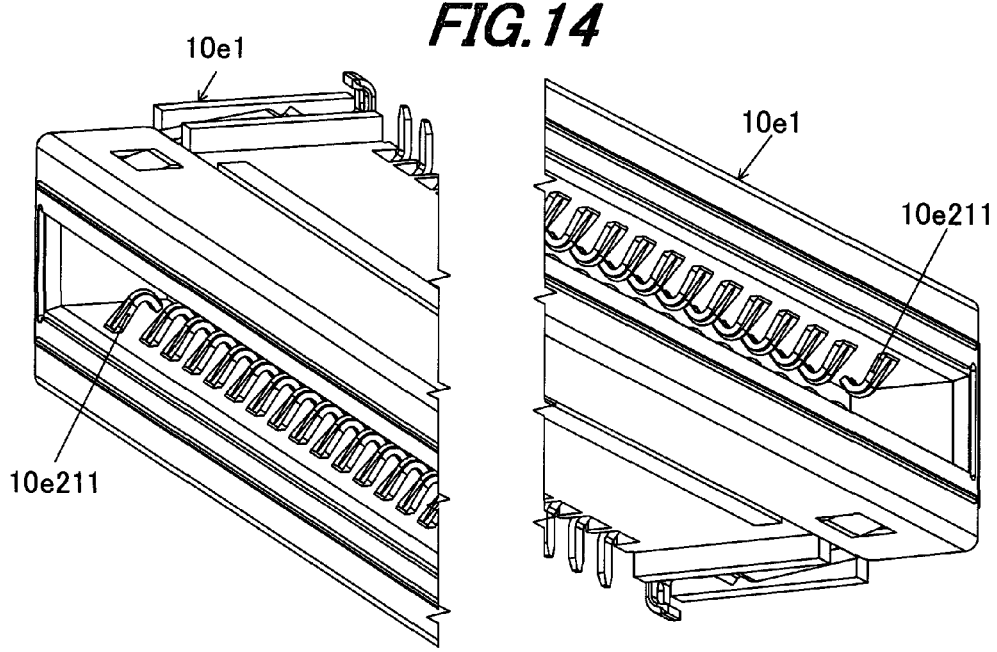
FIG. 14 is a partial enlarged perspective view of the connector installed in the base unit shown in FIG. 1.

FIG. 13 is an enlarged front view, referencing FIG. 1, of the connector 10*e* installed in the base unit case 10*a*, and FIG. 14 is a partial enlarged perspective view thereof.

As shown in FIG. 13, the connector 10*e* is equipped with a laterally long base 10*e*1 of a shape similar to that of the groove 10*b*2 (FIG. 1) formed in the recess 10*b*, and multiple independent electrical contacts 10*e*21 and 10*e*22 disposed on the base 10*e*1. As shown at the bottom of the figure, the electrical contacts 10*e*21 and 10*e*22 internally connect with 10*e*211 and 10*e*221 respectively.

The electrical contacts 10*e*211 and 10*e*221 are connected with a connector 14*o* (FIG. 2) of the front panel unit 14 and the electrical contacts 10*e*22 and 10*e*21 are connected with internal devices of the base unit 10. The contacts 10*e*211 on the left and right of the contacts 10*e*21 are ground terminals and the remaining contacts 10*e*221 are ordinary signal and power contacts.

As shown in FIGS. 13 and 14, the ground contacts 10*e*211 are disposed to project by a few millimeters relative to the ordinary contacts 10*e*221 so as to first contact their counterpart, i.e., the connector 14*o* of the front panel unit 14.

The attachment arm 16 for the cradle unit 12 shown in FIG. 3 will be explained next.

Figure 15:
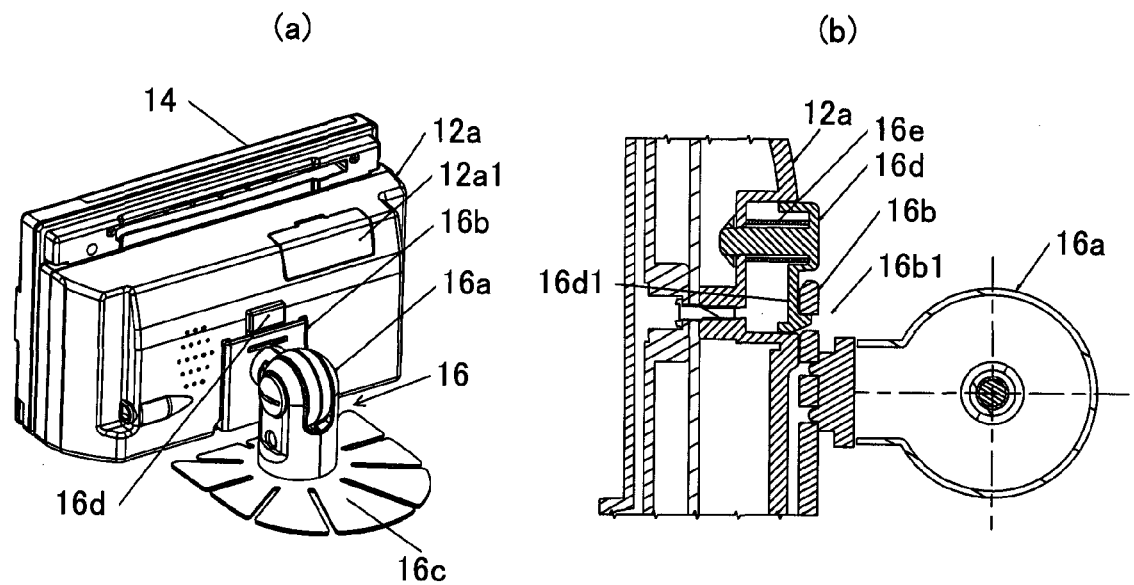
FIG. 15(*a*) is a perspective view showing the cradle unit (and front panel unit) shown in FIG. 3 as attached to an attachment arm and FIG. 15(*b*) is a local side sectional view thereof.
Figure 16:
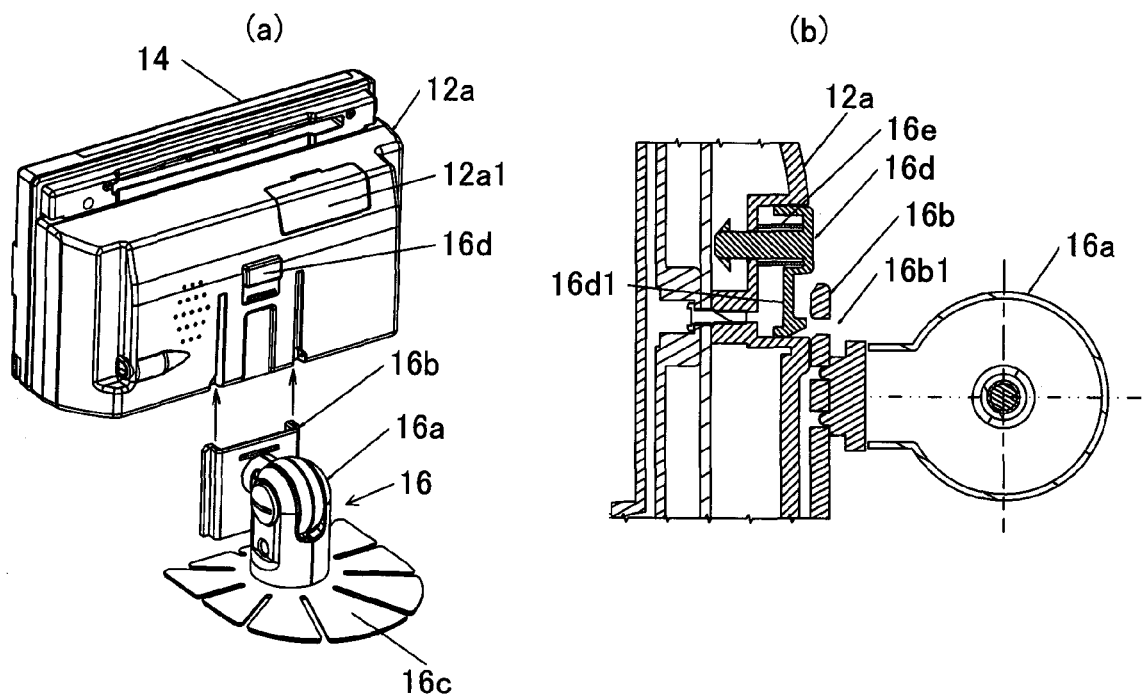
FIG. 16(*a*) is a perspective view showing the cradle unit (and front panel unit) shown in FIG. 3 as removed from the attachment arm and FIG. 16(*b*) is a local side sectional view thereof at the time of removal.

FIG. 15(*a*) is a perspective view showing the cradle unit 12 (and front panel unit 14) as attached to the attachment arm 16, FIG. 15(*b*) is a local side sectional view thereof, FIG. 16(*a*) is a perspective view showing the cradle unit 12 (and front panel unit 14) as removed from the attachment arm 16, and FIG. 16(*b*) is a local side sectional view thereof at the time of removal.

As shown in FIGS. 15(*a*) and 16(*a*), the attachment arm 16 comprises a cylindrical arm unit 16*a*, an arm holder 16*b* attached to the upper part of the arm unit 16*a*, an attachment panel 16*c* attached to the bottom of the arm unit 16*a*, and a button 16*d* attached to the cradle unit case 12*a*. The arm holder 16*b* holds the front panel unit 14 via the cradle unit 12 at a location near the middle and about half the height of the front panel unit 14. The attachment panel 16*c* is fastened by adhering it on the dashboard of the vehicle B via adhesive tape or the like (not shown).

As shown in FIGS. 15(*b*) and 16(*b*), the button 16*d* attached to the cradle unit case 12*a* is formed with a lever 16*d*1 that extends downward in the figures. The tip of the lever 16*d*1 is engageable with a hole 16*b*1 formed in the arm holder 16*b*, and when engaged, the cradle unit case 12*a* is held by the attachment arm 16 via the arm holder 16*b* as shown in FIG. 15(*b*).

The button 16*d* is urged to the attach position shown in FIG. 15(*b*) by a spring 16*e*, and when pressed by the user, advances against the force of the spring to release the engagement between the lever 16*d*1 and the hole 16*b*1 of the arm holder 16*b*, whereby, as shown in FIG. 16(*a*), the cradle unit 12 slides upward to separate from the attachment arm 16.

Thus the cradle unit 12 is removably fastened on the dashboard of the vehicle B through the attachment arm 16 attach/detach mechanism comprising the hole 16*b*1 of the arm holder 16*b*, button 16*d*, lever 16*d*1 and spring 16*e*.

The rotate mechanism of the attachment arm 16 will be explained next.

Figure 17:
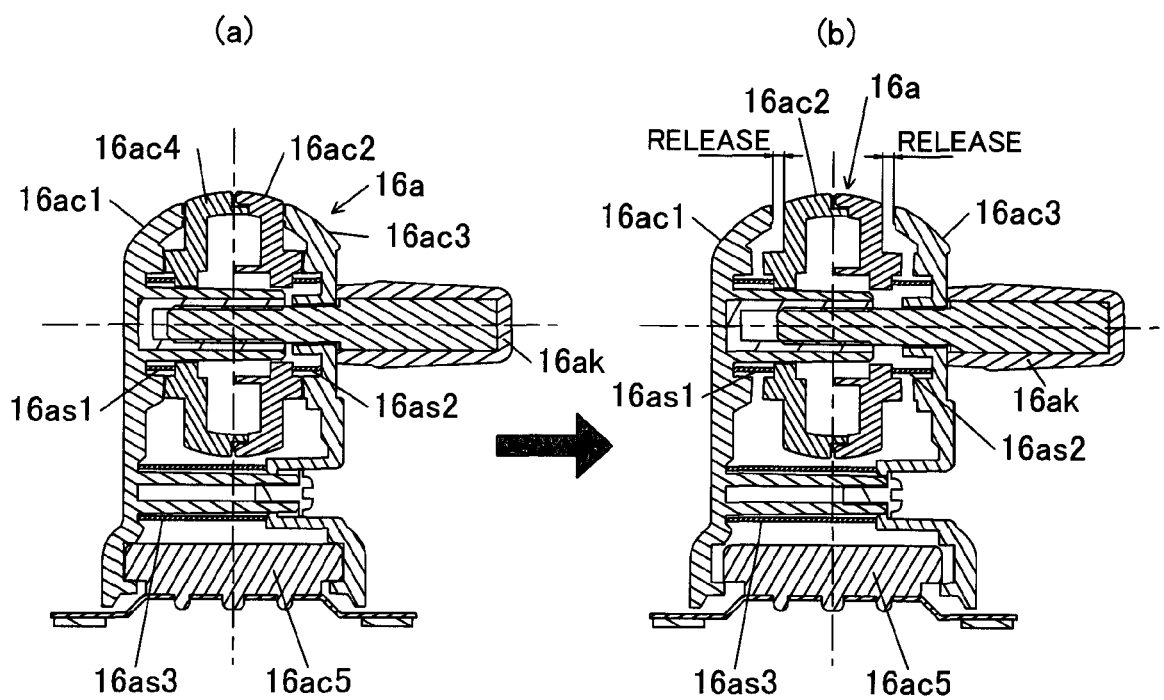
FIGS. 17(*a*) and 17(*b*) are sectional views showing the structure of an arm unit shown in FIG. 15 and other figures.
Figure 18:
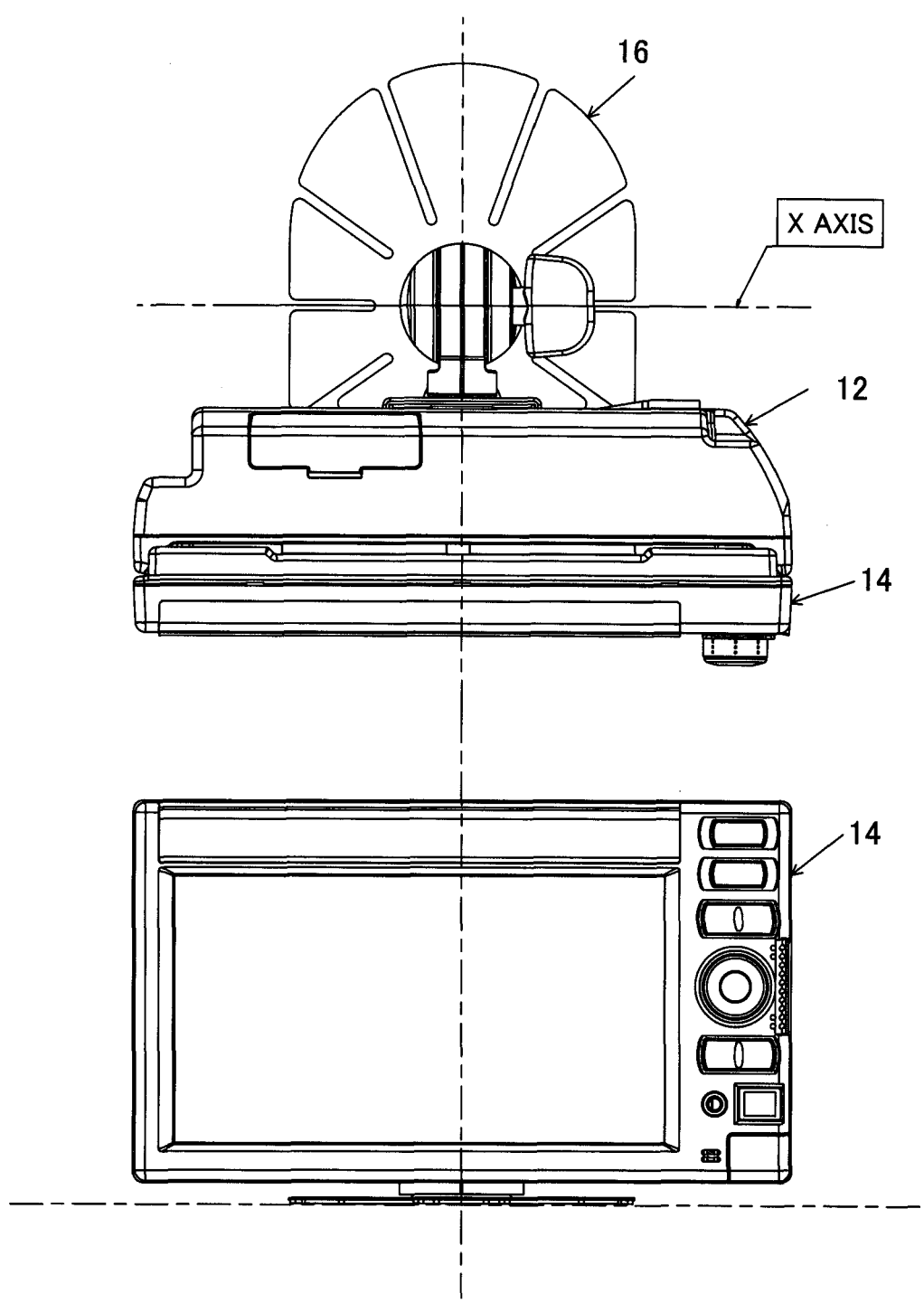
FIG. 18 is an explanatory view showing rotation of the arm unit shown in FIG. 15 etc. about X axis.
Figure 19:
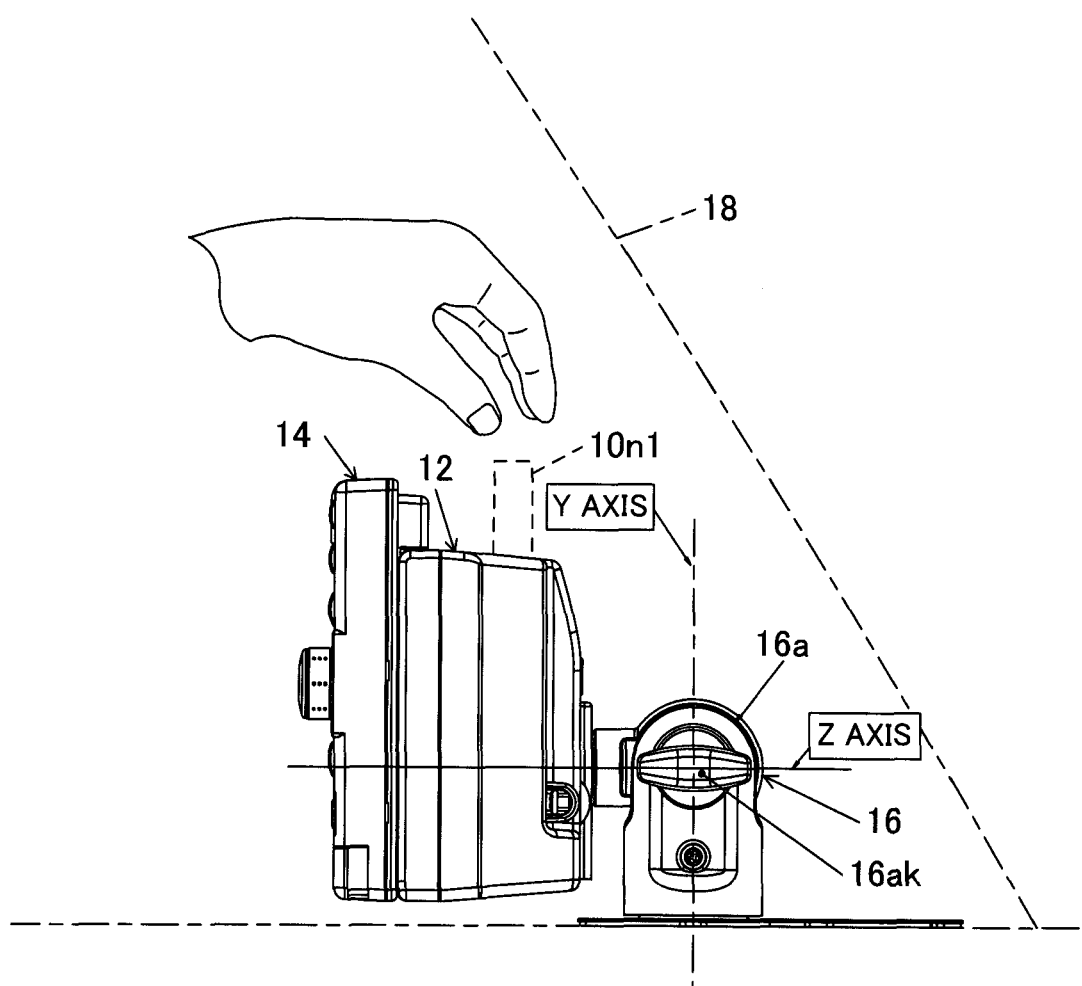
FIG. 19 is an explanatory view showing rotation of the arm unit shown in FIG. 15 etc. about Y and Z axes.

FIGS. 17(*a*) and 17(*b*) are sectional views showing the structure of the arm unit 16*a* shown in FIG. 15 and other figures. The arm unit 16*a* comprises six cam cases l6*ac*1, 16*ac*2, 16*ac*3, 16*ac*4, 16*ac*5 and 16*ac*6 (shown in FIG. 22), three springs 16*as*1, 16*as*2 and 16*as*3, and a knob 16*ak*, and when the user loosens the knob 16*ak* when in the condition shown in FIG. 17(*a*), the condition becomes that shown in FIG. 17(*b*), thereby releasing the six cam cases to enable the cradle unit 12 (and front panel unit 14) to rotate about the X, Y and Z axes. The X, Y and X axes are shown in FIGS. 18 and 19.

FIG. 20(a) is an exploded view of the arm unit 16a showing rotation about the X axis, and FIG. 20(b) is an explanatory view showing the rotation about the X axis. As shown in FIG. 20(a), the cams of the cam cases 16ac1, 16ac2, 16ac3 and 16ac4 enable rotation of the cradle unit 12 about the X axis. The turning range thereof is shown in FIG. 20(b).

Figure 21:
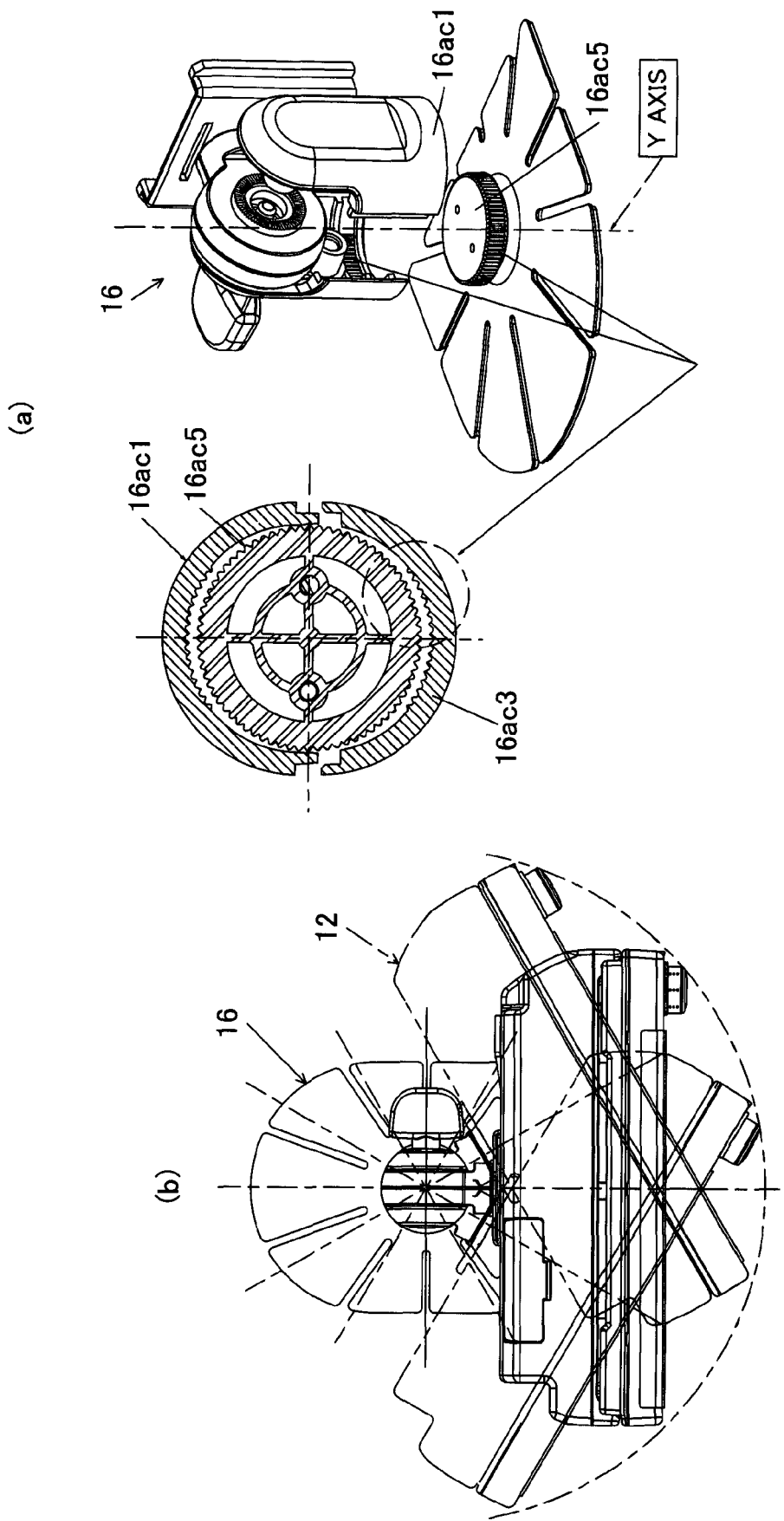
FIG. 21(*a*) is an exploded view of the arm unit shown in FIG. 15 etc.

FIG. 21(a) is an exploded view of the arm unit 16a showing rotation about the Y axis, and FIG. 21(b) is an explanatory view showing the rotation about the Y axis. As shown in FIG. 21(a), the cams of the cam cases 16ac1, 16ac3 and 16ac5 enable rotation of the cradle unit 12 about the Y axis. The turning range thereof is shown in FIG. 21(b).

FIG. 22(a) is an exploded view of the arm unit 16a showing rotation about the Z axis, and FIG. 22(b) is an explanatory view showing the rotation about the Z axis. As shown in FIG. 22(a), the cams of the cam cases 16ac2, 16ac4 and 16ac6 enable rotation of the cradle unit 12 about the Z axis. The turning range thereof is shown in FIG. 22(b).

As set out in the foregoing, the cradle unit 12 (and front panel unit 14) is configured to be rotatable about the X, Y and Z axes, so that also when attached on the dashboard, operations by the user (such as opening/closing of the openable cover 12a1 to insert/remove the add-on module 10n1 etc.) are unhindered because the cradle unit 12 (and front panel unit 14) is at a position spaced away from the windshield 18, as shown in FIG. 19. Moreover, since, as mentioned earlier, the cradle unit 12 is smaller in height than the front panel unit case 14a, the likelihood of user operations being hampered is still less.

Figure 23:
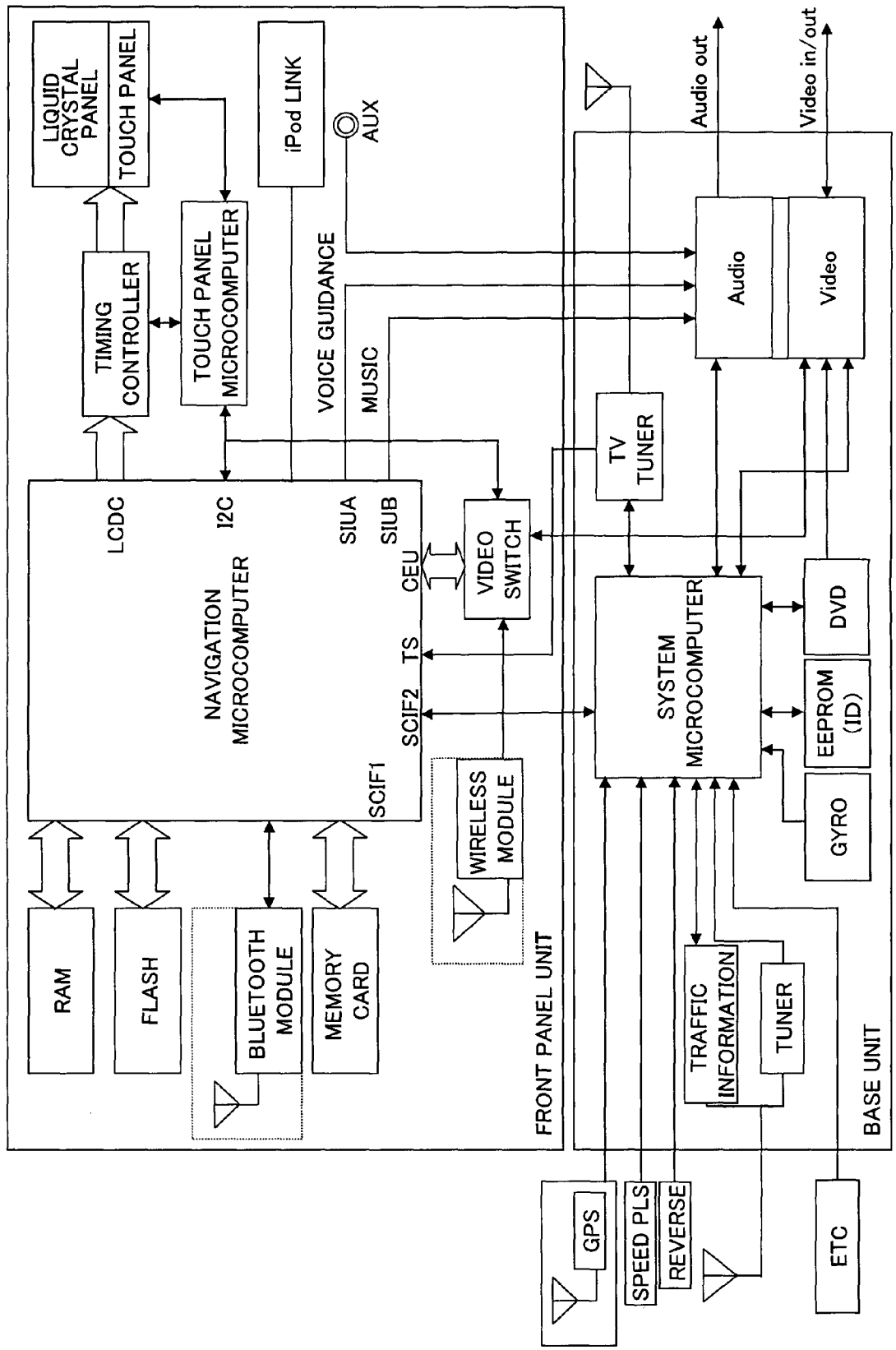
FIG. 23 is a block diagram showing the internal configuration of the base unit etc. shown in FIG. 1.
Figure 24:
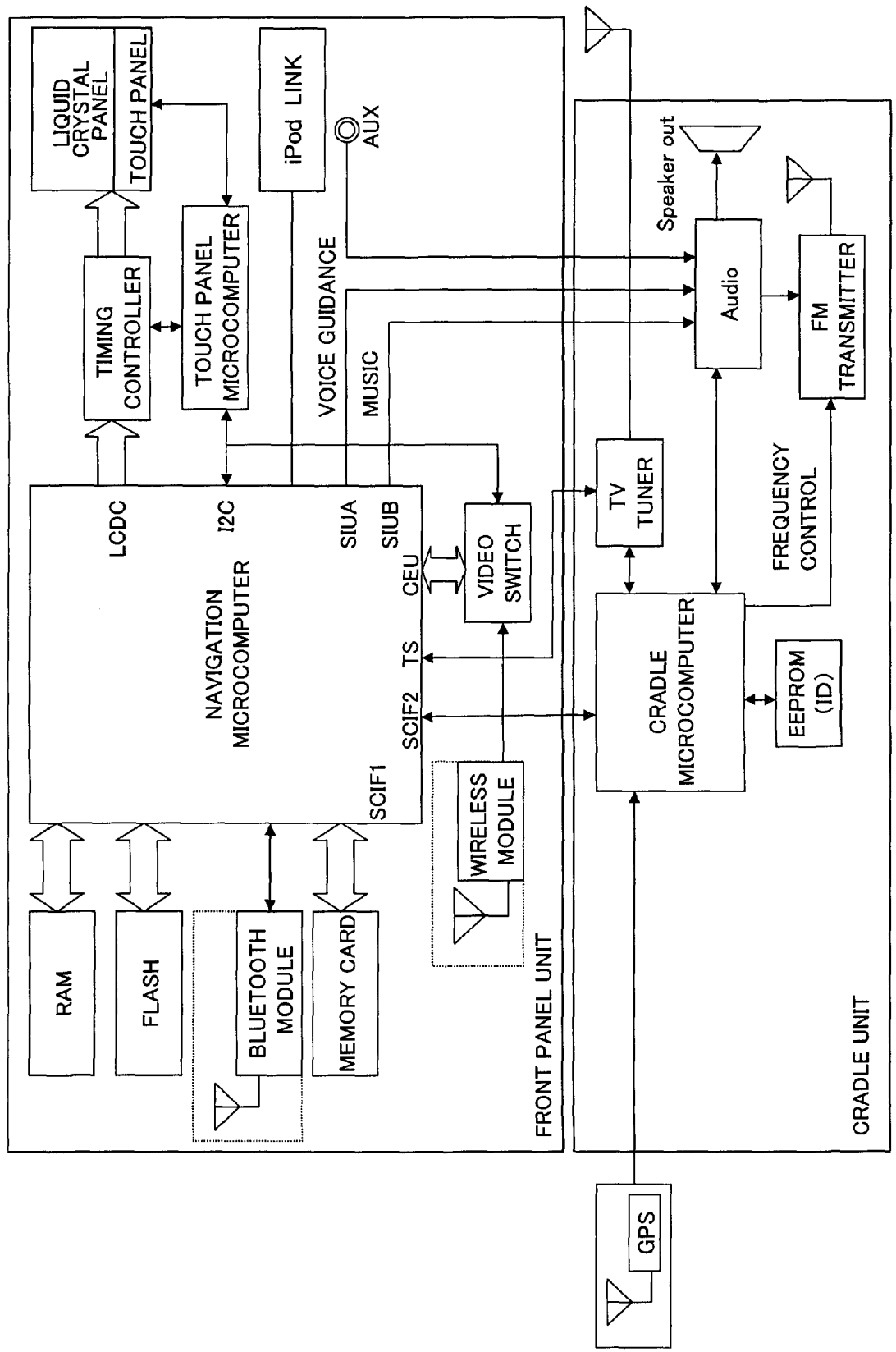
FIG. 24 is a block diagram showing the internal configuration of the cradle unit etc. shown in FIG. 3.

FIG. 23 is a block diagram showing the internal configuration of the front panel unit 14 and base unit 10, and FIG. 24 is a block diagram showing the internal configuration of the front panel unit 14 and cradle unit 12.

As shown in FIG. 23, the front panel unit 14 is equipped with a microcomputer called the "navigation microcomputer" and the base unit 10 is equipped with a microcomputer called the "system microcomputer." Further, as shown in FIG. 24, the cradle unit 12 is equipped with a microcomputer called the "cradle microcomputer."

The base unit 10 is equipped with a GPS signal receiver (designated "GPS") for receiving GPS (Global Positioning System) signals, a wheel speed sensor (designated "SPEED PLS"), a gyrosensor (designated "GYRO") and a reverse gear switch (designated REVERSE). The cradle unit 12 is equipped with only a GPS signal receiver.

When the front panel unit 14 is attached to the base unit 10, the navigation microcomputer conducts navigation in accordance with the location detected based on autonomous navigation that corrects the location information acquired from GPS signals using the outputs of the wheel speed sensor and gyrosensor, and when it is attached to the cradle unit 12, the navigation microcomputer conducts navigation in accordance with the location detected from the location information acquired from the GPS signals.

Now, turning to the explanation of an electrical discharge system in the navigation apparatus according to this embodiment, the recess 10b of the base unit 10 is, as shown in FIG. 1, provided alongside the connector 10e at the bottom with multiple ground terminals 10p, specifically two designated 10p1 and 10p2, made of a conductor such as copper.

As shown in FIG. 2, the front panel unit 14 is provided at corresponding locations with multiple contacts 14r, specifically two designated 14r1 and 14r2, for contacting the ground terminals. The ground terminals 10p and contacts 14r are aligned in a direction traversing the direction of front panel unit 14 attachment or detachment, i.e., are laterally aligned.

Figure 25:
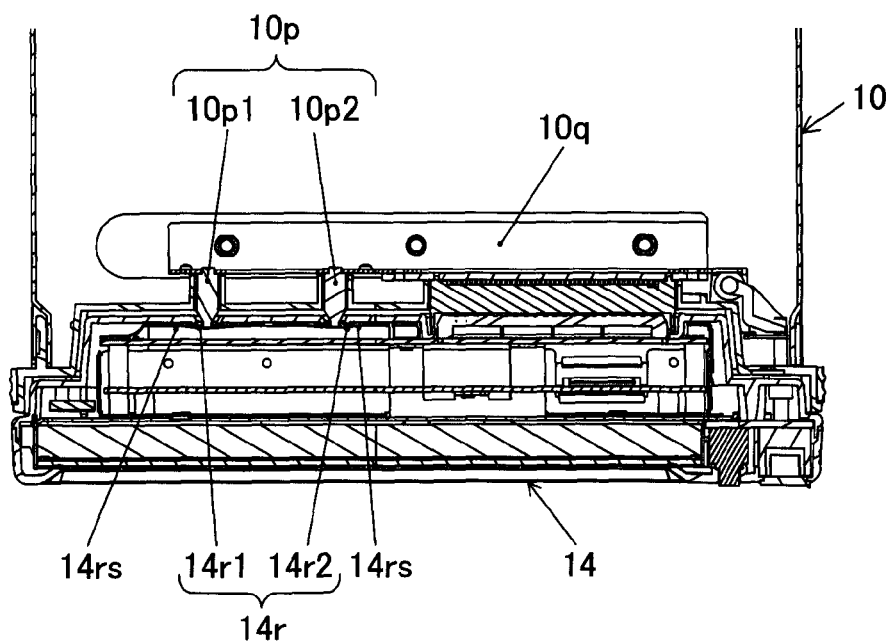
FIG. 25 is a sectional view from above of the base unit with the front panel unit shown in FIG. 1 mounted.
Figure 26:
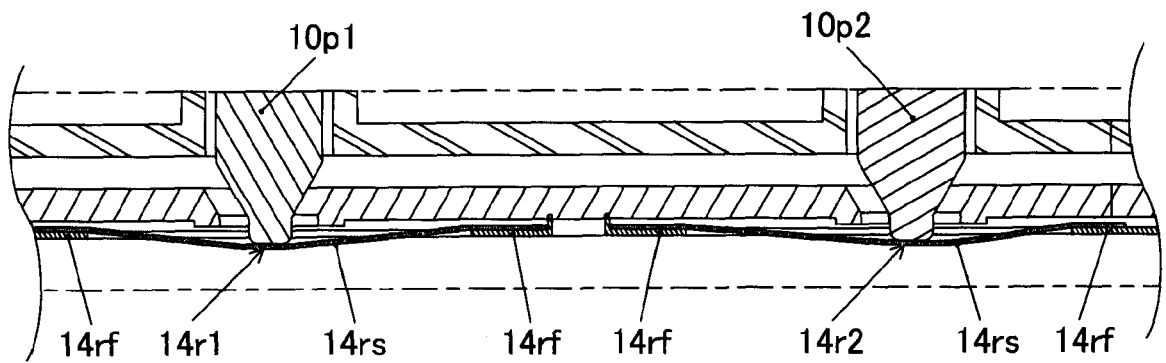
FIG. 26 is an enlarged view of ground terminals etc. shown in FIG. 25.
Figure 27:
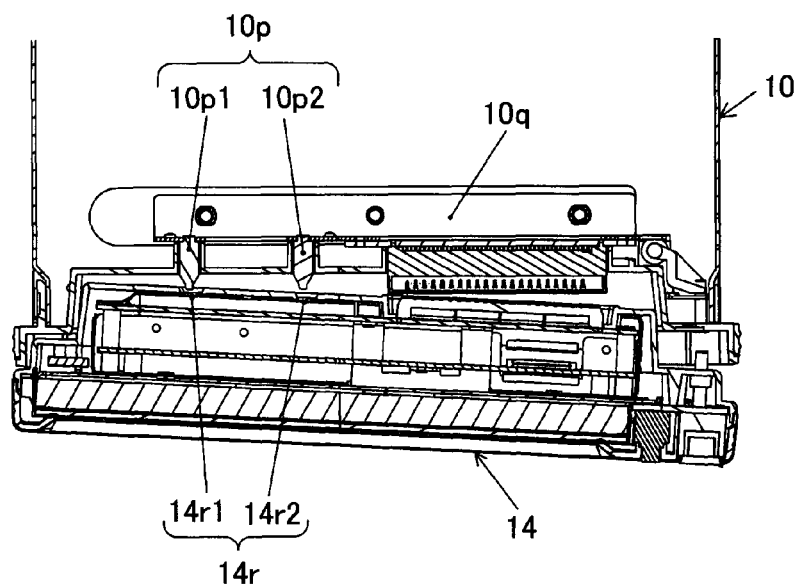
FIG. 27 is sectional view from above of the base unit during mounting of the front panel unit shown in FIG. 1.
Figure 28:
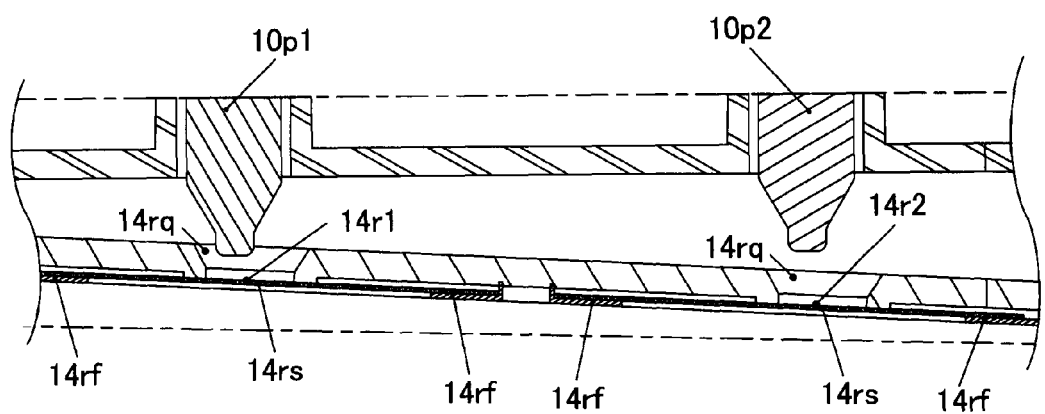
FIG. 28 is an enlarged view of the ground terminals etc. shown in FIG. 27.
Figure 29:
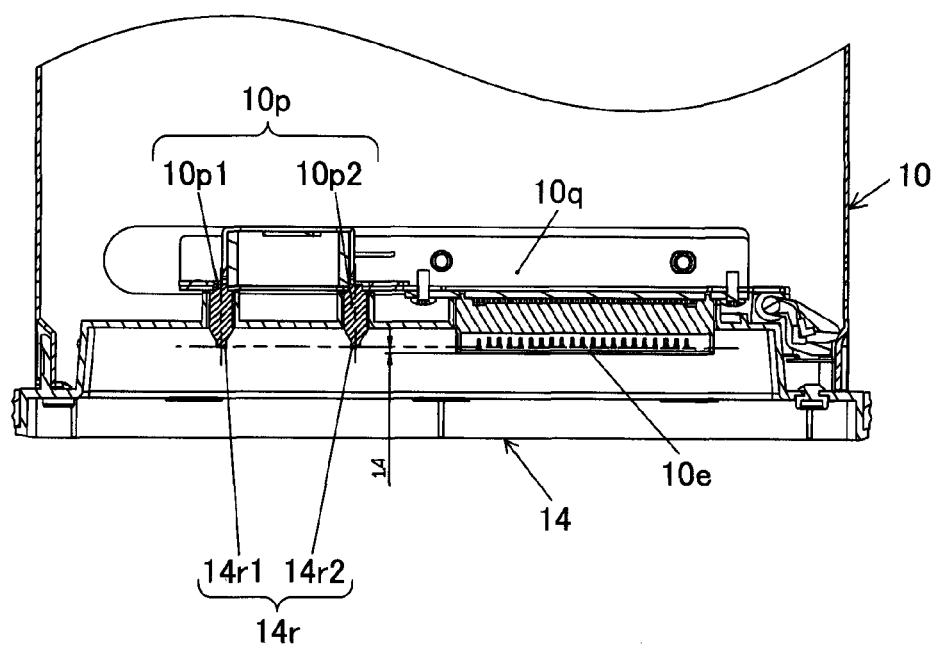
FIG. 29 is a sectional view similarly to FIG. 25, but showing the base unit from above.
Figure 30:
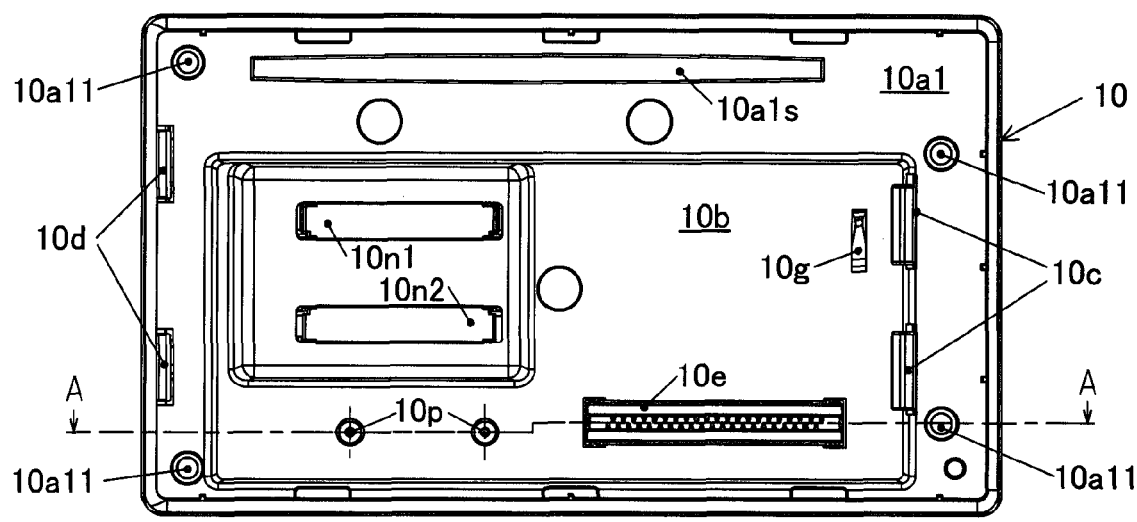
FIG. 30 is a front view of the base unit shown in FIG. 29.

FIG. 25 is a sectional view from above of the base unit 10 with the front panel unit 14 attached, FIG. 26 is an enlarged view of the ground terminals 10p etc. shown in FIG. 25, FIG. 27 is sectional view from above of the base unit 10 during mounting of the front panel unit 14, FIG. 28 is an enlarged view of the ground terminals 10p etc. shown in FIG. 27, FIG. 29 is, like FIG. 25, a sectional view from above of the base unit 10, and FIG. 30 is a front view of the base unit 10 shown in FIG. 29.

As shown in FIGS. 25 and 27, the proximal ends of the ground terminals 10p are fixed and electrically connected to a conductor 10q made of iron or the like and, as well shown in FIG. 27, their distal ends project slightly (e.g., about 3 mm) beyond the wall of the recess 10b. The associated contacts 14r1 and 14r2 are each constituted of a hole 14rq, a leaf spring or other elastic body 14rs formed of a conductor, and fixing members 14rf for immobilizing the opposite ends of the elastic body 14rs.

As shown in FIGS. 26 and 28, the ground terminals 10p enter the holes 14rq to contact the elastic bodies 14rs during mounting. As the opposite ends of the elastic bodies 14rs are immobilized by the fixing members 14rf, they are configured to flex inward (toward the interior of the front panel unit 14) and thereby reliably contact the points of the ground terminals 10p.

In the aforesaid configuration, when, in the condition shown in FIG. 25, the user presses the detach button 14i in order to detach the front panel unit 14 from the base unit 10, any static electrical charge carried by the user passes from the contacts 14r through the ground terminals 10p to the conductor 10q to be discharged to the conductor 10q.

In this case, as was explained earlier, the fixed claws 10d engaged with the catch slides 14h on the left side of FIG. 27 act as fulcrums, so that even if the ground terminal 10p2 on the right side separates from the contact 14r2, the ground terminal 10p1 on the left side continues to contact the contact 14r1 up to a certain angle, namely until after the contact between the connector 10e and the connector 14o is released, so that the static electrical charge carried by the user is discharged to the conductor 10q without fail and is not discharged to the connector 10e or the add-on module 10n1 or 10n2.

Moreover, owing to the proximity of the ground terminals 10p with the connector 10e and add-on modules 10n1 and 10n2, they can be effectively protected from electrical discharge. In addition, the add-on modules 10n1 and 10n2 are disposed to be insertable from the bottommost recess 10b1 and, therefore, are located farther inward to still more effectively prevent electrical discharge to the add-on modules 10n1 and 10n2.

Further, the provision of two ground terminals 10p (and contacts 14r) makes it possible to reliably discharge any static electrical charge carried by the user. Note that the number of ground terminals 10p (and contacts 14r) is not limited to two and may be one or three or more.

Moreover, as shown in FIG. 29, the ground terminals 10p are formed to project by an amount that is smaller than the amount of projection of the rectangular connector 10e of large area, so that they do not become a hindrance when the connector 10e makes contact with the contacts of the front panel unit 14.

As shown in FIG. 30, the vertical position of ground terminals 10p is slightly offset from that of the connector 10e.

As explained in the foregoing, the first embodiment is configured to have the navigation apparatus having the base unit 10 that is fastenable to the vehicle and is equipped with at least the microcomputer; and the front panel unit 14 that is attachable to and detachable from the base unit and is equipped with at least the display (liquid crystal panel) 14b displaying map data and the microcomputer performing a navigation function to indicate a determined location of the vehicle on the map data, characterized in that: the front surface of the front panel unit 14 is made same size as the mating face of the base unit 10; and the liquid crystal panel 14b occupies 70% or greater of length of the front panel unit 14 in a lateral direction.

In other words, as shown in FIG. 7, where the lateral length of the front panel unit 14 is Lhf and the length of the liquid crystal panel 14b in the same direction is Lhp, Lhp is made 70% or greater of Lhf, specifically about 72% thereof. Further, as shown in FIG. 11, where the vertical length of the front panel unit 14 is Lvf and the length of the liquid crystal panel 14b in the same direction is Lvp, Lvp is made 70% or greater of Lvf, specifically about 72% thereof. Therefore, expressed in area ratio, more than half of the area of the front surface of the front panel unit 14, more exactly 52.8% of the area of its front, is the liquid crystal panel 14b.

As a result, the front panel unit 14 including the microcomputer for performing navigation functions can be configured to be attachable/detachable to/from the base unit 10 to enhance ease of use, and the size (area) of the liquid crystal panel (display) 14b formed in the front panel unit 14 can be increased to improve viewability.

Further, in the apparatus, the detach button 14i operable by a user for detaching the front panel unit 14 from the base unit 10 is disposed at the right of a position where the destination input switch 14c, current location input switch 14d etc. are installed on the front surface of the front panel unit 14, and a plurality of (i.e., two) the lock levers 10c movable in detaching direction by using the detach button 14i are disposed in a vertical direction perpendicular to the lateral direction of the liquid crystal panel 14b, whereby, in addition to the foregoing effects, it is possible to increase the area of the liquid crystal panel 14b while maintaining the ease of front panel unit 14 attachment and detachment.

Further, attachment/detachment of the front panel unit 14 is facilitated, and even though the size of the liquid crystal panel 14b is increased, the front panel unit 14 can be easily attached to (engaged with) the base unit 10 while being stably retained.

Further, in the apparatus, the liquid crystal panel 14b is offset laterally at the front surface of the front panel unit 14, and the detach button 14i is disposed in the opposite direction from the direction of the offset and is urged by the spring 14i1 toward the front surface of the front panel unit 14, whereby, in addition to the foregoing effects, the front panel unit 14 can be reliably retained in the base unit 10 until the detach button 14i is operated by the user and can be easily detached when it is operated.

Further, since the first embodiment is configured to offset the liquid crystal panel 14b laterally at the front surface of the front panel unit 14 and dispose the detach button 14i in the opposite direction from the offset direction, the provision of detach button 14i and its spring 14l on the side apart from the liquid crystal panel 14b makes it possible to impart a good operating feel even though the weight of the front panel unit 14 increases in proportion to the larger size of the liquid crystal panel 14b, by, for example, adjusting its force relationship with the spring 10i1 of the release lever 10g that acts to eject the front panel unit 14 from the base unit 10, specifically to set it slightly weaker.

Further, the apparatus includes the fixed claw 14g disposed in the front panel unit 14; and the lock lever 10c located in the recess 10b in the front surface of the base unit 10 to be engaged with the fixed claw 14g irrespective of whether or not being engaged with the front panel unit 14, and the detach button 14i makes the front panel unit 14 detach from the base unit 10 by moving the lock lever 10c to release engagement with the fixed claw 14g, whereby, in addition to the foregoing effects, the front panel unit 14 can likewise be reliably retained in the base unit 10 until the detach button 14i is operated by the user and can be easily detached when it is operated.

Further, the lock levers 10c are configured to be positioned in the recess 10b of the base unit 10, i.e. so as not to project, irrespective of whether or not being engaged with the front panel unit 14, so that there is no danger of their catching on something else and breaking during an attach or detach operation.

Further, the apparatus includes the release lever 10g that is positioned in the recess 10b in the front surface of the base unit 10 irrespective of whether or not being engaged with the front panel unit 14 and acts in direction of detaching the front panel unit 14 from the base unit 10; and the spring 10i1 of the release lever 10g that urges the release lever 10g in detaching direction, whereby, in addition to the foregoing effects, the front panel unit 14 can be still more reliably detached from the base unit 10 through the release lever 10g.

Further, the release lever 10g is configured to be positioned in the recess 10b of the base unit 10, i.e. so as not to project, irrespective of whether or not being engaged with the front panel unit 14, so that there is no danger of it catching on something else and breaking during an attach or detach operation.

Further, in the apparatus, the release lever 10g and the release lever spring 10i1 are provided near one of a plurality of the lock levers 10c disposed on the base unit 10 in the vertical direction of the liquid crystal panel 14b, the one being distant from the detach button 14i, and the pressing force of the spring 10i1 of the release lever 10g is set to enable further compression of the spring 14i1 of the detach button 14i when attachment of the front panel unit 14 to the base unit 10 is released by the operation of the detach button, whereby, in addition to the foregoing effects, the release lever 10g can act as the point of application with the detach button side of the front panel unit 14 acting as the point of effort and the other end of the front panel unit 14 as the fulcrum, thereby enabling still more reliable and easier detachment of the front panel unit 14 from the base unit 10.

Further, since the release lever 10g is located near the one of the multiple lock levers 10c disposed in the base unit 10 in the vertical direction of the liquid crystal panel 14b which is disposed on the side distant from the detach button 14i, detachment of the front panel unit 14 from the base unit 10 becomes even easier.

Further, in the apparatus, the lock lever 10c and the release lever 10g are given different movement directions and the pressing force of the spring 10i1 of the release lever 10g is set greater than that of the spring 14i1 of the detach button 14i, whereby, in addition to the foregoing effects, the front panel unit 14 can similarly be detached from the base unit 10 still more reliably and easily.

Further, since the lock levers 10c and release lever 10g are given different movement directions, no shift occurs in their contact points at the time the release lever 10g ejects the front panel unit 14, whereby the front panel unit 14 can be stably ejected.

Further, it is configured to have the navigation apparatus having the base unit 10 that can be fastened to the vehicle and is equipped with at least the microcomputer; and the front panel unit 14 that can be attached to and detached from the base unit and is equipped with at least the display (liquid crystal panel) 14b displaying map data and the microcomputer performing a navigation function to indicate a determined location of the vehicle on the map data, characterized in that: the detach button 14i is disposed at one side portion of the front surface of the front panel unit 14; the movable claw (lock lever 10c) is disposed on the base unit at a location corresponding to a location of the detach button; and the indentation 14j that receives the movable claw is formed at the front panel unit case 14a, whereby, in addition to the foregoing effects, the front panel unit 14 can be fastened to the base unit 10 by a simple mechanism.

Further, it is configured to have the navigation apparatus having: the base unit 10 that is fastenable to the vehicle and is equipped with at least the microcomputer; and the front panel unit 14 that is attachable to and detachable from the base unit and is equipped with at least the display (liquid crystal panel) 14b displaying map data and the microcomputer performing a navigation function to indicate a determined location of the vehicle on the map data, characterized in that: a plurality of the movable claws (lock lever 10c and catch slide 14h) are disposed on opposite sides to fasten and retain the front panel unit 14, whereby the front panel unit 14 can be attached to the base unit 10 from any direction even though the mechanism is simple.

Further, the first embodiment is configured so that one set of the movable claws (the lock levers 10c) allows movement only in the direction of the base unit 10 in response to the operation of the detach button 14i and the other set (the catch slides 14h) is urged in the fastening direction.

Further, the front panel unit 14 protrudes at the back as viewed from above, and the left wall section 14k1 and right wall section 14kr are configured to make an overall trapezoidal shape to correspond to the side walls of the recess 10b of the base unit 10, so that when the front panel unit 14 is attached to the base unit 10, movement in the direction of the base unit 10 is guided to facilitate the mounting.

Further, in the apparatus, the board (14l1 and 14l2) disposed behind the liquid crystal panel 14b in the front panel unit 14 is made smaller in the lateral length than the liquid crystal panel 14b such that the catch slide 14h of the front panel unit 14 is accommodated in thus-generated space, whereby it is possible even with a simple structure to bring the catch slides 14h etc. close to the front surface of the front panel unit 14 and bring fixed members close to the center of gravity, so that movement of the front panel unit 14 in a rotational direction under vibration can be inhibited. In addition, provision of add-on units in the front panel unit 14 is facilitated.

Further, the overlap spans of the catch slides 14h and fixed claws 10d are configured to be broader than the width of Di shown in FIG. 8, whereby the front panel unit 14 and base unit 10 do not separate on their own.

Further, the kick lever 10i that kicks out the front panel unit 14 in the detaching direction when the front panel unit 14 is detached is disposed inward of the location where the movable claws (lock levers 10c) are disposed in the base unit 10, whereby the board accommodation space at the back of the front panel unit 14 can be expanded and the degree of freedom in circuit design is increased.

Further, if the kick lever 10i is disposed near the movable claws, the fastening members on the opposite side can be used as fulcrums so that the front panel unit 14 can be moved in the detaching direction with little force.

Further, in the apparatus, the slot 14n is formed above the liquid crystal panel 14b of the front panel unit 14 to lie parallel with upper longitudinal edge thereof for allowing a user to insert the CD 20 therethrough when the front panel unit 14 is attached to the base unit 10; and the front panel unit case 14a protrudes slightly at top of rear side and is formed so as to be accommodatable in the remaining recessed part 10a1 of the base unit case 10a, whereby a front decorative portion or the like is made unnecessary, the depth in the vicinity of the slot 14n of the front panel unit 14 becomes small, and, as a result, the insertion and/or discharge of the CD 20 stabilizes and the rigidity of the front panel unit 14 can be enhanced.

Further, in the apparatus, the attachment arm 16 has the arm unit 16a, the arm holder 16b attached to side of the arm unit 16a, the attachment panel 16c attached to the bottom of the arm unit 16a and the button 16d attached to the cradle unit case 12a, and holds the front panel unit 14 by the arm holder 16b via the cradle unit 12 at a location near the middle and about half of the height of the front panel unit 14.

Although, as shown in FIG. 19, the windshield of the vehicle slants back (toward the seat side), since the arm holder is so configured, fastening to the dashboard of the vehicle B becomes simple, and since the height decreases stepwise in the order of the front panel unit 14, cradle unit 12 and attachment arm 16, hindrance to user operations, such as when inserting and extracting the add-on module 10n1, is even less.

Further, since the arm holder 16b is configured to be removably fastened to the dashboard of the vehicle B through the attachment arm 16 attach/detach mechanism comprising the hole 16b1 of the arm holder 16b, the button 16d, the lever 16d1 and the spring 16e, attachment and detachment are easy.

Further, the arm unit 16a is equipped with multiple cam cases and configured to be rotatable about the X, Y and Z axes, thereby enhancing visual perceptibility.

Further, in the apparatus, the connector 10e is formed such that the ground contact 10e211 projects to be in contact with its counterpart, i.e., the connector of the front panel unit first compared with the ordinary contacts 10e221, thereby protecting the connected electronic circuits and stabilizing their operation. Moreover, since it is disposed at a location offset from the middle of the recess 10b of the base unit 10, the ground contacts contact first and stay contacted till last at the time of attaching/detaching, likewise making it possible to stabilize the operation of the electronic circuits.

Further, it is configured to have the navigation apparatus having the base unit 10 that is fastenable to the vehicle and is equipped with at least the microcomputer; and the front panel unit 14 that is attachable to and detachable from the base unit and is equipped with at least the display (liquid crystal panel) 14b displaying map data and the microcomputer performing a navigation function to indicate a determined location of the vehicle on the map data, characterized in that: the ground terminals 10p on one of the front panel unit and the base unit are provided and the contacts 14r that contact the ground terminals 10p are provided on the other, so that if the user should be carrying a static electric charge when the user attempts to detach the front panel unit 14 from the base unit 10, it is discharged from the contacts 14r through the ground terminals 10p, more specifically, is passed to the conductor 10q to be discharged to the conductor 10q.

Further, since the contacts 14r are configured to comprise elastic bodies, they can reliably make contact with and discharge to the ground terminals 10p.

Further, since the first embodiment is configured to provide a plural number of the ground terminals 10p and aforesaid contacts, even if the one ground terminal 10p2 separates from the contact 14r2, the other ground terminal 10p1 continues to contact the contact 14r1 up to a certain angle so that the static electric charge carried by the user is reliably discharged to the conductor 10q.

The ground terminals 10p are configured to be located near the connector 10e or add-on modules 10n1 and 10n2, whereby electrical discharge thereto can be effectively prevented.

Second Embodiment

Figure 31:
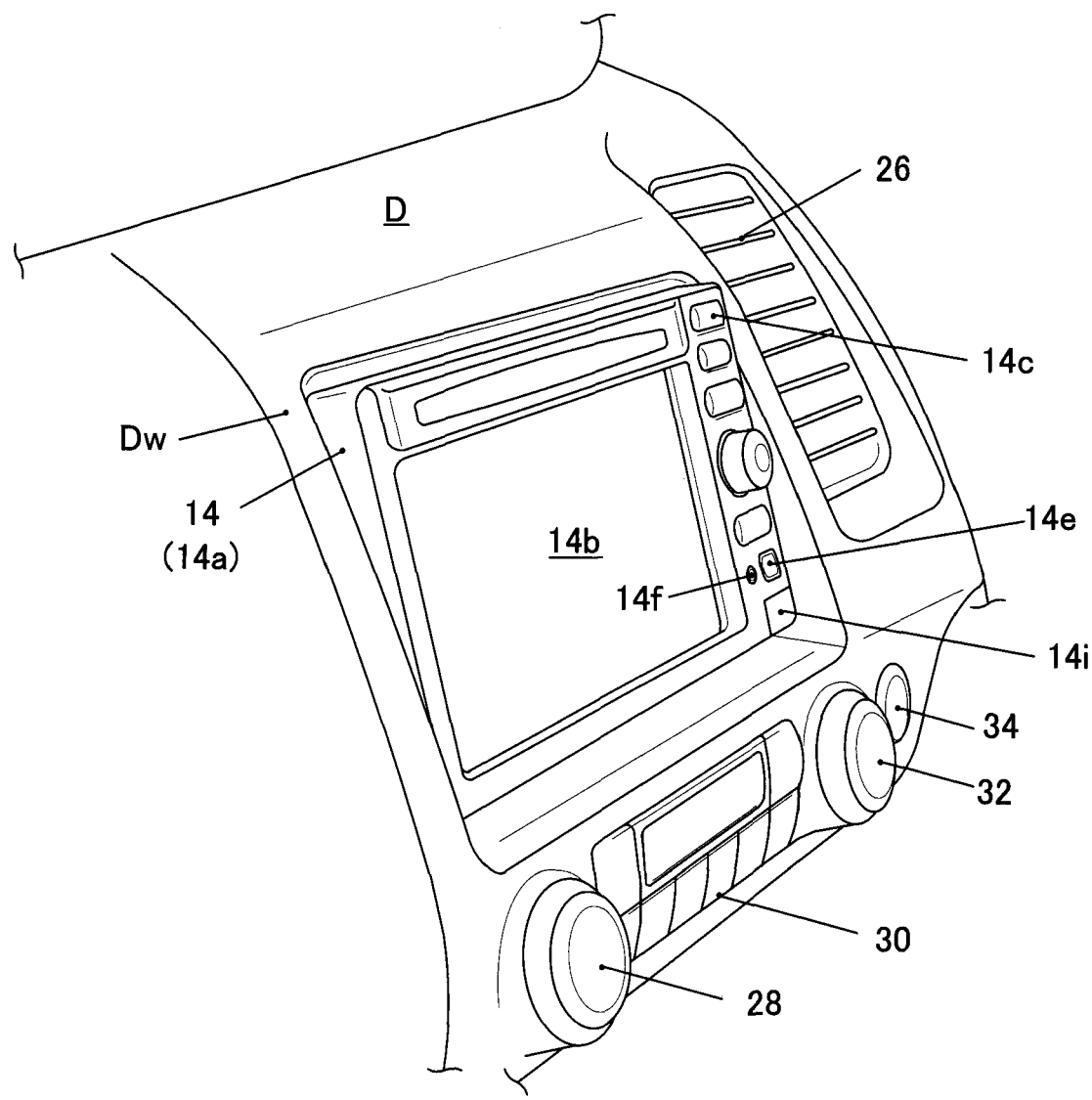
FIG. 31 is a perspective view showing a navigation apparatus according to a second embodiment of this invention in the condition where it is mounted in a vehicle.
Figure 32:
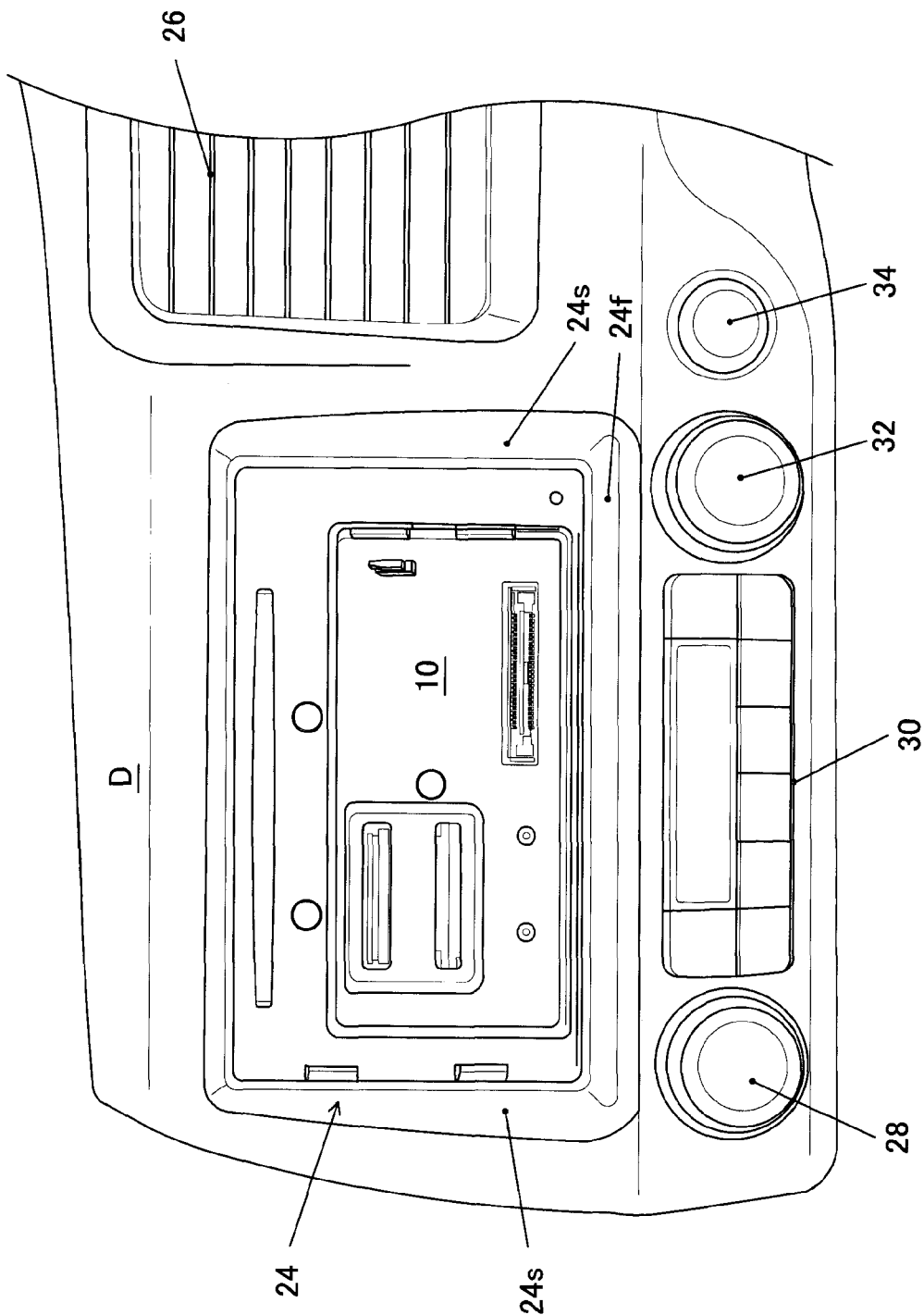
FIG. 32 is a front view in the condition with the front panel unit removed from FIG. 31.
Figure 33:
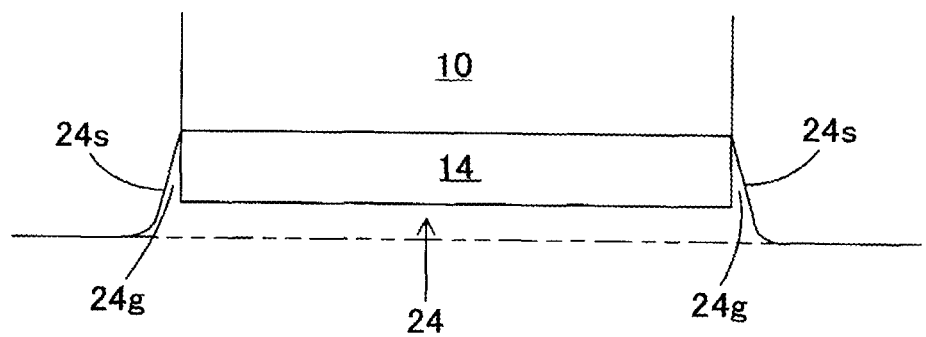
FIG. 33 is an explanatory cross-sectional view of the front panel unit shown in FIG. 32.

FIG. 31 is a perspective view showing a navigation apparatus according to a second embodiment of this invention in the condition where it is mounted in a vehicle, FIG. 32 is a front view in the condition with the front panel unit 14 removed from FIG. 31, and FIG. 33 is an explanatory cross-sectional view of FIG. 32.

Turning to an explanation focused on the points of difference from the first embodiment shown in FIGS. 5, 11 and so on, the second embodiment is configured to accommodate the base unit 10 as totally embedded inside a rectangular recess 24 formed in the dashboard D, as shown in FIG. 32, and so that when the front panel unit 14 is mounted, the top of the front panel unit 14, more specifically the front panel unit case 14a, projects from the wall Dw of the dashboard D, as shown in FIG. 31.

That is, the second embodiment is configured so that the base unit 10 is fastenable in the dashboard D at the driver's seat of the vehicle, more specifically, is fastenable in the dashboard D as accommodated in the recess 24 formed in the dashboard D, and that when the front panel unit 14 is attached to the base unit 10, part (the top) of the front panel unit 14 projects, as viewed from the side, from the wall (surface) Dw of the dashboard D toward the user seated in the driver's seat. As a result, the degree of freedom of front panel unit 14 attachment/detachment with respect to the base unit 10 is improved without sacrificing the appearance of the navigation apparatus.

Moreover, as shown in FIGS. 32 and 33, the opposite lateral sides 24s of the recess 24 formed in the dashboard D are not parallel to the sides of the front panel unit 14, more specifically the front panel unit case 14a, but are formed to broaden toward the opening side as viewed from above, more exactly are flared. Note that the front 24f is formed parallel to the bottom of the front panel unit case 14a.

Note that in FIG. 32 and other figures, reference symbol 26 designates an air-conditioner vent, 28 an airflow dial thereof, 30 an operating panel thereof, 32 a temperature dial, and 34 an illuminated hazard lamp switch.

Thus, the second embodiment is configured to establish a gap 24g between the recess 24 and the front panel unit 14, more specifically its case 14a and the like, and so that on the upper side, as shown in FIG. 31, the front panel unit case 14a projects from the wall Dw of the dashboard D by half or greater and, while continuing to project, gradually becomes overlapped with the wall Dw toward the bottom as viewed from the side, and that at the bottommost part, as shown in FIG. 31, it sinks totally into the recess 24 while, during detachment of the front panel unit 14, the uppermost part on the right side moves forward by a degree preventing it from being totally overlapped with the recess 24 as viewed from the side, thereby making it easy for the user to grasp the front panel unit case 14a with the hands and attach it to the base unit 10 or detach it therefrom.

In other words, the second embodiment is configured so that when the front panel unit 14 is moved from the attached position to the detached position in response to the operation of the detach button 14i by the user, the bottom (one part) of the front panel unit 14 is inside the recess 24 and, therefore, owing to the bottom of the front panel unit 14 being retained inside the recess 24, the front panel unit 14 can be prevented from accidental fall-off and becomes easy for the user to grasp and detach it because the remainder, i.e., the uppermost part etc., projects from the recess 24, and the freedom of front panel unit 14 attachment and detachment can be further improved.

Note that it suffices for the lateral sides 24s to broaden toward the opening side as viewed from above so the shape is not limited to flared but can instead be curved or the like.

Further, the depth of the wall Dw is set to a level such that at least part of the bottommost part of the front panel unit 14 remains overlapped with the wall Dw in side view, and the front 24f is made horizontal, whereby ready and accidental separation of the front panel unit 14 can be prevented. Moreover, among the switches on the front right of the front panel unit 14, the frequently used and important ones such as the destination input switch 14c and current location input switch 14d are disposed at this location and projected beyond the wall Dw, whereby the wall Dw does not interfere with switch operation, while ease of use is also upgraded.

Thus, when the front panel unit 14 is attached to the base unit 10, the top (uppermost part) of the front panel unit 14 is, in side view, projected from the wall Dw of the dashboard D toward the user while the detach button 14i provided to be operable by the user is, in side view, disposed at the bottom of the front panel unit 14 located inside the recess 24.

Further, the jacks 14e and 14f, as well as the detach button 14i, are surrounded by the wall Dw, so that the jack 14e and the like are rarely subjected to strain, and accidental operations can be prevented even with a structure that installs operational devices such as the air-conditioner airflow dial 28 and operating panel 30 near the bottom of the front panel unit 14. The remaining aspects of the configuration are no different from the first embodiment.

As set out in the foregoing, the second embodiment is configured to have a navigation apparatus or attachment structure of the navigation apparatus having: a base unit 10 that is fastenable in a recess 24 formed in a dashboard D of a vehicle and is equipped with at least a microcomputer; and a front panel unit 14 that is attachable to and detachable from the base unit 10 and is equipped with at least a display (liquid crystal panel) 14b displaying map data and a microcomputer performing a navigation function to indicate a determined location of the vehicle on the map data, characterized in that: a front surface of the front panel unit 14 is made same size as a mating face of the base unit 10; and the recess 24 formed in the dashboard D is made so that a part of the front panel unit 14, more specifically the top thereof, projects from a wall Dw of the dashboard D, as viewed from side, when the front panel unit 14 is attached to the base unit 10. With this, in addition to the effects set out regarding the first embodiment, it becomes easy for the user to attach the front panel unit 14 to the base unit 10 and detach it therefrom.

In addition, as viewed from above, the opening side of the recess 24 is formed to broaden at the lateral sides 24s toward the opening side, more specifically, is formed in a flared shape, so that it becomes still easier for the user to mount the front panel unit 14 in the base unit 10 and detach it therefrom.

Further, the second embodiment is configured to have a navigation apparatus having: a base unit 10 that is fastenable to a dashboard D at a driver's seat of a vehicle; a front panel unit 14 that is attachable to and detachable from the base unit and is equipped with a display (liquid crystal panel) 14b displaying map data; and a microcomputer (navigation microcomputer) that performs a navigation function to indicate a determined location of the vehicle on the map data, characterized in that: a part of the front panel unit 14 projects from a surface (wall Dw) of the dashboard D toward a user seated in the driver's seat, as viewed from side, when the front panel unit 14 is attached to the base unit 10. With this, the degree of freedom of front panel unit 14 attachment/detachment with respect to the base unit 10 is improved without sacrificing the appearance of the navigation apparatus.

Further, the second embodiment is configured so that the base unit 10 is accommodated in a recess 24 formed in the dashboard D to be fastenable to the dashboard D, and a part of the front panel unit 14 is located inside the recess 24, as viewed from the side, when the front panel unit 14 is moved from the attached position to a detached position in response to operation of a detach button 14i of an attach/detach mechanism by the user. With this, in addition to the foregoing effects, it is possible by retaining the part of the front panel unit 14 inside the recess 24 to prevent the front panel unit 14 from accidental fall-off and by projecting the remainder from the recess 24 to make it easy for the user to grasp and detach it, thereby further improving the freedom of front panel unit 14 attachment and detachment.

Further, the second embodiment is configured so that the base unit 10 is accommodated in a recess 24 formed in the dashboard D to be fastenable to the dashboard D, a top of the front panel unit 14 projects from the surface (wall Dw) of the dashboard D toward the user, as viewed from the side, when the front panel unit 14 is in the attached position, and a detach button 14i of an attach/detach mechanism provided to be operable by the user for moving the front panel unit 14 from the attached position to a detached position is disposed at the bottom of the front panel unit 24 located inside the recess 24. With this, in addition to the foregoing effects, it is possible by the positioning of the detach button 14i inside the recess 24 to prevent misoperation and accidental fall-off of the front panel unit 14. Moreover, since the top of the front panel unit 14 is projected from the wall Dw of the dashboard D, frequently used and important switches can be disposed at this location to enhance ease of use.

Third Embodiment

Figure 34:
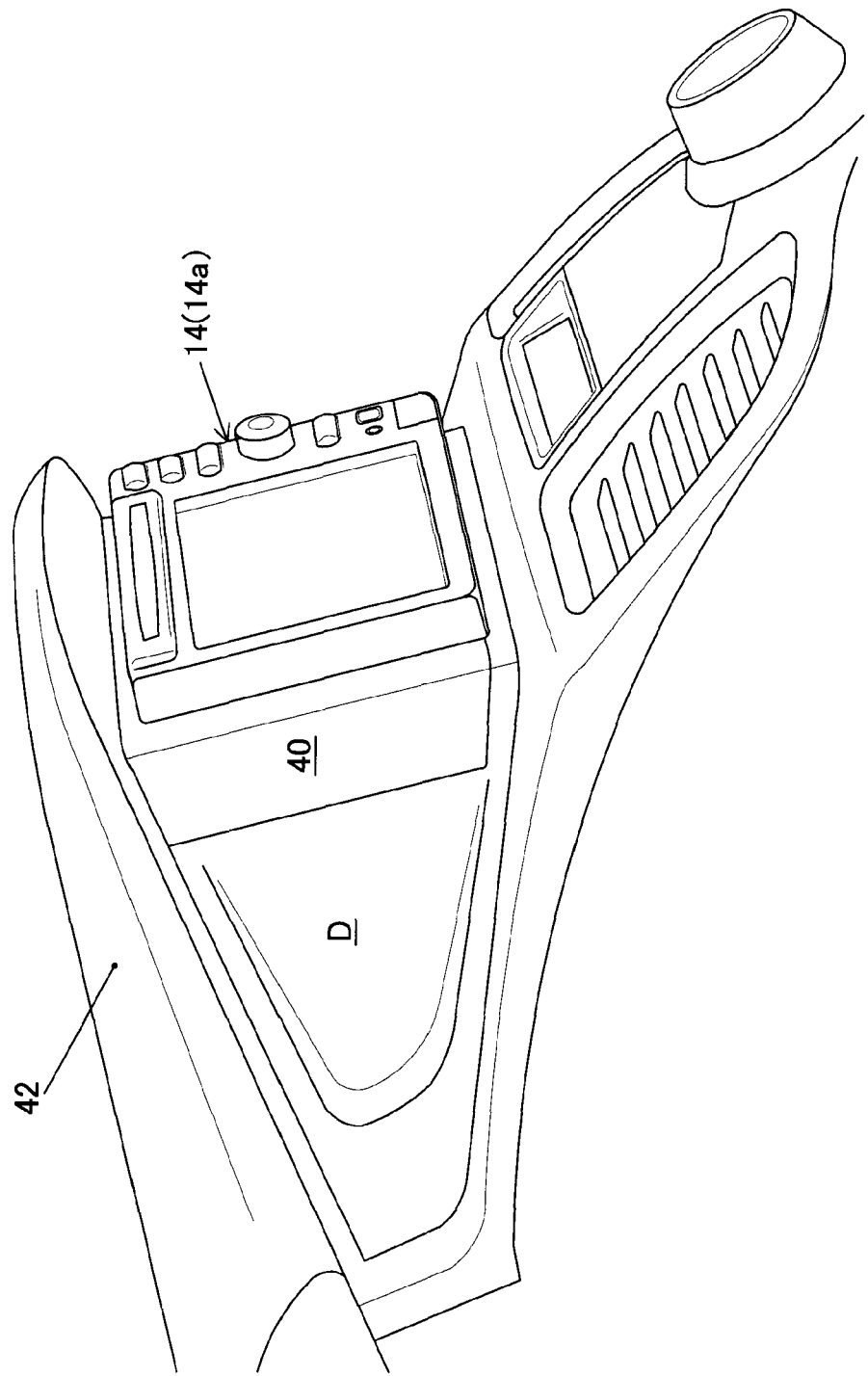
FIG. 34 is a perspective view showing a navigation apparatus according to a third embodiment of this invention in the condition where it is mounted in a vehicle.
Figure 35:
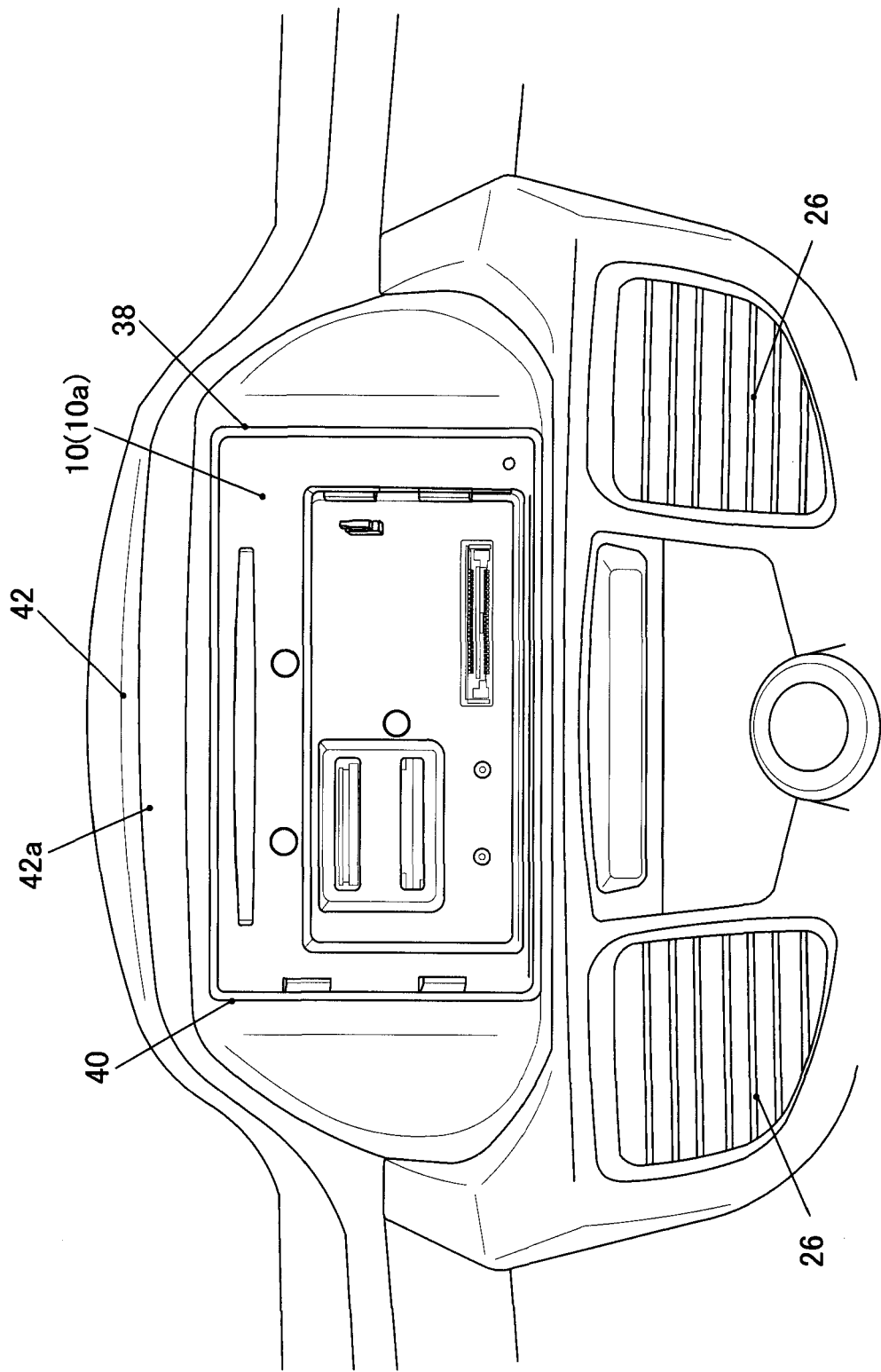
FIG. 35 is a front view thereof when the front panel unit is removed from the condition shown in FIG. 34.
Figure 36:
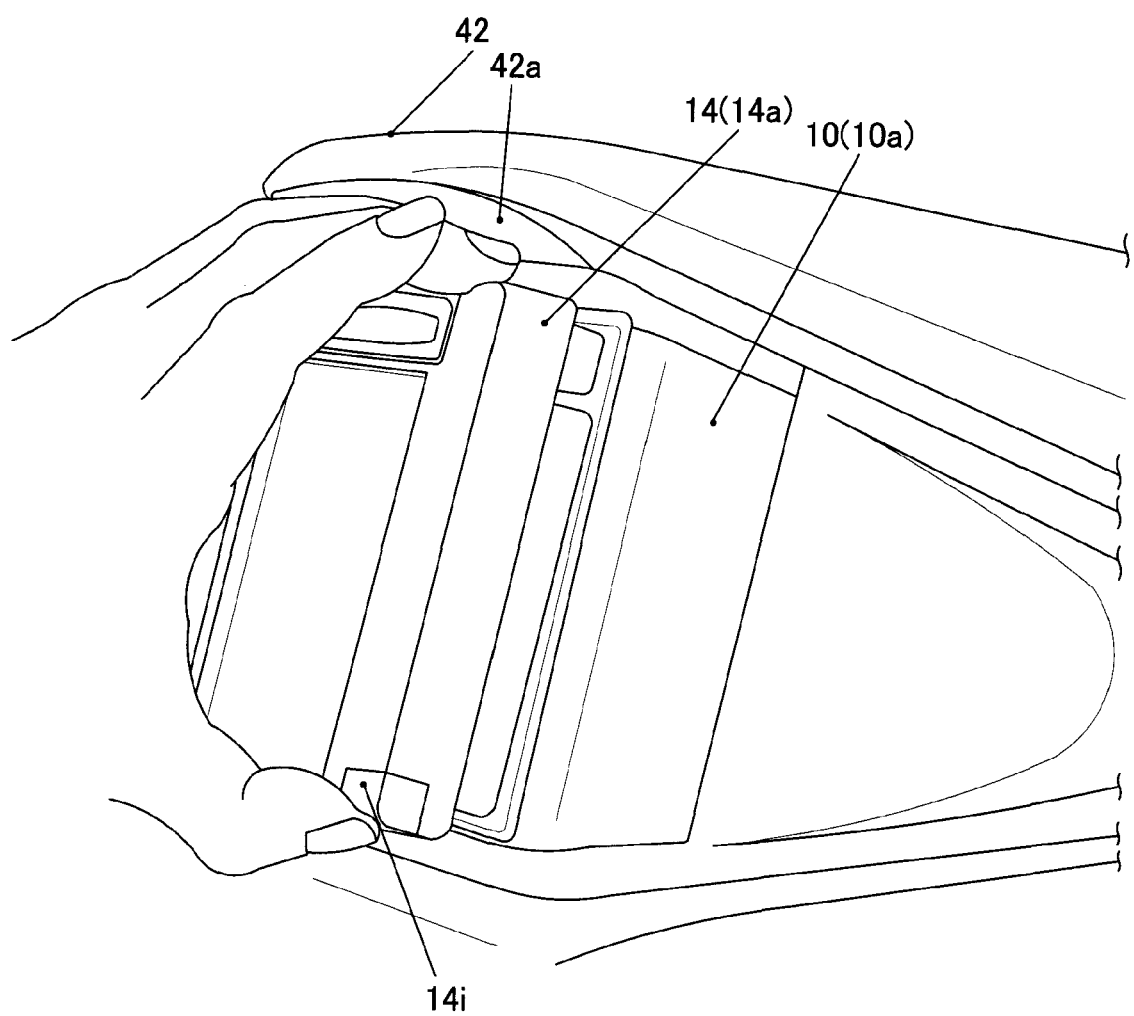
FIG. 36 is a perspective view similarly to FIG. 34, but showing the condition where the apparatus is mounted in the vehicle.
Figure 37:
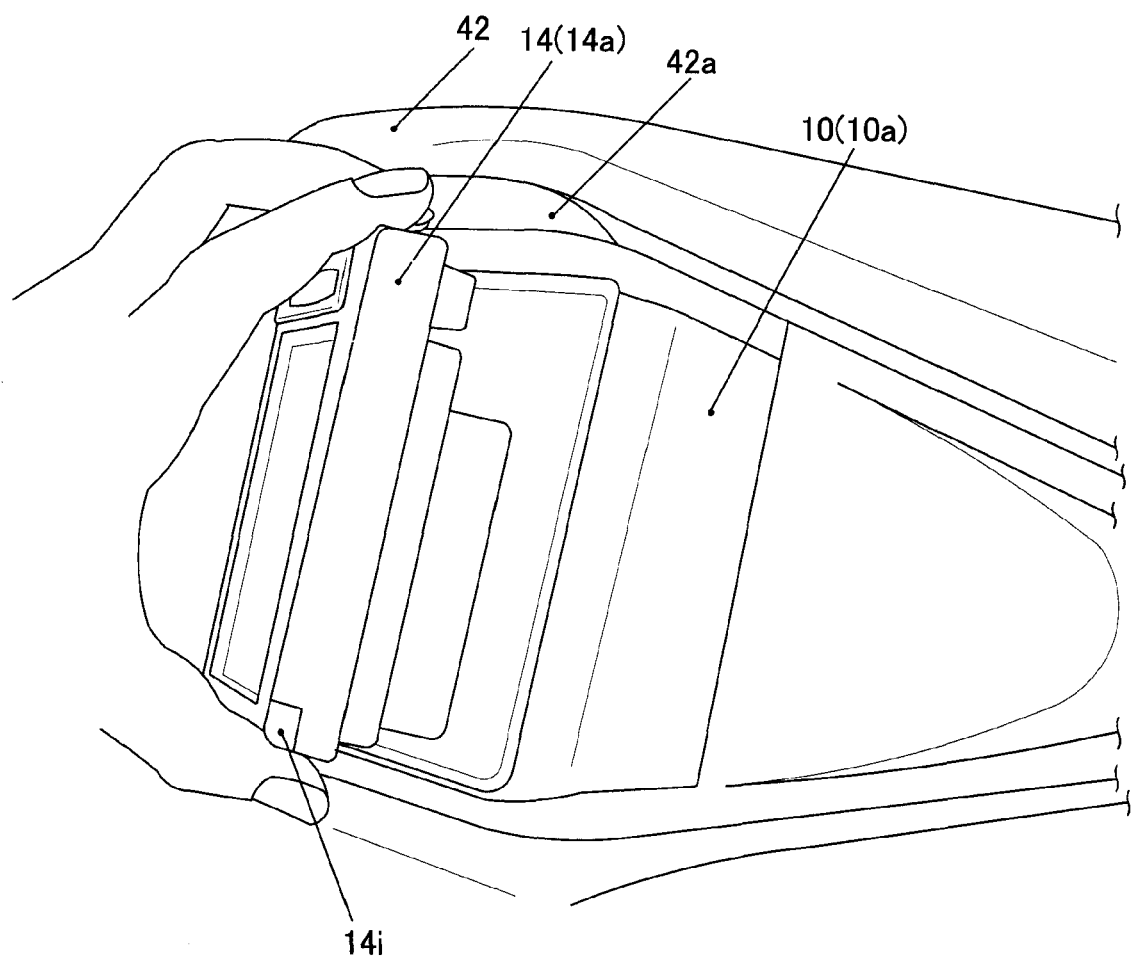
FIG. 37 is a perspective view similarly to FIG. 34, but showing the condition where the apparatus is mounted in the vehicle.
Figure 38:
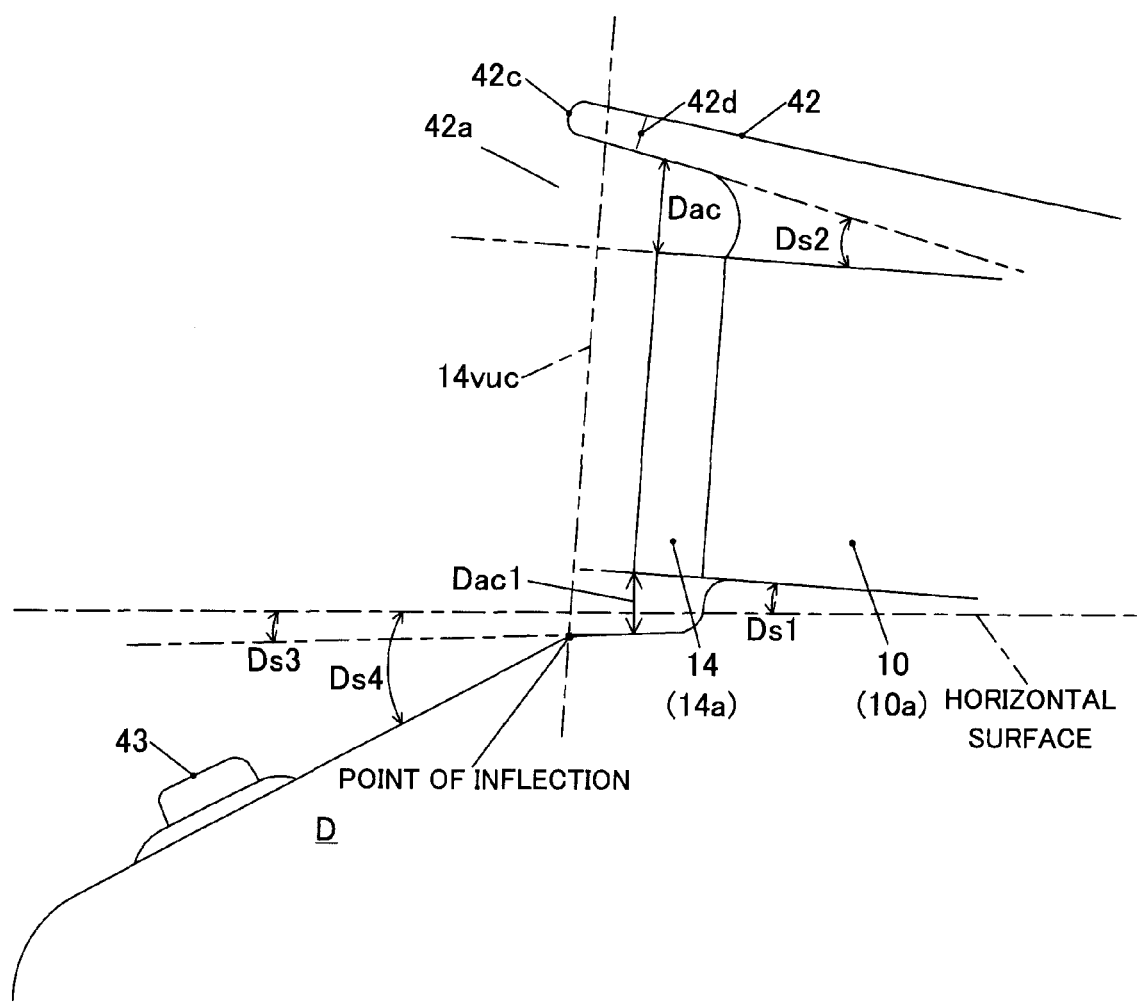
FIG. 38 is an explanatory view showing the interrelationship between an upper cover and the front panel unit, base unit and dashboard shown in, for example, FIG. 34.

FIG. 34 is a perspective view showing a navigation apparatus according to a third embodiment of this invention in the condition where it is mounted in a vehicle, FIG. 35 is a front view thereof when the front panel unit 14 in such condition has been detached, FIGS. 36 and 37 are perspective views also showing the condition where the apparatus is mounted in the vehicle, and FIG. 38 is an explanatory view showing the interrelationship between an upper cover explained later and the front panel unit 14, base unit 10 and dashboard D shown in, for example, FIG. 34.

Turning to an explanation focused on the points of difference from the foregoing embodiments, in the third embodiment the base unit 10 is accommodated inside a housing 38, shown in FIG. 35, formed in a dashboard D that is gently inclined when viewed from the side as shown in FIG. 34, and the base unit 10, more specifically up to near the opening of the base unit case 10a, is enclosed by a decorative panel 40.

The open end of the decorative panel 40 is flush with the open end of the base unit case 10a. Therefore, when the front panel unit 14 is attached to the base unit 10, the front panel unit 14, more specifically the front panel unit case 14a, projects from the decorative panel 40 in side view, as shown in FIG. 34.

An upper cover 42 is provided above the housing 38. As shown in FIGS. 34 and 35, as viewed from above the upper cover 42 extends beyond the front end of the front panel unit 14 toward the driver's seat (not shown) and is formed to have a larger breadth than that of the front panel unit 14, more specifically the front panel unit case 14a.

When the user presses the detach button 14i of the front panel unit 14 and grasps the front panel unit 14 as shown in FIGS. 36 and 37, a large gap 42a the user's fingers can enter is formed between the upper cover 42 and the front panel unit 14. Further, as shown in FIG. 38, a gap Dac1 of around the size the user's fingers can enter is formed at the bottom of the front panel unit 14, as shown in FIG. 38.

More specifically, as shown in FIG. 38, the undersurface of the upper cover 42 is formed to depart gradually from the front panel unit 14, more exactly the front panel unit case 14a, toward the opening side, and the clearance Dac thereat also enlarges toward the opening side, which is to say that the gap 42a also enlarges.

While it is noted that, as was explained earlier with reference to FIG. 8, detachment of the front panel unit 14 from the base unit 10 requires the front panel unit 14 to be moved upward at least beyond the height H of the hook 10g1 of the release lever 10g, the clearance Dac is formed to a size adequately exceeding that of the height H and the user's fingers, even in the vicinity of the front end of the front panel unit case 14a.

In addition, as shown in FIG. 35, the upper cover 42 is formed mountain-like to be lower at the opposite ends than at the middle and, as shown in FIGS. 36 and 38, the upper cover 42 projects to an extent such that, in the condition with the front panel unit 14 detached, the right side angle at least partially overlaps the upper cover 42 as viewed from above.

In the third embodiment, as shown in FIG. 38, the attachment angle Ds1 of the base unit 10 is inclined slightly upward from the horizontal surface, the plane of the dashboard D immediately under the front panel unit 14 is inclined slightly downward by Ds3, the section of the dashboard D forward of the point of inflection is inclined downward by Ds4, and the control switches and dials for AV, communication, navigation (designated by symbol 43) are disposed outward on the steeply inclined surface.

Further, the upward inclination Ds2 of the upper cover 42 is made larger than Ds1, and the order of the angles is defined as Ds3<Ds1<Ds2<Ds4. Note that the detached position of the front panel unit 14 is slightly forward of the point of inflection. Note that a line 14vuc in FIG. 38 indicates the front of the front panel unit 14 when the detach button 14i has been pressed to kick the front panel unit 14 out of the base unit 10 to the detached position. Taking this into consideration, projection degree is defined from the base end 42d (curve starting point; region corresponding to right end of the front panel unit 14) of the leading end 42c of the curved upper cover 42. The remaining aspects of the third embodiment are no different from the earlier embodiments.

As set out in the foregoing, the third embodiment is configured to have a navigation apparatus or attachment structure of the navigation apparatus having: a base unit 10 that is accommodatable in a housing 38 formed in a dashboard D of a vehicle and is equipped with at least a microcomputer; and a front panel unit 14 that is attachable to and detachable from the base unit and is equipped with at least a display (liquid crystal panel) 14b displaying map data and a microcomputer performing a navigation function to indicate a determined location of the vehicle on the map data, characterized in that: a front surface of the front panel unit 14 is made same size as a mating face of the base unit 10; and an upper cover 42 is provided at a top of the housing 38 formed in the dashboard D to extend beyond a front end of the front panel unit 14 toward a driver's seat as viewed from above. With this, in addition to the effects of the first embodiment, it becomes possible to prevent external light and the like from reflecting off the liquid crystal panel 14b of the front panel unit 14 and, at time of detaching the front panel unit 14, also act as a finger guide to facilitate the detachment. In addition, since the upper cover 42 is provided at the top, the opposite sides and undersurface are open so that even a user of relatively large size can easily attach the front panel unit 14 to the base unit 10 and detach it therefrom.

In addition, the gap 42a of a size the user's fingers can enter is formed between the upper cover 42 and the front panel unit 14, whereby detachment becomes easier, and the gap 42a is formed to expand toward the open side, so that detachment becomes still more easy.

Fourth Embodiment

Figure 39:
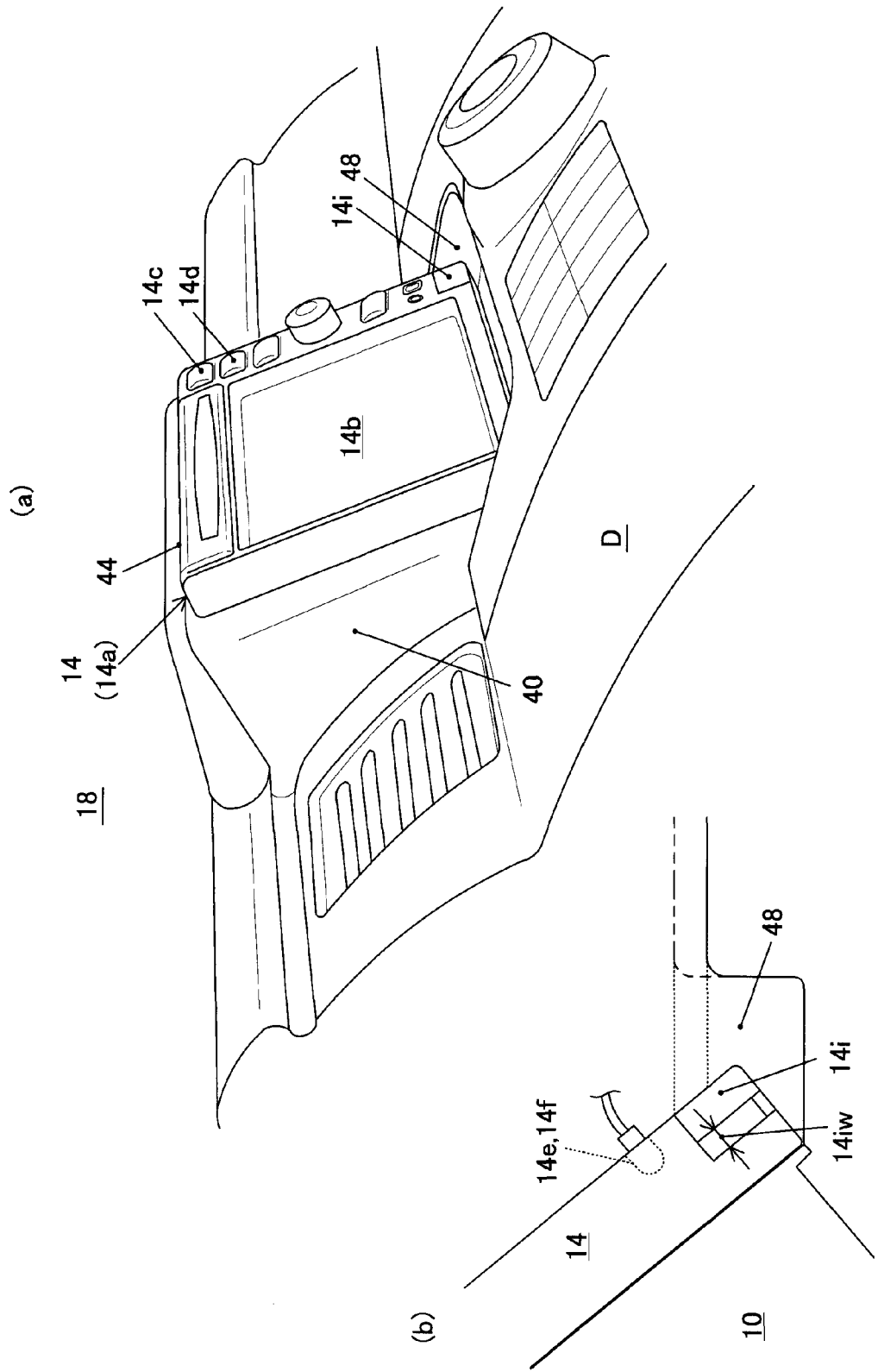
FIG. 39(*a*) is a perspective view showing a navigation apparatus according to a fourth embodiment of this invention in the condition where it is mounted in a vehicle and FIG. 39(*b*) is a perspective side view of the vicinity of the bottom of the front panel unit.

FIG. 39(a) is a perspective view showing a navigation apparatus according to a fourth embodiment of this invention in the condition where it is mounted in a vehicle and FIG. 39(b) is a side view of a recess near the bottom of the front panel unit 14.

In the fourth embodiment, the front panel unit 14 is attached to a base unit 10 (not shown) accommodated in a housing 44 formed in a dashboard D having two horizontal surfaces and the front panel unit 14 is sharply inclined in the direction of vehicle travel as viewed from the side, while the bottom of the front panel unit 14 is lowered to avoid upward projection of the front panel unit 14 to the utmost possible.

As in the third embodiment, the base unit 10, more specifically up to near the opening of the base unit case 10a (not shown), is enclosed by the decorative panel 40 and the open end of the decorative panel 40 is configured substantially the same as that of the base unit case 10a. When the front panel unit 14 is attached to the base unit 10, the front panel unit 14, more specifically the front panel unit case 14a, projects from the decorative panel 40 in side view, as shown in the drawing.

The dashboard D is formed under the front panel unit 14 with a recess 48 into which the user's fingers can enter when the front panel unit 14 is detached from the base unit 10.

Note that, as shown in FIG. 39(b), although the edge of the recess 48 is given a height rising above the corner of the front panel unit 14 to about the middle of the detach button 14i, it is acceptable, as indicated by the phantom line in the figure, for it to be given a height to near the top of the detach button 14i. The point is that it suffices for the height not to be so great as to interfere when a cable is passed over it for insertion in the jack 14e (14f). The remaining aspects of the configuration are no different from the earlier embodiments. Symbol 14iw indicates the stroke of the detach button 14i.

As set out in the foregoing, the fourth embodiment is configured to have a navigation apparatus or attachment structure of the navigation apparatus having: a base unit 10 that is accommodatable in a housing 44 formed in a dashboard D of a vehicle and is equipped with at least a microcomputer; and a front panel unit 14 that is attachable to and detachable from the base unit 10 and is equipped with at least a display (liquid crystal panel) 14b displaying map data and a microcomputer performing a navigation function to indicate a determined location of the vehicle on the map data, characterized in that: a front surface of the front panel unit 14 is made same size as a mating face of the base unit 10; and a recess is formed in the dashboard D. With this, in addition to the effects of the first embodiment, detachment of the front panel unit 14 becomes easy.

Note that in the fourth embodiment misoperation of the detach button 14i can be further prevented by lowering at least part of the detach button 14i located at the bottom of the front panel unit 14 into the recess 48 to further avoid upward projection of the front panel unit 14.

Fifth Embodiment

Figure 40:
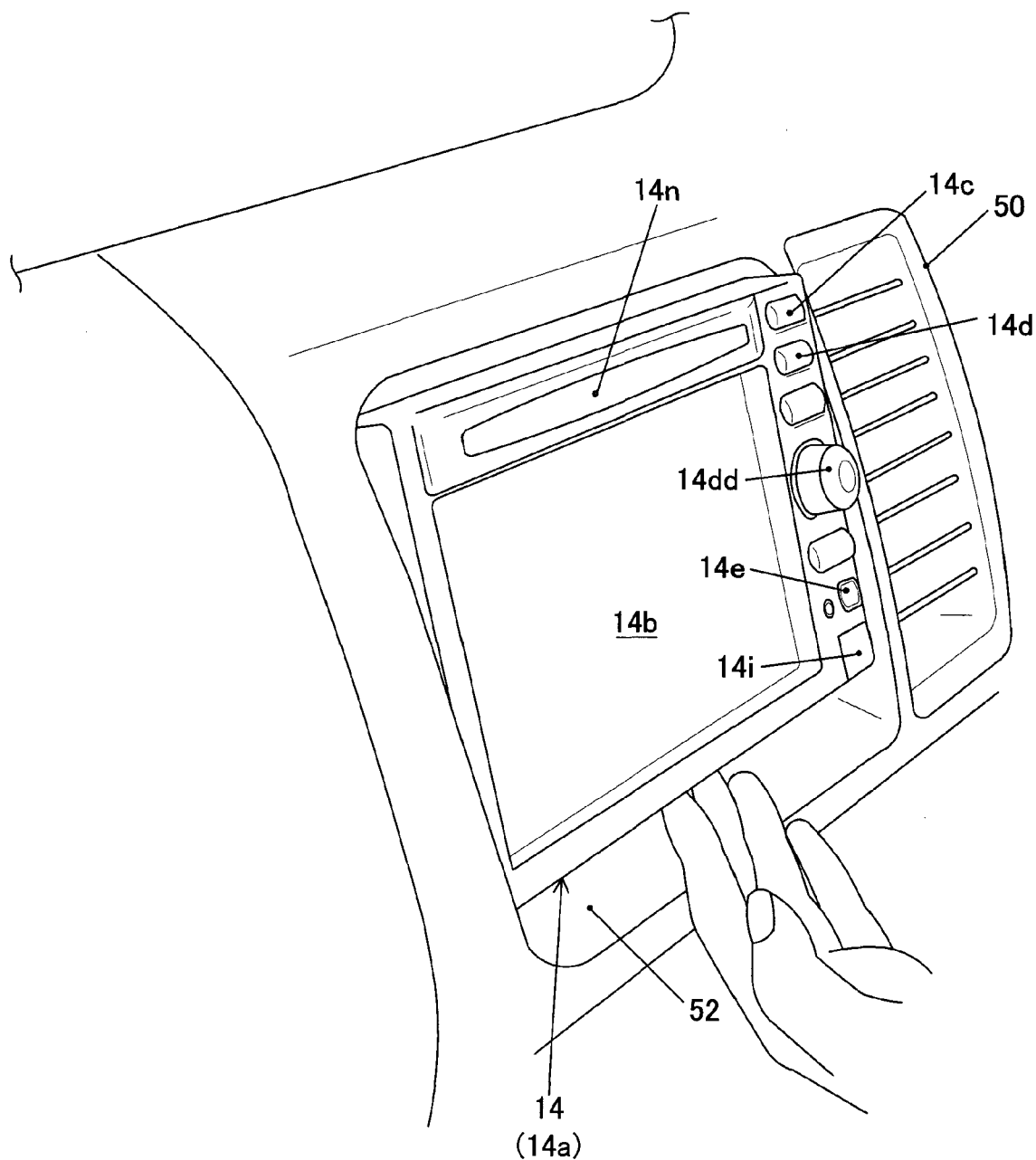
FIG. 40 is a perspective view showing a navigation apparatus according to a fifth embodiment of this invention in the condition where it is mounted in a vehicle.
Figure 41:
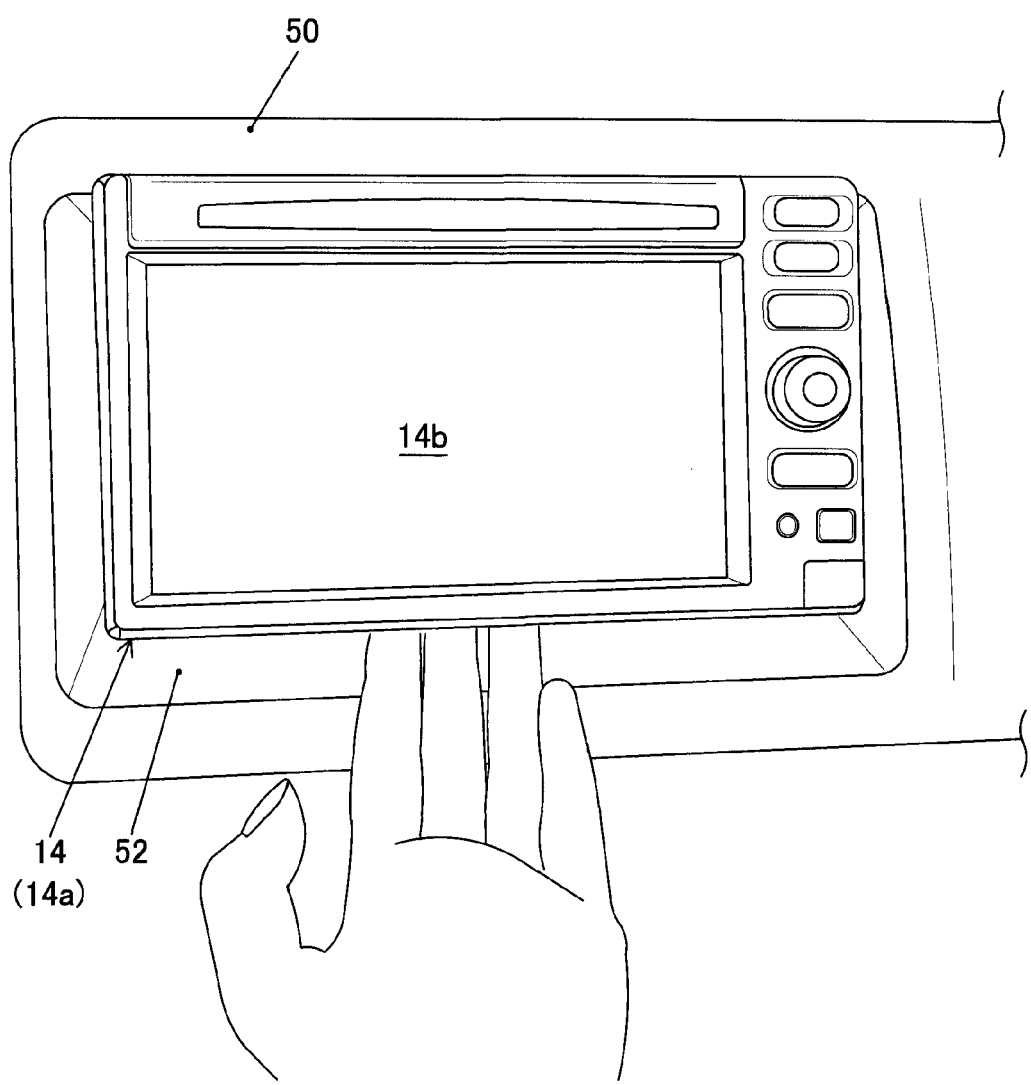
FIG. 41 is a front view of the front panel unit shown in FIG. 40.

FIG. 40 is a perspective view showing a navigation apparatus according to a fifth embodiment of this invention in the condition where it is mounted in a vehicle and FIG. 41 is a front view in that condition.

The fifth embodiment is provided with a removable decorative panel 50 that is attached to the dashboard D.

As shown in FIG. 40, the decorative panel 50 is formed to extend beyond the vicinity of the opening of the base unit 10, more specifically the base unit case 10a (not shown), as far as to partially enclose the front panel unit 14, more specifically the front panel unit case 14a. Therefore, as shown in FIG. 40, the fifth embodiment is configured to mitigate the protruding look of the front panel unit 14 from the decorative panel 50 as viewed from the side.

A slanted region 52 is formed in the dashboard D under the front panel unit 14 to enable the user's fingers to enter when detaching the front panel unit 14 from the base unit 10. The remaining aspects are no different from the second embodiment.

Note that the slot 14n, destination input switch 14c and current location input switch 14d are disposed at the uppermost part of the front panel unit 14, and the upper part of the front panel unit 14 where the current location input switch 14d is disposed projects from the dashboard D. Note that the symbol 14dd designates a volume switch.

As set out in the foregoing, the fifth embodiment is configured to have a navigation apparatus or attachment structure of the navigation apparatus having: a base unit 10 that is accommodatable in a dashboard D of a vehicle and is equipped with at least a microcomputer; and a front panel unit 14 that is attachable to and detachable from the base unit and is equipped with at least a display (liquid crystal panel) 14b displaying map data and a microcomputer performing a navigation function to indicate a determined location of the vehicle on the map data, characterized in that: a front surface of the front panel unit 14 is made same size as a mating face of the base unit 10; there is provided with a decorative panel 50 that is removable from the dashboard D and partially encloses the front panel unit 14 when the front panel unit 14 is attached to the base unit 10; and the front panel unit 14 is accommodated in the dashboard D via the decorative panel 50. With this, in addition to the effects of the first embodiment, it is possible by, for the purpose of keeping light from the speedometer and other indicators required for driving from passing around at night, disposing the front panel unit 14 to project to the user side more than the indicators, to eliminate the need to elongate the slanted region 52 required for detaching the front panel unit 14, without having to adopt a layout that accommodates the front panel unit 14 deep in the recess, and also to mitigate the protruding look.

Sixth Embodiment

Figure 42:
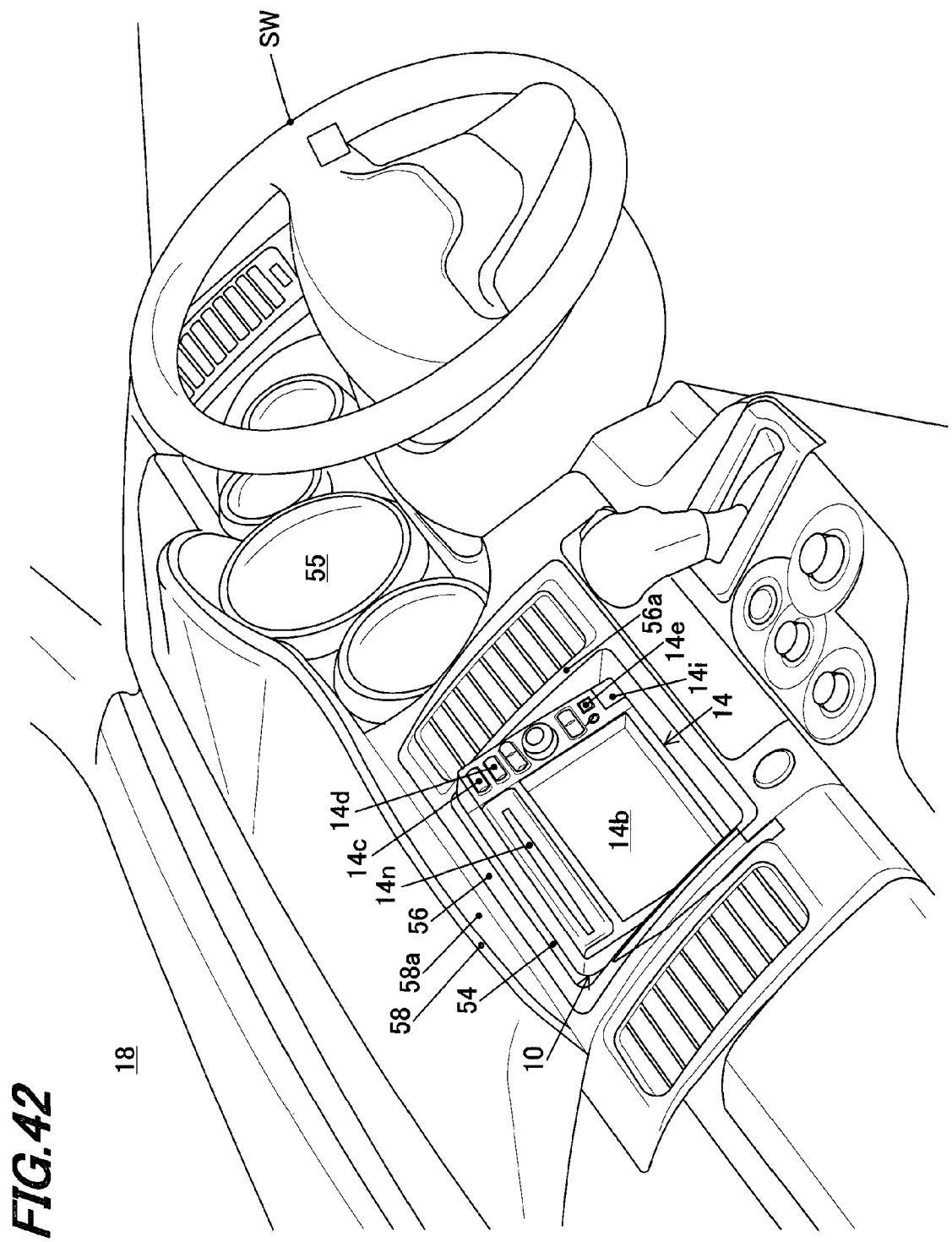
FIG. 42 is a front view showing a navigation apparatus according to a sixth embodiment of this invention in the condition where it is mounted in a vehicle.

FIG. 42 is a front view showing a navigation apparatus according to a sixth embodiment of this invention in the condition where it is mounted in a vehicle.

In the sixth embodiment, which has nearly the same configuration as set out above, for alignment with the user's line of vision, the attachment angle of the front panel unit 14 is raised above the face of the dashboard D, while the speedometer 55 is reclined.

The open end of a decorative panel 56 is made congruent with that of the base unit case 10*a* (not shown), and when the front panel unit 14 is attached to the base unit 10, the front panel unit 14, more specifically the front panel unit case 14*a*, projects from the decorative panel 56 at the top as viewed from the side.

In the embodiment set out above, an upper cover 58 is provided above a housing 54. Similarly to in the third embodiment, the upper cover 58, as viewed from above, extends beyond the front end of the front panel unit 14 toward the driver's seat and is formed to have a larger breadth than that of the front panel unit 14, more specifically the front panel unit case 14*a*, so that the screen of the liquid crystal panel 14*b* is not reflected by the windshield 18 during driving even though the liquid crystal panel 14*b* is tilted.

Further, also similarly, a gap 58*a* of a size the user's fingers can enter is formed between the upper cover 58 and the front panel unit 14, and the undersurface of the upper cover 58 is formed to depart gradually from the front panel unit 14, more exactly the front panel unit case 14*a*, toward the opening side, and the clearance thereat also enlarges toward the opening side, which is to say that the gap 58*a* also enlarges.

What characterizes the sixth embodiment is that the decorative panel 56 is formed integrally with a partition on the right side in the figure. That is, the right side of the decorative panel 56 serves as a partition 56*a*. This partition 56*a* on the steering wheel side is formed to project more with respect to the front panel unit 14 than the partition on the opposite side, while the base unit 10 is attached to the dashboard D at a small inclination.

Note that, although omitted from the other figures, it is clear from FIG. 42 and first-embodiment FIG. 5, that the speedometer 55 and other indicators are disposed adjacent to the right side of the navigation apparatus, more specifically, the front panel unit 14, as seen in the figures.

The remaining aspects of the configuration of the sixth embodiment are no different from the earlier embodiments.

As set out in the foregoing, the sixth embodiment is configured to have a navigation apparatus or attachment structure of the navigation apparatus having: a base unit 10 that is accommodatable in a housing 54 formed in a dashboard D of a vehicle and is equipped with at least a microcomputer; and a front panel unit 14 that is attachable to and detachable from the base unit and is equipped with at least a display (liquid crystal panel) 14*b* displaying map data and a microcomputer performing a navigation function to indicate a determined location of the vehicle on the map data, characterized in that: a front surface of the front panel unit 14 is made same size as a mating face of the base unit 10; and a partition 56*a* is provided. With this, in addition to the effects of the first embodiment, it is possible to prevent light from the liquid crystal panel 14*b* of the front panel unit 14 from reflecting off adjacent indicators.

Seventh Embodiment

Figure 43:
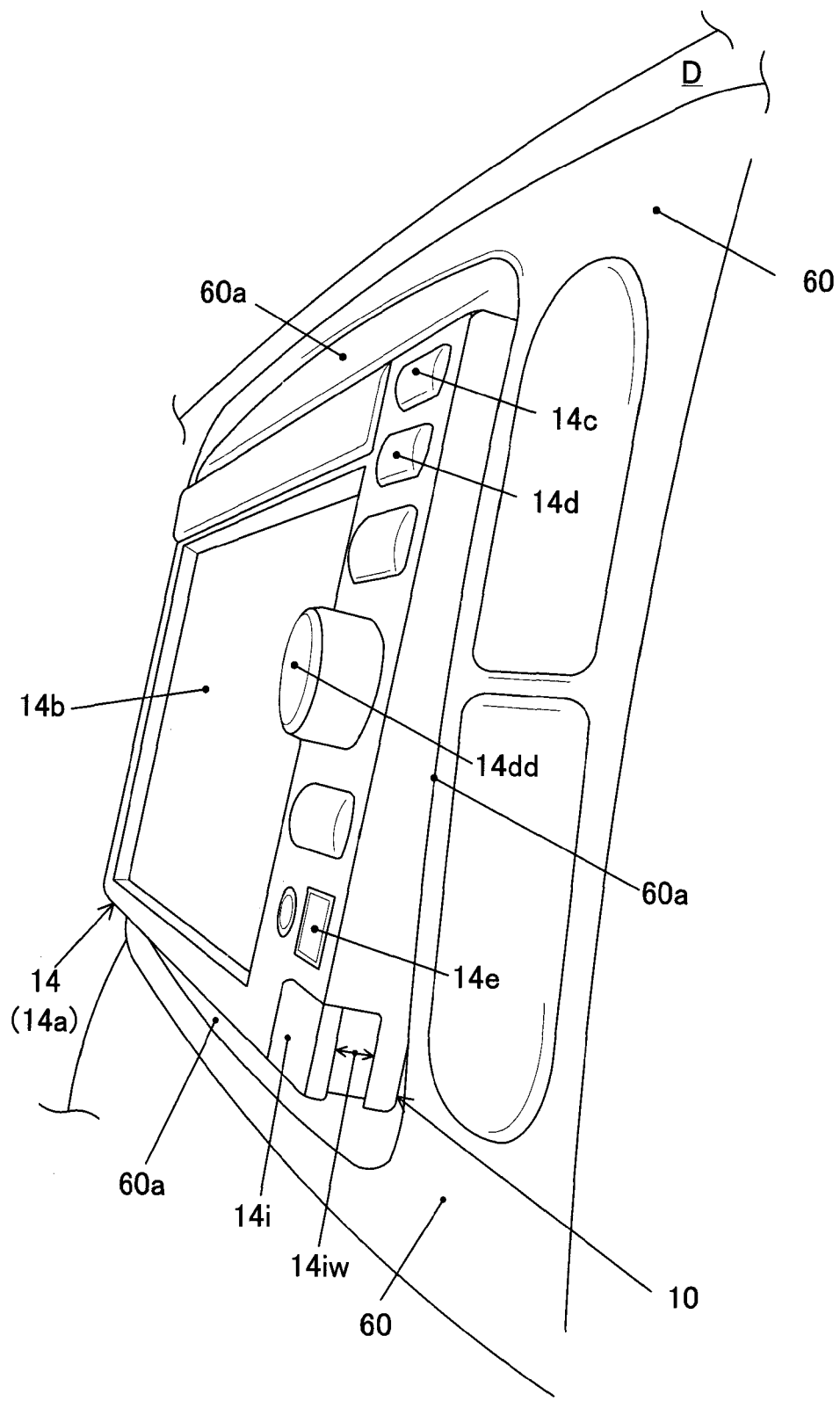
FIG. 43 is a perspective view showing a removable decorative panel of a navigation apparatus according to a seventh embodiment of this invention in the attached condition.
Figure 44:
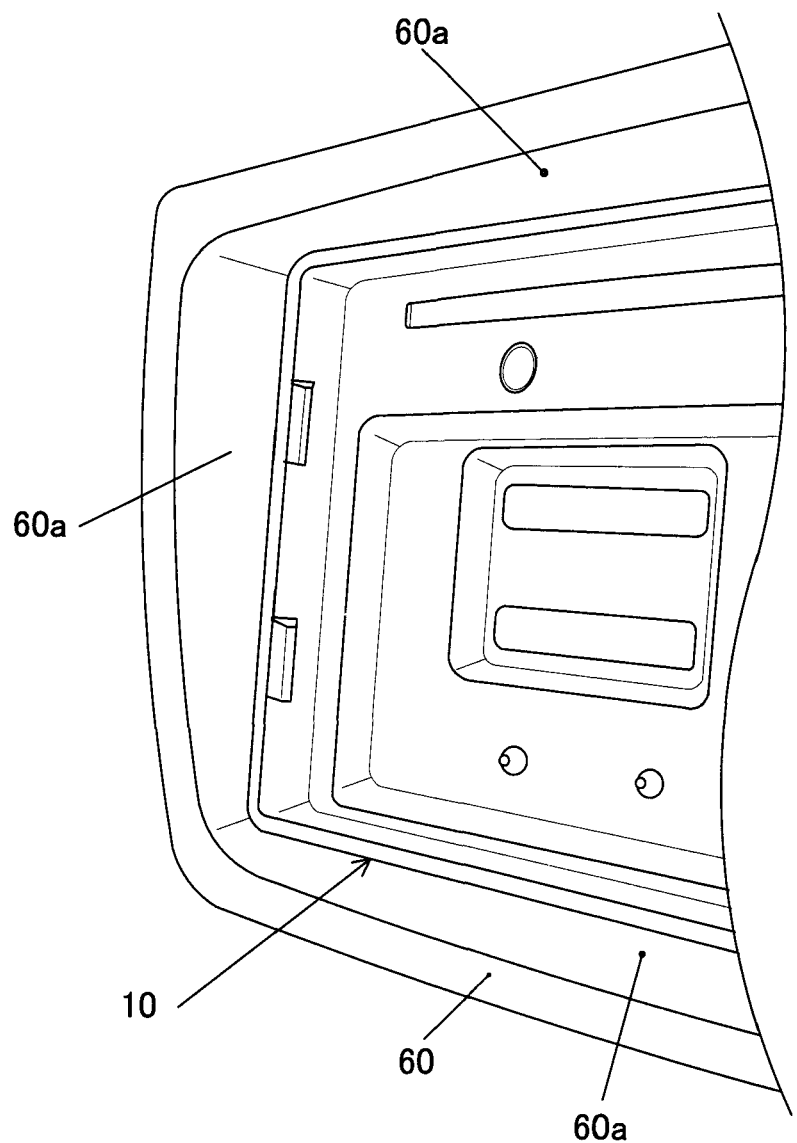
FIG. 44 is a perspective view with the front panel unit removed from the condition shown in FIG. 43.

FIG. 43 is a perspective view showing a removable decorative panel of a navigation apparatus according to a seventh embodiment of this invention in the attached condition and FIG. 44 is a perspective view with the front panel unit detached.

Also in the seventh embodiment, similarly to in the fifth embodiment, a removable decorative panel 60 is provided and the front panel unit 14 is attachable to the dashboard D through the decorative panel 60.

As shown in FIG. 43, the front panel unit 14 is accommodated inside the decorative panel 60, and the front panel unit 14, more specifically the front panel unit case 14*a*, is configured to project from the decorative panel 60 at the bottom in side view when the front panel unit 14 is attached to the base unit 10. The detach button 14*i* disposed at the front of the front panel unit 14 is configured to project from the front of the decorative panel 60 by at least the amount of the aforesaid stroke (e.g., 5 mm).

Further, as shown in FIG. 44, the seventh embodiment is configured to form upper and lower lateral gaps 60*a* between the decorative panel 60 and front panel unit 14, so that when the front panel unit 14 is detached from the base unit 10, i.e. in the condition where the right side of the front panel unit 14 has moved out to the detached position upon operation of the detach button 14*i*, at least the top and bottom of the front panel unit 14 can be easily grasped by the fingers of an adult. The remaining aspects of the configuration are no different from the earlier embodiments.

As set out in the foregoing, the seventh embodiment is configured to have a navigation apparatus or attachment structure of the navigation apparatus having: a base unit 10 that is accommodatable in a dashboard D of a vehicle and is equipped with at least a microcomputer; and a front panel unit 14 that is attachable to and detachable from the base unit and is equipped with at least a display (liquid crystal panel) 14*b* displaying map data and a microcomputer performing a navigation function to indicate a determined location of the vehicle on the map data, characterized in that: a front surface of the front panel unit 14 is made same size as a mating face of the base unit 10; and a decorative panel 60 accommodatable in the dashboard D is made so that a part of the front panel unit 14 (more specifically the bottom thereof) projects, as viewed from side, when the front panel unit 14 is attached to the base unit 10. With this, in addition to the effects of the first embodiment, it becomes easy for the user to mount the front panel unit 14 in the base unit 10 and detach it therefrom.

Eighth Embodiment

Figure 45:
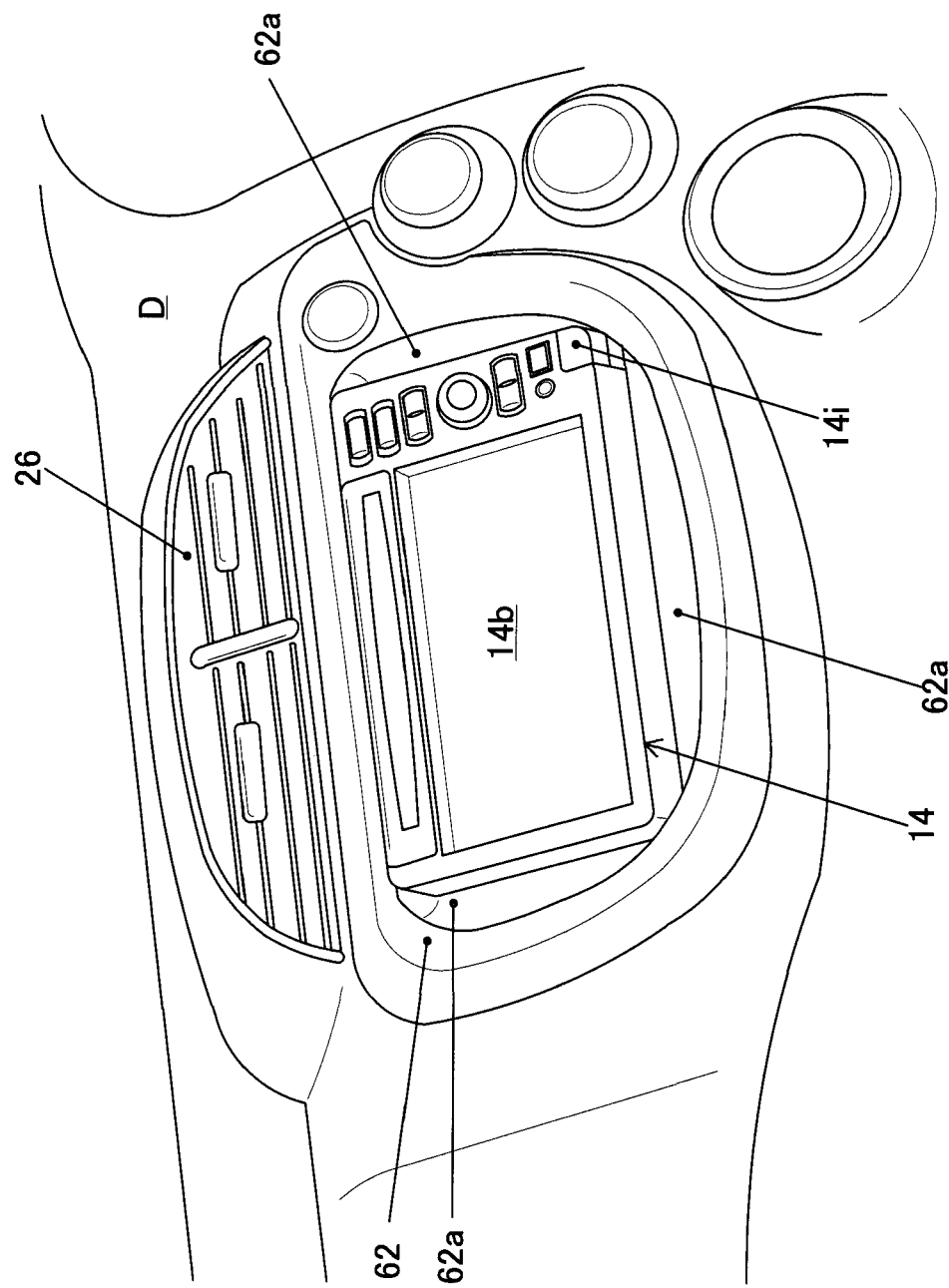
FIG. 45 is a perspective view showing a navigation apparatus according to an eighth embodiment of this invention in the condition where it is mounted in a vehicle.
Figure 46:
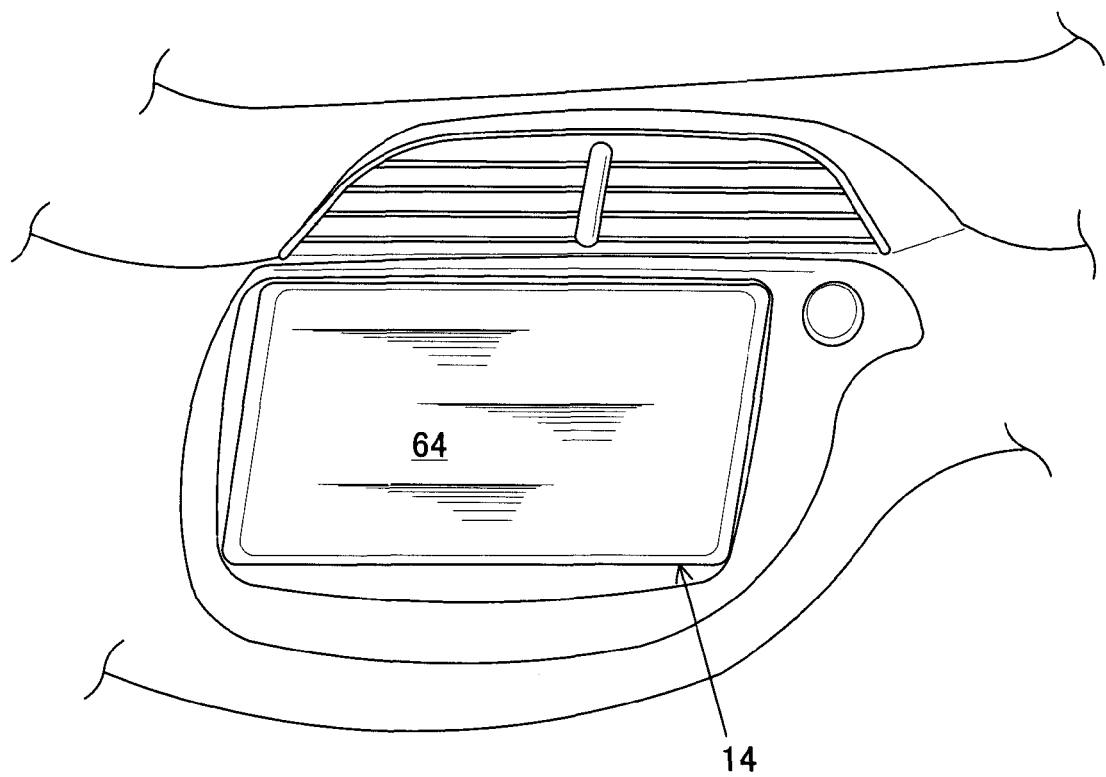
FIG. 46 is a perspective view with the front panel unit removed from the condition shown in FIG. 45 and a cover attached.

FIG. 45 is a perspective view showing a navigation apparatus according to an eighth embodiment of this invention in the condition where it is mounted in a vehicle, and FIG. 46 is a perspective view with the front panel unit detached therefrom and a cover attached.

In the eighth embodiment, a recess 62 is formed locally in the dashboard D and the base unit 10 (not shown) and the front panel unit 14 are accommodated therein. The edge of the recess 62 is formed with sloped surfaces 62*a* at the left, right and bottom to facilitate insertion of the user's fingers.

In the eighth embodiment, the front surface of the front panel unit 14 is disposed to project partially from the recess 62, so in order to keep the user's sleeve or the like from catching on a corner of the front panel unit 14 at the time of adjusting the blow direction of the air vent 26 located above or operating other switches, the lower left and right corners of the recess 62 are rounded to a shape approaching the lower left and right corners of the front panel unit 14, i.e., are made U-shaped, thereby substantially eliminating the gaps between the lower left and right corners of the front panel unit 14 and recess 62 and thus preventing interference with sleeves and the like.

Even in the condition where the right side of the front panel unit 14 has moved out to the detached position, catching of a sleeve or the like can be prevented insofar as the two corners approach to overlap even partially, so that the front panel unit 14 is not detached by mistake, which is particularly preferable when the detach button 14i is disposed at the lower right corner.

FIG. 46 shows a cover 64. That is to say, when the front panel unit 14 is detached from the base unit, the base unit 10 is exposed as shown in FIG. 44, for example. The cover 64 therefore provided to mask the base unit 10 in an eye-pleasing manner. The cover 64 can also be applied to the earlier embodiments. The remaining aspects of the configuration are no different from the earlier embodiments.

As set out in the foregoing, the eighth embodiment is configured to have a navigation apparatus or attachment structure of the navigation apparatus having: a base unit 10 that is accommodatable in a dashboard D of a vehicle and is equipped with at least a microcomputer; and a front panel unit 14 that is attachable to and detachable from the base unit and is equipped with at least a display (liquid crystal panel) 14b displaying map data and a microcomputer performing a navigation function to indicate a determined location of the vehicle on the map data, characterized in that: a front surface of the front panel unit 14 is made same size as a mating face of the base unit 10; a surface of the dashboard D is formed with a recess 62 of U-shape, as viewed from front, to accommodate the base unit 10 of laterally elongated rectangular shape; the front panel unit 14 is made attachable to the base unit 10; and a sloped surface 62a is formed at an edge of the recess 62 of U-shape. With this, in addition to the effects of the first embodiment, catching of the user's sleeves and the like can be prevented without sacrificing ease of detachment.

Figure 47:
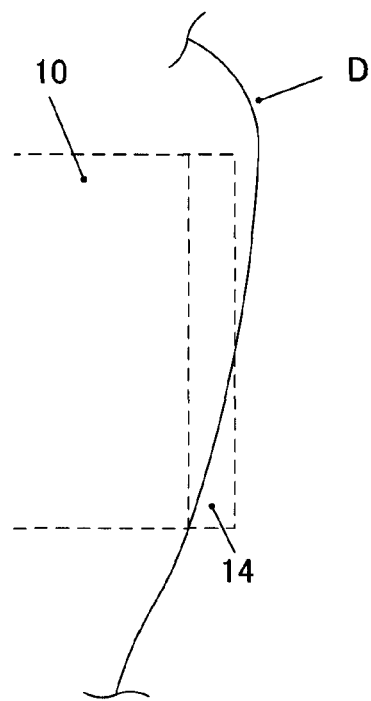
FIG. 47 is an explanatory view showing an alternative example of the eighth embodiment etc.
Figure 48:
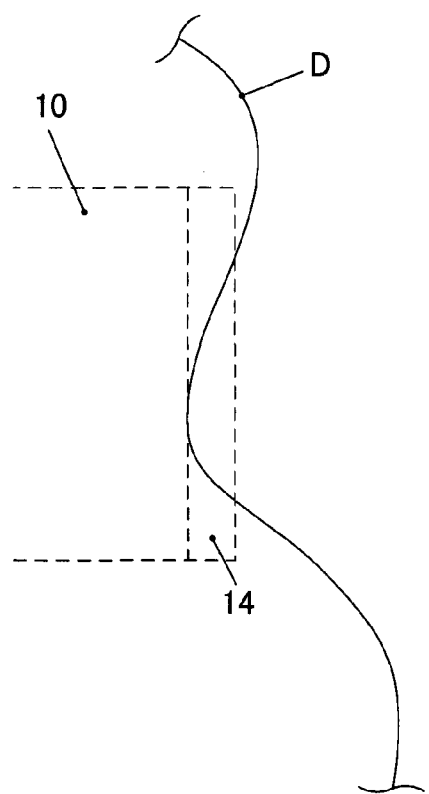
FIG. 48 is an explanatory view similarly showing a further alternative example of the eighth embodiment etc.

Note that the positional relationship between the dashboard D and the front panel unit 14 when mounted, particularly the structure by which the front panel unit 14 projects from the bottom as viewed from the side, is not limited to that illustrated but can, for example, be a structure like that shown in FIG. 47. In addition, a structure by which the middle region of the front panel unit 14 projects, as shown in FIG. 48, is also acceptable.

Note that although the base unit 10, cradle unit 12 and front panel unit 14 were explained in the aforesaid embodiments, the invention of claim 1 holds good without the cradle unit 12, as set out by: "A navigation apparatus having a base unit fastenable to a vehicle and equipped with at least a microcomputer, and a front panel unit attachable/detachable to/from the base unit and equipped with at least a display for displaying map data and a microcomputer for performing navigation functions to indicate a determined location of the vehicle on the map data, wherein".

Moreover, although the case of there being multiple base units 10 or cradle units 12 was explained in the forgoing, it is acceptable for there to be a single base unit 10 or cradle unit 12.

INDUSTRIAL APPLICABILITY

According to this invention, in the navigation apparatus having a base unit that is fastenable to a dashboard at a driver's seat of a vehicle; a front panel unit that is attachable to and detachable from the base unit and is equipped with a display displaying map data; and a microcomputer that performs a navigation function to indicate a determined location of the vehicle on the map data, it is configured such that a part of the front panel unit projects from a surface of the dashboard toward a user seated in the driver's seat, as viewed from side, when the front panel unit is attached to the base unit. With this, the degree of freedom of front panel unit attachment/detachment with respect to the base unit is improved without sacrificing the appearance of the navigation apparatus.

The invention claimed is:

1. A navigation apparatus comprising:
a base unit that is fastenable to a dashboard at a driver's seat of a vehicle;
a front panel unit that is attachable to and detachable from the base unit and is equipped with a display displaying map data; and
a microcomputer that performs a navigation function to indicate a determined location of the vehicle on the map data,
wherein a front surface of the front panel unit is made same size as a mating face of the base unit;
a top part of the front panel unit projects from a surface of the dashboard, as viewed from a side, when the front panel unit is attached to the base unit;
the base unit is accommodated in a recess formed in the dashboard to be fastenable to the dashboard; and
a bottommost part of the front panel unit is located inside the recess, as viewed from the side, such as to be sunken totally into the recess, when the front panel unit is moved from an attached position to a detached position in response to operation of a detach button of an attach/detach mechanism by the user.

2. A navigation apparatus comprising:
a base unit that is fastenable to a dashboard at a driver's seat of a vehicle;
a front panel unit that is attachable to and detachable from the base unit and is equipped with a display displaying map data; and
a microcomputer that performs a navigation function to indicate a determined location of the vehicle on the map data,
wherein a part of the front panel unit projects from a surface of the dashboard, as viewed from a side, when the front panel unit is attached to the base unit;
the base unit is accommodated in a recess formed in the dashboard to be fastenable to the dashboard;
a top part of the front panel unit projects from the surface of the dashboard toward the user, as viewed from the side, and a bottommost part of the front panel unit is located inside the recess, as viewed from the side, such as to be sunken totally into the recess, when the front panel unit is in an attached position; and
a detach button of an attach/detach mechanism provided to be operable by the user for moving the front panel unit from the attached position to a detached position is disposed at the bottom of the front panel unit located inside the recess.

3. A navigation apparatus comprising:
a base unit that is accommodatable in a housing formed in a dashboard at a driver's seat of a vehicle and is equipped with at least a microcomputer; and
a front panel unit that is attachable to and detachable from the base unit and is equipped with at least a display displaying map data and a microcomputer performing a navigation function to indicate a determined location of the vehicle on the map data,
wherein a front surface of the front panel unit is made same size as a mating face of the base unit;
an upper cover is provided at a top of the housing formed in the dashboard to extend beyond a front end of the front panel unit toward a driver's seat as viewed from above; and the front panel unit is kicked out to be detached from the base unit at a position between a base end of the leading end of the upper cover and a point of inflection where the dashboard starts to be inclined downward, and wherein a gap to receive a user's finger to grasp the front panel unit for detaching the front panel unit is formed between the dashboard and a bottom surface of the front panel unit.

4. The apparatus according to claim 3, wherein a base end of the leading end of the upper cover is located at a frontward position compared to a position corresponding to the front end of the front panel unit in a detached position.

5. A navigation apparatus comprising:
a base unit that is accommodatable in a housing formed in a dashboard at a driver's seat of a vehicle and is equipped with at least a microcomputer; and
a front panel unit that is attachable to and detachable from the base unit and is equipped with at least a display displaying map data and a microcomputer performing a navigation function to indicate a determined location of the vehicle on the map data,
wherein a front surface of the front panel unit is made same size as a mating face of the base unit;
partitions are provided on opposite sides of the front panel unit; and
one of the partitions on a steering wheel side is formed to project more with respect to the front panel unit than other of the partitions not on the steering wheel side, and
wherein a gap to receive a user's finger to grasp the front panel unit for detaching the front panel unit is formed between the dashboard and a bottom surface of the front panel unit.

6. The apparatus according to claim 3 or 5, wherein the display occupies 70% or greater of a length of the front panel unit in a lateral direction.

7. A navigation apparatus comprising:
a base unit having a laterally elongated rectangular shape that is accommodatable in a dashboard at a driver's seat of a vehicle and is equipped with at least a microcomputer; and
a front panel unit that is attachable to and detachable from the base unit and is equipped with at least a display displaying map data and a microcomputer performing a navigation function to indicate a determined location of the vehicle on the map data,
wherein a front surface of the front panel unit is made same size as a mating face of the base unit;
a surface of the dashboard is formed with a recess of U-shape, as viewed from a front, to accommodate the base unit;
the front panel unit is made attachable to the base unit; and
a sloped surface is formed at an edge of the recess of U-shape, and
wherein a gap to receive a user's finger to grasp the front panel unit for detaching the front panel unit is formed between the dashboard and a bottom surface of the front panel unit.

* * * * *